(12) United States Patent
Li et al.

(10) Patent No.: US 11,246,160 B2
(45) Date of Patent: Feb. 8, 2022

(54) METHOD AND APPARATUS FOR VALID RACH OCCASION DETERMINATION IN NR UNLICENSED

(71) Applicant: Samsung Electronics Co., Ltd., Suwon-si (KR)

(72) Inventors: Yingzhe Li, Mountain View, CA (US); Hongbo Si, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 23 days.

(21) Appl. No.: 16/799,636

(22) Filed: Feb. 24, 2020

(65) Prior Publication Data

US 2020/0281018 A1     Sep. 3, 2020

Related U.S. Application Data

(60) Provisional application No. 62/888,179, filed on Aug. 16, 2019, provisional application No. 62/835,866, (Continued)

(51) Int. Cl.
*H04W 74/08* (2009.01)
*H04W 80/08* (2009.01)
(Continued)

(52) U.S. Cl.
CPC ....... *H04W 74/0808* (2013.01); *H04L 1/1614* (2013.01); *H04L 5/0051* (2013.01);
(Continued)

(58) Field of Classification Search
CPC ............. H04W 74/0808; H04W 74/00; H04W 74/0833; H04W 72/005; H04W 72/1263;
(Continued)

(56) References Cited

U.S. PATENT DOCUMENTS

2018/0278467 A1    9/2018  Wilson et al.
2019/0190582 A1*   6/2019  Guo .................... H04B 7/0695
(Continued)

FOREIGN PATENT DOCUMENTS

WO    2018/203708 A1    11/2018
WO    2018/204351 A1    11/2018

OTHER PUBLICATIONS

"3rd Generation Partnership Project; Technical Specification Group Radio Access Network; NR; Physical channels and modulation (Release 15)", 3GPP TS 38.211 V15.4.0, Dec. 2018, 96 pages.
(Continued)

*Primary Examiner* — Phong La

(57) ABSTRACT

A method and apparatus of a UE in a wireless communication system supporting a shared spectrum channel access is provided. The method comprises: receiving, from a BS, a set of higher layer parameters; identifying, from the received set of higher layer parameters, a set of SS/PBCH blocks assumed to be transmitted by the BS; identifying, from the received set of higher layer parameters, a PRACH slot including at least one random access RO; determining the at least one RO as at least one valid RO; and transmitting, to the BS, a PRACH preamble in the at least one valid RO.

20 Claims, 28 Drawing Sheets

Related U.S. Application Data filed on Apr. 18, 2019, provisional application No. 62/811,922, filed on Feb. 28, 2019.

(51) Int. Cl.
| | |
|---|---|
| *H04W 56/00* | (2009.01) |
| *H04L 5/00* | (2006.01) |
| *H04L 1/16* | (2006.01) |
| *H04W 8/00* | (2009.01) |
| *H04W 72/00* | (2009.01) |

(52) U.S. Cl.
CPC ......... *H04W 8/005* (2013.01); *H04W 56/001* (2013.01); *H04W 72/005* (2013.01); *H04W 80/08* (2013.01)

(58) Field of Classification Search
CPC ... H04W 72/08; H04W 8/005; H04W 56/001; H04W 56/00; H04W 56/0025; H04L 1/1614; H04L 5/0051; H04L 5/0048; H04L 5/005; H04L 5/003; H04L 5/0032; H04L 5/0078
USPC ........................................................ 370/329
See application file for complete search history.

(56) References Cited

U.S. PATENT DOCUMENTS

| | | | |
|---|---|---|---|
| 2019/0223228 A1* | 7/2019 | Ko ................... | H04W 72/0446 |
| 2019/0349885 A1* | 11/2019 | Koskela .............. | H04W 72/085 |
| 2020/0053670 A1* | 2/2020 | Jung ................. | H04W 56/0015 |
| 2020/0092685 A1* | 3/2020 | Fehrenbach ......... | H04B 7/2606 |
| 2020/0196356 A1* | 6/2020 | Ko ....................... | H04L 5/0094 |
| 2020/0244530 A1* | 7/2020 | Lin .................... | H04W 56/001 |
| 2020/0267764 A1* | 8/2020 | Rastegardoost .. | H04W 74/0833 |

OTHER PUBLICATIONS

"3rd Generation Partnership Project; Technical Specification Group Radio Access Network; NR; Multiplexing and channel coding (Release 15)", 3GPP TS 38.212 V15.4 0, Dec. 2018, 100 pages.

"3rd Generation Partnership Project; Technical Specification Group Radio Access Network; NR; Physical layer procedures for control (Release 15)" 3GPP TS 38.213 V15.4.0, Dec. 2018, 104 pages.

"3rd Generation Partnership Project; Technical Specification Group Radio Access Network; NR; Physical layer procedures for data (Release 15)", 3GPP TS 38.214 V15.4.0, Dec. 2018, 102 pages.

"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.

"5GHz RLAN; Harmonised Standard covering the essential requirements of article 3.2 of Directive 2014/53/EU", ETSI EN 301 893 V2.1.1, May 2017, 135 pages.

"Multiple-Gigabit/s radio equipment operating in the 60 GHz band; Harmonised Standard covering the essential requirements of article 3.2 of Directive 2014/53/EU", ETSI EN 302 567 V2.1.1, Jul. 2017, 40 pages.

"3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 87 pages.

IEEE Std 802.11-2016, "Part 11: Wireless LAN Medium Access Control (MAC) and Physical Layer (PHY) Specifications", 2016, 3534 pages.

Huawei et al., "Initial access in NR unlicensed", 3GPP TSG RAN WG1 Ad-Hoc Meeting 1901, Jan. 21-25, 2019, R1-1900061, 11 pages.

Notification of Transmittal of the International Search Report and the Written Opinion of the International Searching Authority, or the Declaration dated Jun. 12, 2020 in connection with International Patent Application No. PCT/KR2020/002867, 10 pages.

\* cited by examiner

METHOD AND APPARATUS FOR VALID RACH OCCASION DETERMINATION IN NR UNLICENSED

CROSS-REFERENCE TO RELATED APPLICATIONS AND CLAIM OF PRIORITY

The present application claims priority to:
U.S. Provisional Patent Application No. 62/811,922, filed on Feb. 28, 2019;
U.S. Provisional Patent Application No. 62/835,866, filed on Apr. 18, 2019; and
U.S. Provisional Patent Application No. 62/888,179, filed on Aug. 16, 2019. The content of the above-identified patent document is incorporated herein by reference.

TECHNICAL FIELD

The present application relates generally to wireless communication systems, more specifically, the present disclosure relates to RACH occasion determination in NR unlicensed.

BACKGROUND

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for determination of RACH occasion in NR unlicensed.

In one embodiment, A user equipment (UE) in a wireless communication system supporting a shared spectrum channel access is provided. The UE comprises at least one transceiver configured to receive, from a base station (BS), a set of higher layer parameters. The UE further comprises at least one processor operably connected to the at least one transceiver, the at least one processor configured to: identify, from the received set of higher layer parameters, a set of synchronization signal/physical broadcast channel (SS/PBCH) blocks assumed to be transmitted by the BS, identify, from the received set of higher layer parameters, a physical random access channel (PRACH) slot including at least one random access channel occasion (RO), and determine the at least one RO as at least one valid RO based on: the at least one RO not preceding an SS/PBCH block in the PRACH slot, the at least one RO starting on at least $N_1$ symbols after a last downlink symbol in the PRACH slot, and the at least one RO starting on at least $N_2$ symbols after a last symbol of the SS/PBCH block in the PRACH slot, wherein the SS/PBCH block is included in the identified set of SS/PBCH blocks assumed to be transmitted by the BS. The at least one transceiver is further configured to transmit, to the BS, a PRACH preamble in the at least one valid RO.

In another embodiment, a base station (BS) in a wireless communication system supporting a shared spectrum channel access is provided. The BS comprises at least one processor configured to: identify a set of synchronization signal/physical broadcast channel (SS/PBCH) blocks, and identify a physical random access channel (PRACH) slot including at least one random access channel occasion (RO), wherein the at least one RO is determined, by a user equipment (UE), as at least one valid RO based on: the at least one RO not preceding an SS/PBCH block in the PRACH slot, the at least one RO starting on at least $N_1$ symbols after a last downlink symbol in the PRACH slot, and the at least one RO starting on at least $N_2$ symbols after a last symbol of the SS/PBCH block in the PRACH slot. The BS further comprises at least one transceiver operably connected to the at least one processor, the at least one transceiver configured to: transmit, to the UE, a set of higher layer parameters including the PRACH slot and the SS/PBCH block; and receive, from the UE, a PRACH preamble in the at least one valid RO, wherein the SS/PBCH block is included in the set of SS/PBCH blocks that is assumed, at the UE, to be transmitted by the BS.

In yet another embodiment, a method of a user equipment (UE) in a wireless communication system supporting a shared spectrum channel access is provided. The method comprises: receiving, from a base station (BS), a set of higher layer parameters; identifying, from the received set of higher layer parameters, a set of synchronization signal/physical broadcast channel (SS/PBCH) blocks assumed to be transmitted by the BS; identifying, from the received set of higher layer parameters, a physical random access channel (PRACH) slot including at least one random access channel occasion (RO); determining the at least one RO as at least one valid RO based on: the at least one RO not preceding an SS/PBCH block in the PRACH slot, the at least one RO starting on at least $N_1$ symbols after a last downlink symbol in the PRACH slot, and the at least one RO starting on at least $N_2$ symbols after a last symbol of the SS/PBCH block in the PRACH slot, wherein the SS/PBCH block is included in the identified set of SS/PBCH blocks assumed to be transmitted by the BS; and transmitting, to the BS, a PRACH preamble in the at least one valid RO.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 35, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.4.0, "NR; Physical channels and modulation;" 3GPP TS 38.212 v15.4.0, "NR; Multiplexing and Channel coding;" 3GPP TS 38.213 v15.4.0, "NR; Physical Layer Procedures for Control;" 3GPP TS 38.214 v15.4.0, "NR; Physical Layer Procedures for Data;" 3GPP TS 38.331 v15.4.0, "NR; Radio Resource Control (RRC) Protocol Specification;" ETSI EN 301 893 V2.1.1, "5 GHz RLAN; Harmonized Standard covering the essential requirements of article 3.2 of Directive 2014/53/EU", 2017; ETSI EN 302 567 V2.1.1, "Multiple-Gigabit/s radio equipment operating in the 60 GHz band; Harmonized Standard covering the essential requirements of article 3.2 of Directive 2014/53/EU," 2017; 3GPP TR 36.889 V13.0.0, "Study on Licensed-Assisted Access to Unlicensed Spectrum," 2015; and IEEE Std 802.11-2016, "Part 11: Wireless LAN Medium Access Control (MAC) and Physical Layer (PHY) Specifications," 2016.

Figure 1:
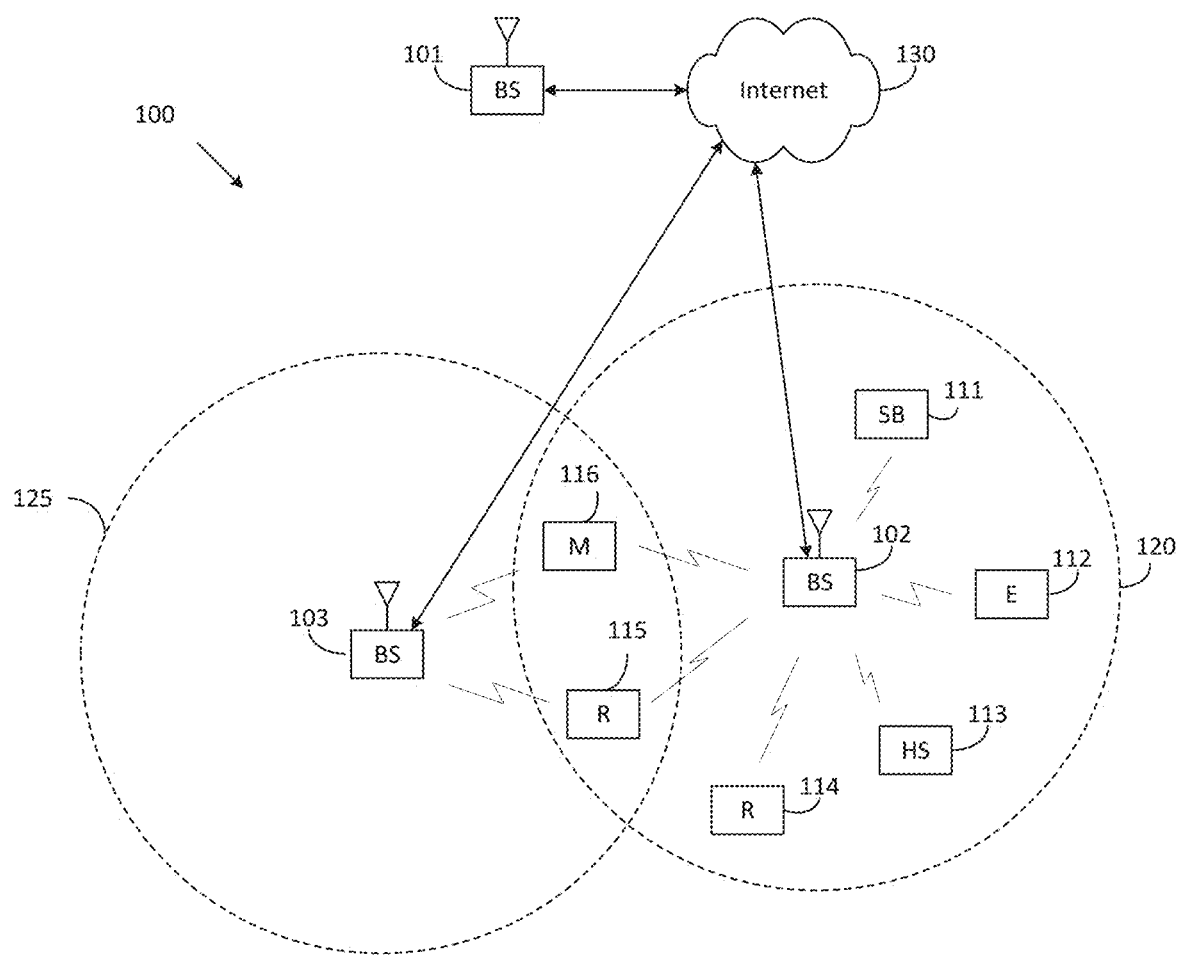
FIG. 1 illustrates an example wireless network according to embodiments of the present disclosure.
Figure 2:
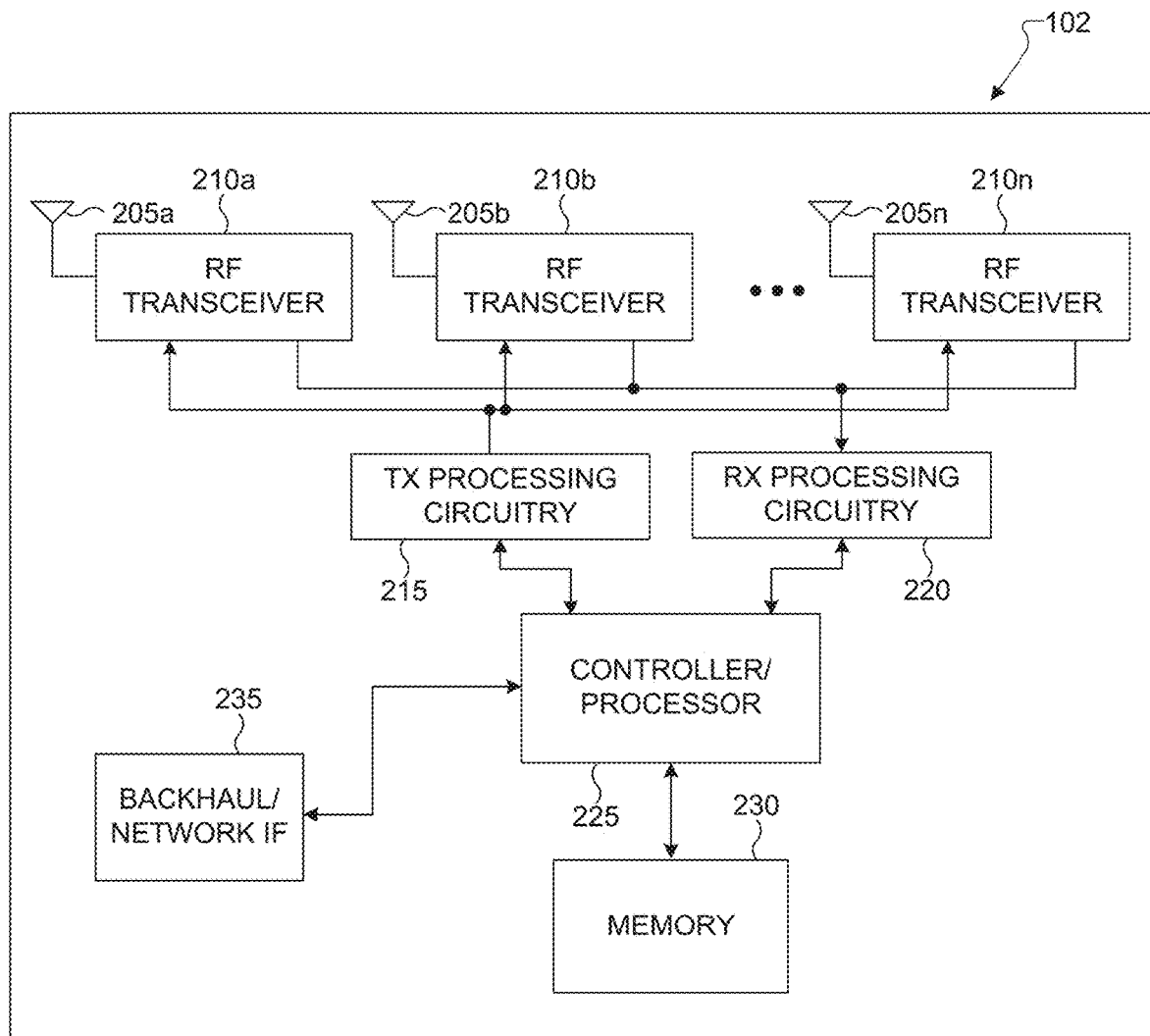
FIG. 2 illustrates an example gNB according to embodiments of the present disclosure.
Figure 3:
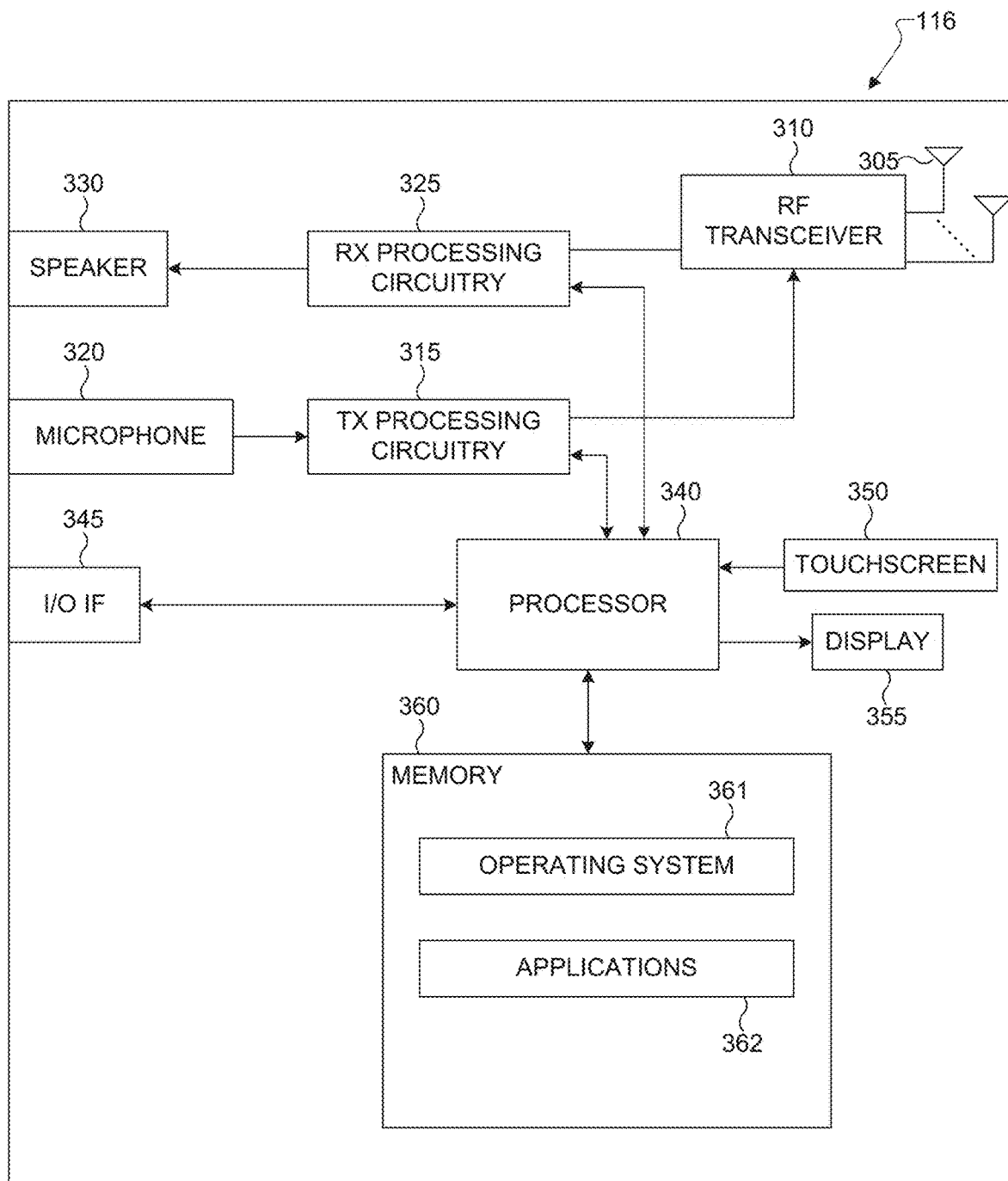
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient determination of valid RACH occasion in NR unlicensed through discovery reference signal.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
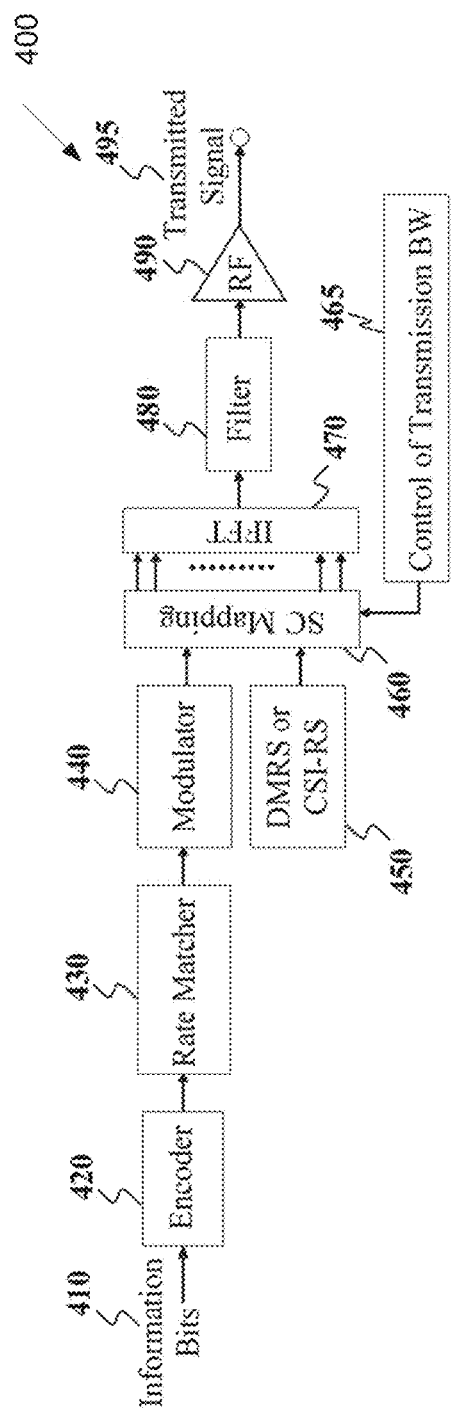
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/ frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by an radio frequency (RF) unit 495.

Figure 5:
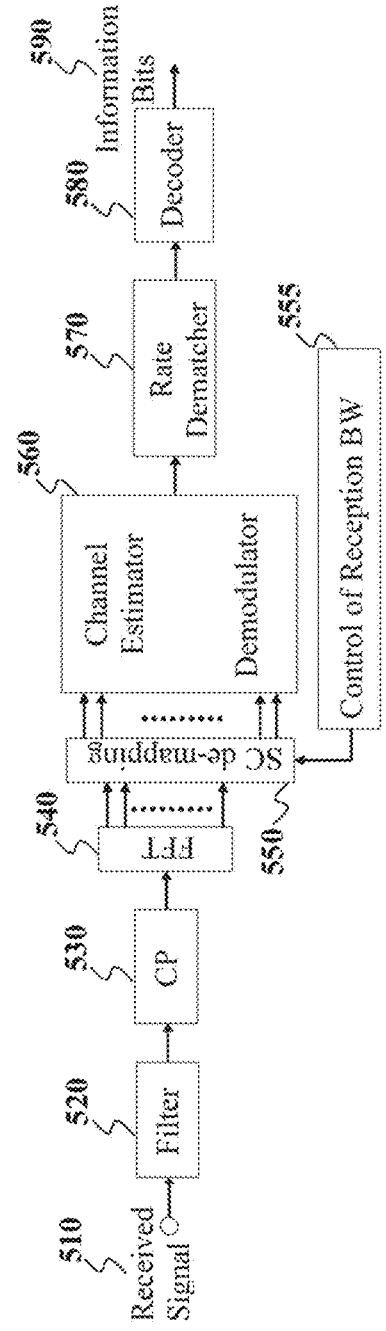
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
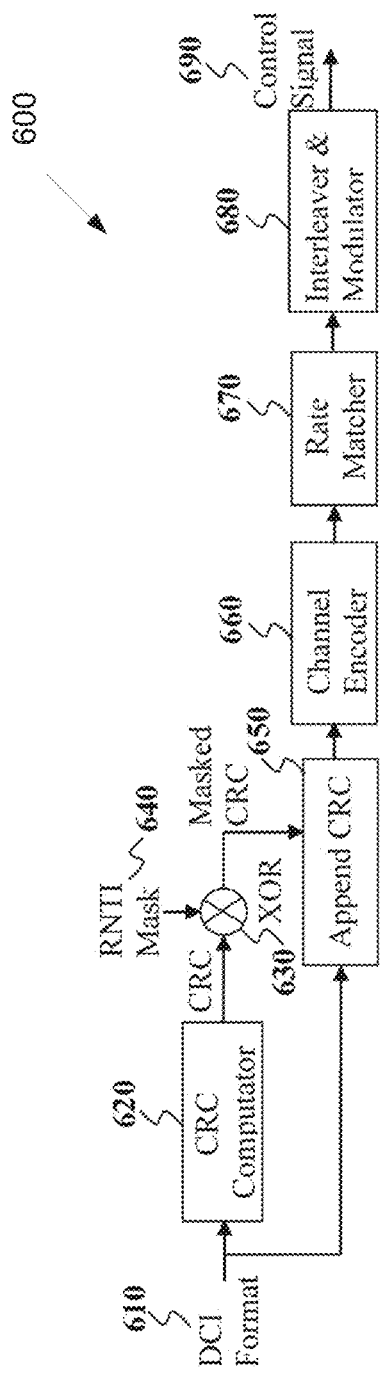
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR (0, 0)=0, XOR (0, 1)=1, XOR (1, 0)=1, XOR (1, 1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
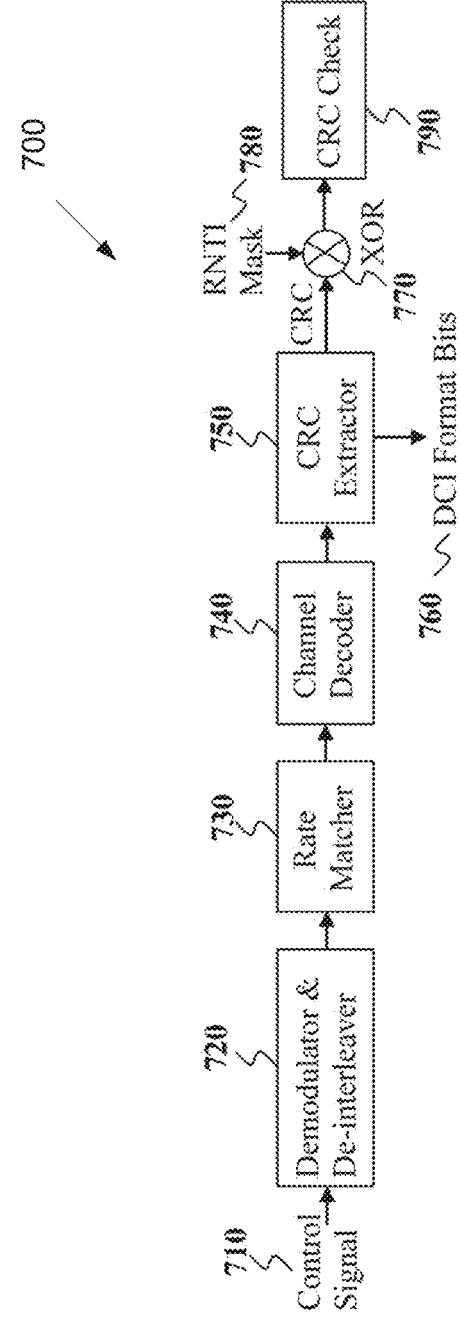
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (checksum is zero), the DCI format information bits are considered to be valid. When the CRC check does not succeed, the DCI format information bits are considered to be invalid.

Figure 8:
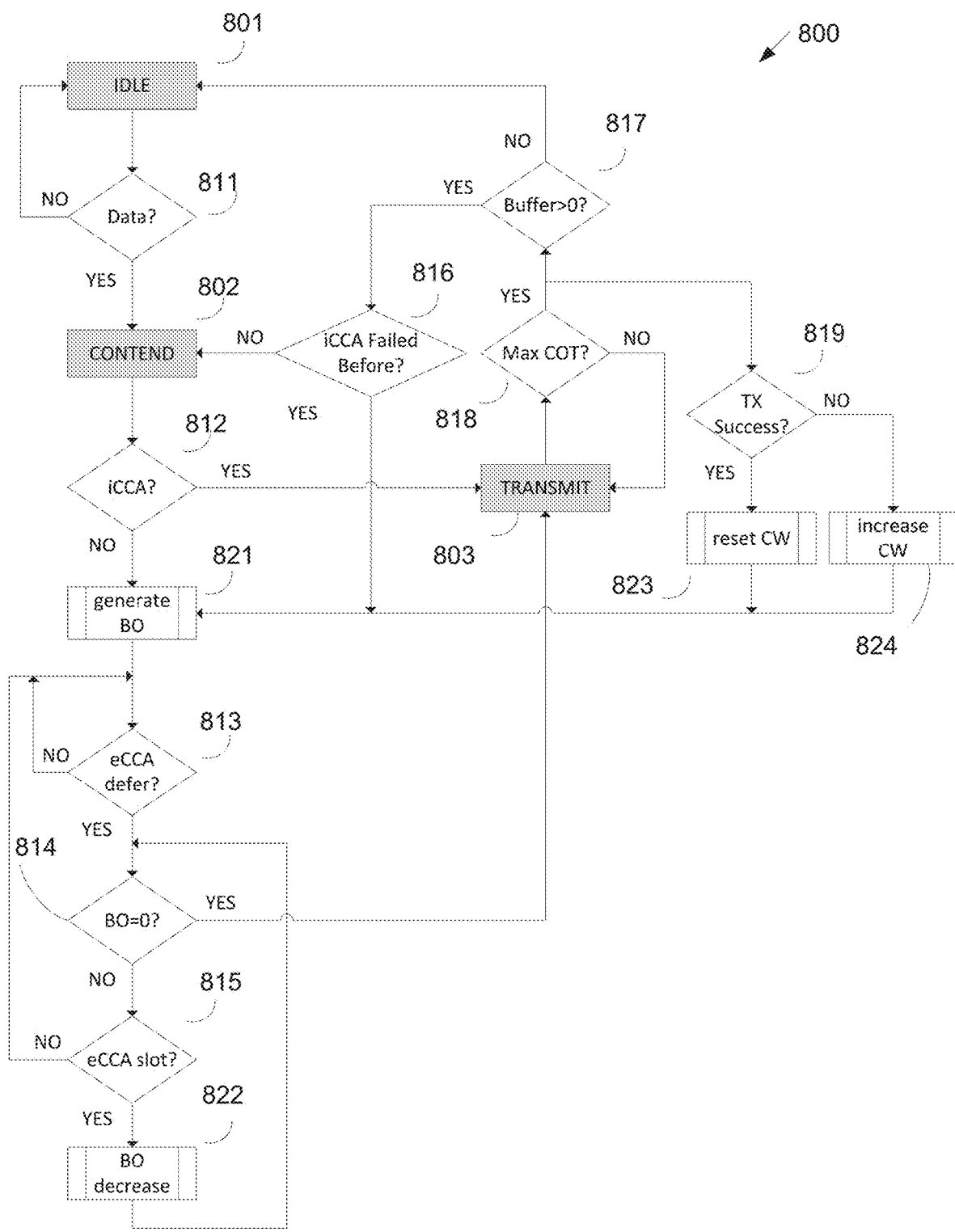
FIG. 8 illustrates an example channel access procedure according to embodiments of the present disclosure.

FIG. 8 illustrates an example channel access procedure 800 according to embodiments of the present disclosure. An embodiment of the channel access procedure 800 shown in FIG. 8 is for illustration only. FIG. 8 does not limit a scope of the present disclosure.

In 3GPP standard specification, it is agreed that the downlink transmission including physical downlink shared channel (PDSCH) on a LAA carrier follows the category 4 listen-before-talk (Cat4 LBT) procedures (a flow chart is illustrated in FIG. 8). An eNB first stays in IDLE state (801). Depending on whether there is data traffic (811) or not, the gNB transfers to CONTEND state (802) or stays in IDLE state (801), respectively. The eNB first performs initial CCA (iCCA) (812), where the eNB senses the channel the slot durations of a defer duration. If the channel is sensed as clear in the iCCA, the gNB begins to transmit (803); otherwise, the gNB generates a backoff (BO) counter (821) and perform extended CCA (eCCA). The eNB can start transmission after BO counter achieves 0 (814) as in step 4, wherein the BO counter is adjusted by sensing the channel for additional slot duration(s) according to the steps below: 1) set the BO counter (821) as a random number uniformly distributed between 0 and contention window size (CWS), and go to step 4; 2) if the counter is greater than 0, and the eNB chooses to decrement the counter, decrease the counter by 1 (822); 3) sense the channel for an additional slot duration, and if the additional slot duration is idle, go to step 4); else, go to step 5); 4) if the counter is 0 (814), stop; else, go to step 2). 5) sense the channel until either a busy slot is detected within an additional defer duration or all the slots of the additional defer duration are detected to be idle (815); 6) if the channel is sensed to be idle during all the slot durations of the additional defer duration, go to step 4); else, go to step 5).

The eNB can keep transmitting until the maximum channel occupancy is achieved (818). After the transmission, if the transmission is successful, the contention window size is reset (823); otherwise, the contention window size is increased (824). If the eNB still have data traffic after transmission (317), the eNB keeps contending the channel (802); otherwise, the eNB transfers to IDLE (801). If the eNB has not failed any iCCA before (816), the eNB can perform iCCA (812); otherwise, the gNB shall generate a BO counter (821) and perform eCCA (813).

In addition, for LTE-LAA, a DL transmission burst containing the discovery reference signal (DRS) without PDSCH can be transmitted after sensing the channel idle for a fixed observation interval of at least 25 μS and if the duration of the transmission is less than 1 ms. Such an LBT operation of fixed sensing interval is also referred to as Cat2 LBT.

In NR standard specification, each synchronization and PBCH signal block (SS/PBCH block) compromises of one symbol for PSS, two symbols for PBCH, one symbol for SSS and PBCH, where the four symbols are mapped consecutively and time division multiplexed.

For initial cell selection for NR cell, a UE assumes the default SS burst set periodicity as 20 ms, and for detecting non-standalone NR cell, a network provides one SS burst set periodicity information per frequency carrier to UE and information to derive measurement timing/duration if possible. Other than the MIB, the remaining minimum system information (RMSI) is carried by physical downlink shared channel (PDSCH) with scheduling info carried by the corresponding physical downlink control channel (PDCCH). Similar structure applies to other system information (OSI) and paging message. The control resource set (CORESET) for receiving common control channels, such as RMSI, is configured in content of PBCH.

In NR-U, the transmission of SS/PBCH blocks may also be subject to the sensing result of LBT, such that the UE cannot always expect to receive the SS/PBCH blocks periodically. To address the LBT uncertainty of SS/PBCH block transmissions in NR-U, a discovery reference signal and channel, which can be referred to as DRS for the rest of this invention, can be supported for NR-U. The DRS can contain SS/PBCH block(s), and configurable CORESET(s) and PDSCH(s) of RMSI, OSI, or paging, as well as configurable channel state indicator reference signal (CSI-RS).

In addition, for transmission of SS/PBCH blocks in NR-U DRS, a DRS transmission timing configuration (short for DTTC) method can be considered for NR-U, wherein the configuration contains a window periodicity, a window duration, and a window offset. The DRS can be subject to a single-shot LBT of fixed duration (e.g., 25 μs for FR1 NR-U).

Figure 9:
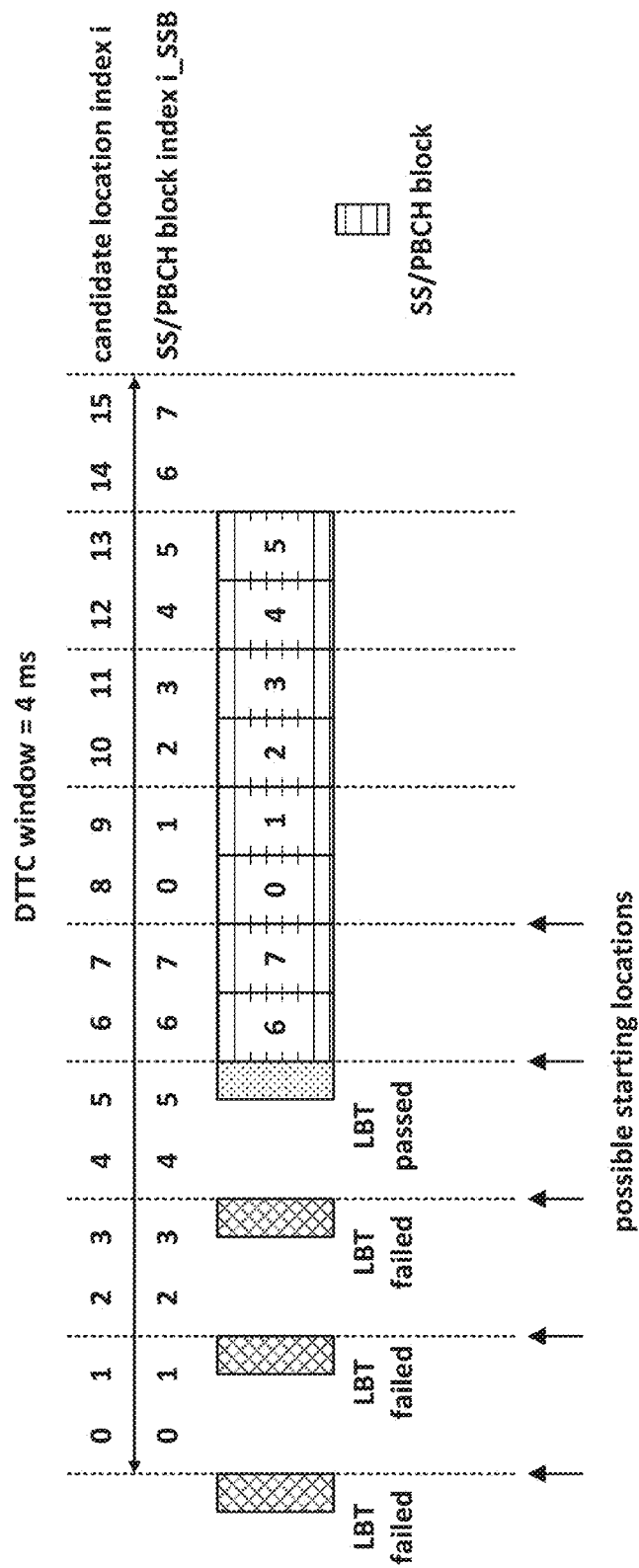
FIG. 9 illustrates an example DTTC according to embodiments of the present disclosure.

FIG. 9 illustrates an example DTTC 900 according to embodiments of the present disclosure. An embodiment of the DTTC 900 shown in FIG. 9 is for illustration only. FIG. 9 does not limit a scope of the present disclosure.

An illustration of DTTC is provided in FIG. 9, wherein the DRS transmission window duration is 4 ms; the DRS subcarrier spacing is 30 kHz; the maximum number of candidate SS/PBCH blocks within a DRS window is Y=16; the shift granularity between group of SS/PBCH blocks is 0.5 ms; the maximum number of transmitted SS/PBCH blocks is X=8; and the duration of the transmitted DRS within the window is up to 2 ms.

The candidate SS/PBCH block location index is periodically wrapping around in FIG. 9, such that the mapping between candidate SS/PBCH block location index i (e.g., i=0, 1, . . . , Y−1) to SS/PBCH block index i_SSB: i_SSB=i mod X. In an alternative to the wrap-around index mapping of SS/PBCH block index, depending on offset between the start of the DTTC window and the start of the transmitted SS/PBCH blocks, the candidate SS/PBCH block location index can be shifted within the DTTC window in an increasing order.

In NR standard specification, after detecting the SS/PBCH block, UE can obtain the configuration of time and frequency domain physical random access channel (PRACH) resources, the PRACH format and parameters for determining the PRACH preamble sequence, through the remaining system information (RMSI) or equivalently the system information block (SIB1). In addition, a UE can be provided through higher layer (e.g., via RRC) a number N of SS/PBCH blocks associated with one valid RACH occasion (RO), and UE can derive the associated RO(s) for PRACH transmission based on such association as well as the time/frequency resource configuration for PRACH.

Given the requirement of LBT, an NR-U UE is not guaranteed to have channel access to transmit PRACH at the higher-layer (e.g., RRC) configured RACH occasion, thereby potentially increasing the overall random access delay and reducing the PRACH resource utilization. To decrease the overall random access delay, an NR-U PRACH can be assigned a higher priority LBT (e.g., single-shot LBT) subject to regulation allowance, or configure additional RACH occasions besides those configured through PRACH configuration table (as illustrated in NR standard specification).

In the present disclosure, the type-0 RACH occasions and type-1 RACH occasions are used, which are defined as follows respectively: (1) Type-0 RACH occasion: type-0 ROs are the time-domain and frequency-domain resources that are configured by the higher layer (e.g., RRC) for PRACH transmissions through similar approach as in NR, wherein the time-domain resources for type-0 ROs are configured through a higher-layer parameter (e.g., prach-ConfigurationIndex) that maps to an entry in the PRACH configuration table, and the frequency resources for type-0 ROs can also be configured by higher layer parameters (e.g., msg1-FrequencyStart and msg1-FDM). Type-0 ROs are configured within a configurable subset of slots of a RACH configurable period, which may repeat across different RACH configurable periods; and (2) Type-1 ROs: type-1 ROs refer to the additionally configured ROs other than the type-0 ROs.

The present disclosure focuses on the design aspects for valid RO determination for NR-U with non-deterministic DRS location, configuration to indicate start of DRS within DTTC window, enhancement to association from SS/PBCH blocks to RACH occasions, and joint usage of CAT-2 LBT for PRACH and DRS.

The present disclosure includes several embodiments, principles, approaches and examples that can be used in conjunction or in combination with another or can operate as standalone. The embodiments/principles/approaches/examples in this disclosure can be applied to FBE-based NR-U, LBE-based NR-U, or both FBE-based and LBE-based NR-U.

In the present disclosure, FR1 NR-U refers to NR-U that operates in the unlicensed/shared bands in FR1, such as the 5 GHz unlicensed bands or the 6 GHz unlicensed/shared bands; and FR2 GHz NR-U refers to NR-U that operators in the unlicensed/shared bands in FR2, such as the 60 GHz unlicensed bands. In addition, DTTC window can also be referred to as the DRS transmission window.

In one embodiment, valid RO determination for NR-U with non-deterministic DRS location is provided. In one embodiment, the principles and approaches on valid type-0 RACH occasion determination for NR-U given the non-deterministic DRS location are provided.

A design consideration is the determination of valid type-0 RO for NR-U with DRS design. In NR, for unpaired spectrum, the validity of a type-0 RO is determined as follows: if a UE is not provided TDD-UL-DL-ConfigurationCommon, a RO in a RACH slot is valid if the UE does not precede SS/PBCH block (SSB) in the PRACH slot and starts at least $N_{gap}$ symbols after a last SSB symbol, wherein $N_{gap}$ is 2 for all short PRACH preamble formats but format B4 ($N_{gap}=0$ for format B4); and if a UE is provided TDD-UL-DL-ConfigurationCommon, then RO is valid if the RO is within UL symbols of the RACH slot, OR the RO does not precede an SSB in the RACH slot and starts at least $N_{gap}$ symbols after a last downlink symbol and at least $N_{gap}$ symbols after a last SSB transmission symbol.

Such valid RO determination is useful in determining the SSB to RO association period and in deriving the associated valid ROs of a UE. Different from the deterministic SSB positions in NR standard specification, the DRS and correspondingly the SSB positions can be non-deterministic, which can start at a finite set of starting positions within the DTTC window, e.g., as shown in FIG. 9. As a result, the valid RO determination rules for type-0 ROs in NR-U may be enhanced.

In one embodiment, if a UE is provided TDD-UL-DL-ConfigurationCommon, a type-0 RACH occasion of NR-U can be considered valid if the RO is within UL symbols; or the flexible symbols.

In one example, the number of valid type-0 RACH occasions can be increased compared to the valid RO determination rule from NR, which can increase the opportunity for PRACH transmission in NR-U given that each UE is subject to LBT to utilize the valid type-0 RO in transmitting PRACH.

In one example, for flexible symbols within the DTTC window wherein the SS/PBCH block or other DL signals/channels can be configured, the UE can utilize the RO within such flexible symbols if the UE can succeed in the LBT operation corresponding to this RO.

In one example, the aforementioned approaches also apply to when a UE is provided TDD-UL-DL-ConfigurationCommon, or is also provided higher layer parameter TDD-UL-DL-ConfigurationCommon2.

Figure 10:
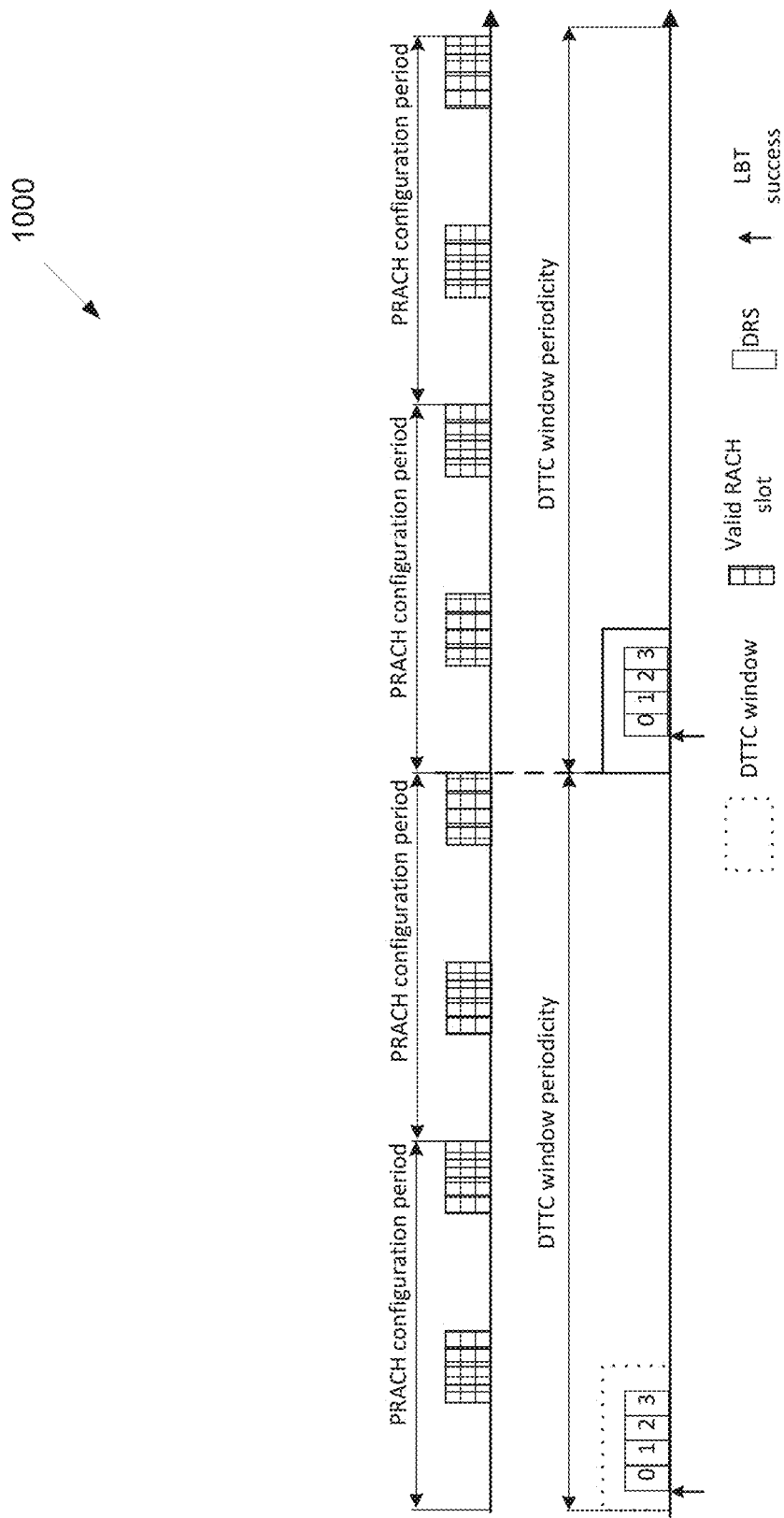
FIG. 10 illustrates an example valid RO determination according to embodiments of the present disclosure.

FIG. 10 illustrates an example valid RO determination 1000 according to embodiments of the present disclosure. An embodiment of the valid RO determination 1000 shown in FIG. 10 is for illustration only. FIG. 10 does not limit a scope of the present disclosure.

PRACH configuration period is 10 ms, and the slots of $3^{rd}$, $4^{th}$ $8^{th}$ and $9^{th}$ subframes within each PRACH configuration period are PRACH slots with PRACH of 30 kHz SCS. In addition, the DTTC window duration is 4 ms, and DTTC window periodicity is 20 ms, and DRS duration is 2 ms with 4 SS/PBCH blocks of 30 kHz SCS. In the illustration of FIG. 10, all the type-0 ROs within RACH slots are valid and can be used if corresponding UE LBT is successful.

In one example, if a UE is provided TDD-UL-DL-ConfigurationCommon, a type-0 RACH occasion of NR-U is considered valid if the RO is within UL symbols; or the start of the RACH occasion is outside the DTTC window, and all or a subset of the following constraints: the RACH occasion does not precede a SS/PBCH block in the PRACH slot; the RACH occasion does not precede a SS/PBCH block and the corresponding CORESET for RMSI and/or RMSI multiplexed with the SS/PBCH block within the PRACH slot or within the half PRACH slot that contains the SS/PBCH block; the RACH occasion does not precede a DRS in the PRACH slot; the RACH occasion does not precede a DTTC window in the PRACH slot; and/or the start of the RO is at least $N_{gap}>=0$ symbols after a last downlink symbol in the PRACH slot.

In one example, this approach can be extended to when a UE is not provided TDD-UL-DL-ConfigurationCommon, such that the PRACH occasion in a PRACH slot is valid if the PRACH occasion is outside the DTTC window, and all or a subset of the following constraints: the RACH occasion does not precede a SS/PBCH block in the PRACH slot; the RACH occasion does not precede a SS/PBCH block and the corresponding CORESET for RMSI and/or RMSI multiplexed with the SS/PBCH block within the PRACH slot or within the half PRACH slot that contains the SS/PBCH block; the RACH occasion does not precede a DRS in the PRACH slot; and/or the RACH occasion does not precede a DTTC window in the PRACH slot.

In one example, this approach applies to when a UE is provided TDD-UL-DL-ConfigurationCommon or is also provided higher layer parameter TDD-UL-DL-ConfigurationCommon2.

In one example, when NR-U supports additional SS/PBCH blocks to be configured outside the DTTC window, then the valid RO determination rule defined in the second approach of this embodiment can be extended to that the RACH occasion is valid if the RACH occasion is within UL symbols; or if the RACH occasion starts outside the DTTC window and the RACH occasion does not precede a SS/PBCH block in the PRACH slot.

In one example, the type-0 ROs configured to start within the DTTC window are always treated as invalid, and UE is not expected to utilize such type-0 ROs for PRACH transmission. In a sub-example, a UE can still transmit PRACH within the DTTC window by utilizing the type-1 ROs configured within the DTTC window. For instance, type-1 ROs can be configured through the DRS within the DTTC window for PRACH transmissions.

In one example, if the constraint for the start of the RO to be at least $N_{gap}>=0$ symbols after a last downlink symbol in the PRACH slot is used, $N_{gap}$ can be one of fixed in the specification, or can be semi-statically configured by higher layer parameter, or can be dynamically indicated by DCI.

Figure 11:
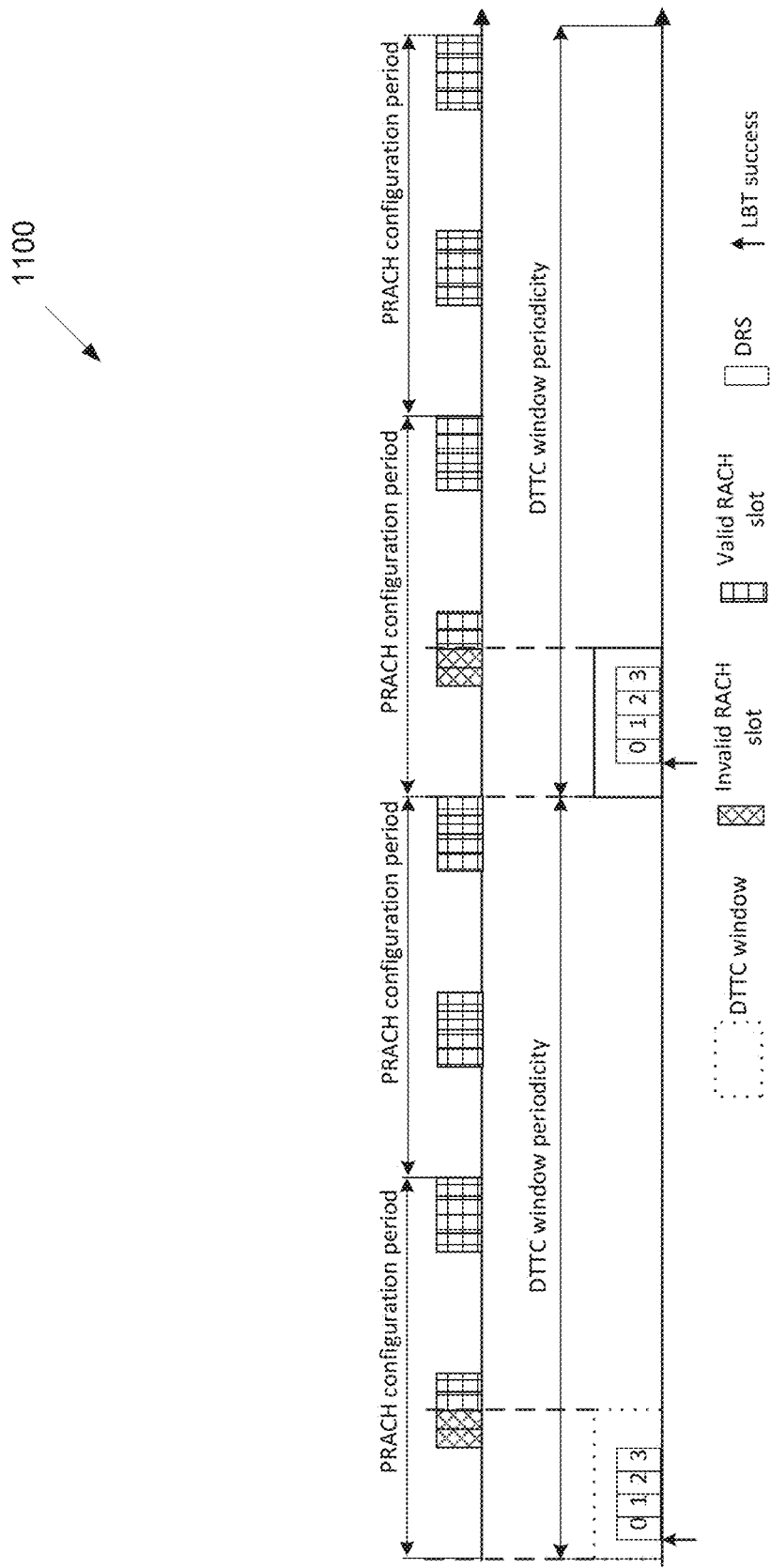
FIG. 11 illustrates another example valid RO determination according to embodiments of the present disclosure.

FIG. 11 illustrates another example valid RO determination 1100 according to embodiments of the present disclosure. An embodiment of the valid RO determination 1100 shown in FIG. 11 is for illustration only. FIG. 11 does not limit a scope of the present disclosure.

An illustration of the aforementioned embodiments is provided in FIG. 11. PRACH configuration period is 10 ms, and the slots of $3^{rd}$, $4^{th}$ $8^{th}$ and $9^{th}$ subframes within each PRACH configuration period are PRACH slots with PRACH of 30 kHz SCS. In addition, the DTTC window duration is 4 ms, and DTTC window periodicity is 20 ms, and DRS duration is 2 ms with 4 SS/PBCH blocks of 30 kHz SCS.

In the illustration of FIG. 11, all the type-0 ROs that do not overlap with the DTTC window are valid, and can be used if corresponding UE LBT is successful; while the type-0 ROs that are within the $3^{rd}$ subframe within each PRACH configuration period, which overlap with the DTTC window, are invalid.

In one embodiment, if a UE is provided TDD-UL-DL-ConfigurationCommon, a type-0 RACH occasion of NR-U is considered valid if the RO is within UL symbols; or the start of the RACH occasion is outside a DTTC window and is at least duration τ1 after the last symbol of a DTTC window, and all or a subset of the following constraints: the RACH occasion does not precede a SS/PBCH block in the PRACH slot; the RACH occasion does not precede a SS/PBCH block and the corresponding CORESET for RMSI and/or RMSI multiplexed with the SS/PBCH block within the PRACH slot or within the half PRACH slot that contains the SS/PBCH block; the RACH occasion does not precede a DRS in the PRACH slot; the RACH occasion does not precede a DTTC window in the PRACH slot; and/or the start of the RO is at least $N_{gap}>=0$ symbols after a last downlink symbol in the PRACH slot.

In one example, this approach can be extended to when a UE is not provided TDD-UL-DL-ConfigurationCommon, such that the PRACH occasion in a PRACH slot is valid if the PRACH occasion is outside the DTTC window and the RACH occasion starts at least duration τ1 after the last symbol of the DTTC window, and all or a subset of the following constraints: the RACH occasion does not precede a SS/PBCH block in the PRACH slot; the RACH occasion does not precede a SS/PBCH block and the corresponding CORESET for RMSI and/or RMSI multiplexed with the SS/PBCH block within the PRACH slot or within the half PRACH slot that contains the SS/PBCH block; the RACH occasion does not precede a DRS in the PRACH slot; and/or the RACH occasion does not precede a DTTC window in the PRACH slot.

In one example, this approach applies to when a UE is provided TDD-UL-DL-ConfigurationCommon or is also provided higher layer parameter TDD-UL-DL-ConfigurationCommon2.

In one example, when NR-U supports additional SS/PBCH blocks to be configured outside the DTTC window, then the valid RO determination rule defined in the aforementioned approach can be extended to that the RACH occasion is valid if the RACH occasion is within UL symbols; or if the RACH occasion is outside the DTTC window and the RACH occasion starts at least duration τ1 after the last symbol of the DTTC window, and the RACH occasion does not precede a SS/PBCH block in the PRACH slot.

In one example, the type-0 ROs configured to start within the DTTC window or within duration τ1 after the last symbol of the DTTC window are always treated as invalid, and UE is not expected to utilize such type-0 ROs for PRACH transmission. In a sub-example, UE can still transmit PRACH that starts within the DTTC window, or within duration τ1 after the last symbol of the DTTC window, by utilizing the type-1 ROs configured. For instance, type-1 ROs can be configured that corresponds to a transmitted SS/PBCH for PRACH transmissions.

In one example, if the constraint for the start of the RO to be at least $N_{gap}>=0$ symbols after a last downlink symbol in the PRACH slot is used, $N_{gap}$ can be one of fixed in the specification, or can be semi-statically configured by higher layer parameter, or can be dynamically indicated by DCI.

In one example, the duration τ1 can be defined in the unit from one of {OFDM symbol, NR-U slot, milliseconds}.

In one sub-example, τ1 can be chosen to be the same values as $N_{gap}$ OFDM symbols in the NR.

In another sub-example, τ1 can be configured through higher layer. For instance, through the RMSI and/or OSI.

In another sub-example, τ1 can be configured by the layer-1, which may change across different DTTC periods. For instance, τ1 can be configured by the DCI for RMSI and/or OSI.

In yet another sub-example, when additional type-1 RACH occasion(s) are allocated following the transmission of DRS, τ1 can be chosen to be the value such that the ending time-domain position of the last symbol of the type-1 RO(s) allocated through the DRS of a DTTC window comes no later than duration τ1 after the last symbol of a DTTC window. For instance, since DRS starting position within the DTTC window is non-deterministic, the UE needs to be able to detect the start of the DRS within the DTTC window; in addition, the UE needs to be able to derive (e.g., through higher layer parameter or layer-1) the time-domain configuration of the type-1 ROs allocated by the DRS, such as the duration, format, and number of ROs in time-domain.

In another sub-example, τ1 can be chosen to be the value such that the channel occupancy time (COT) ending position of the DRS after successful LBT comes no later than duration τ1 after the last symbol of a DTTC window.

In another sub-example, τ1 can be chosen to be the value that is larger than or equal to the maximum COT duration corresponding to DRS minus the DRS duration.

Figure 12:
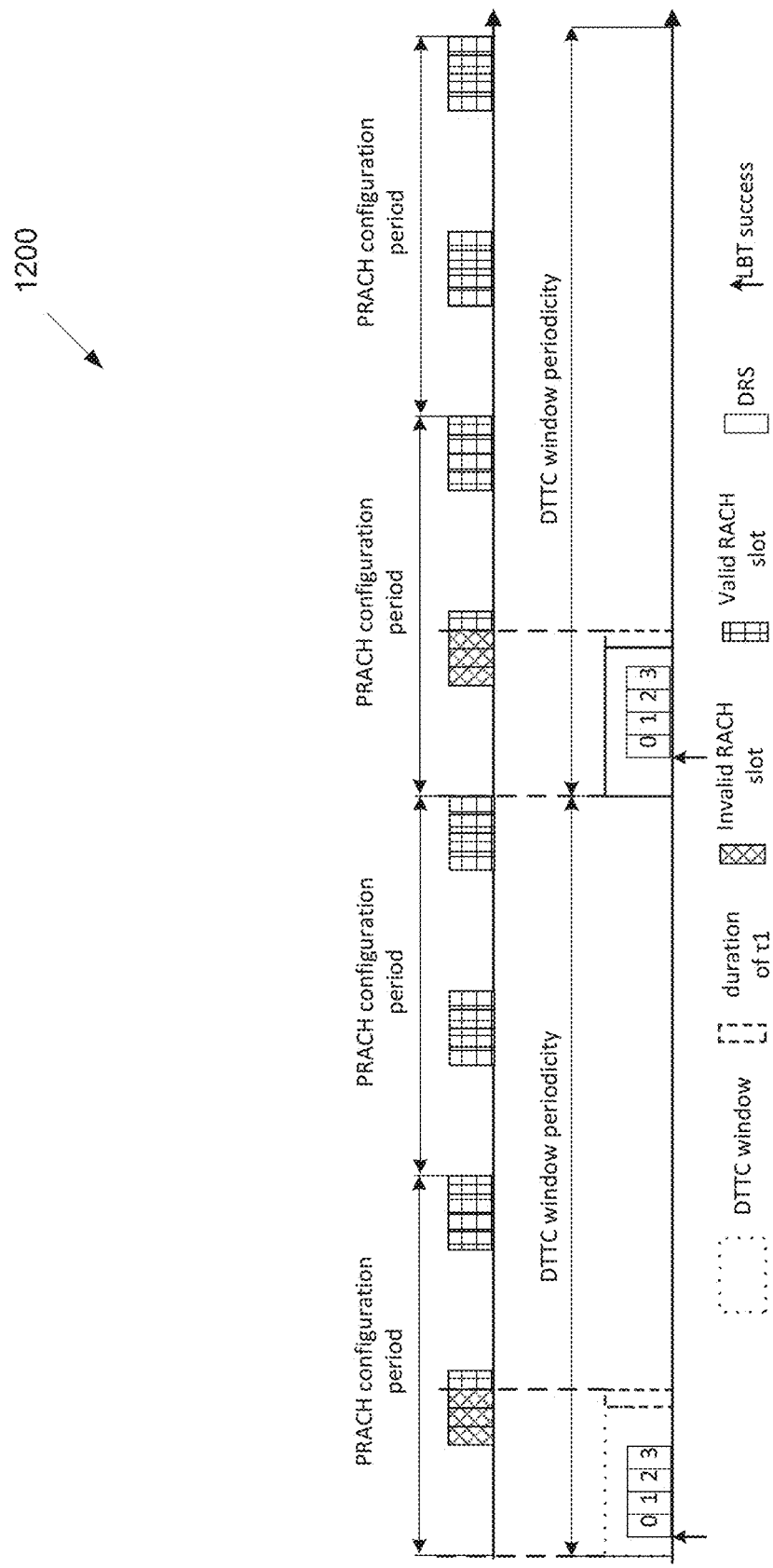
FIG. 12 illustrates yet another example valid RO determination according to embodiments of the present disclosure.

FIG. 12 illustrates yet another example valid RO determination 1200 according to embodiments of the present disclosure. An embodiment of the valid RO determination 1200 shown in FIG. 12 is for illustration only. FIG. 12 does not limit a scope of the present disclosure.

An illustration of the aforementioned embodiments is provided in FIG. 12. PRACH configuration period is 10 ms, and the slots of $3^{rd}$, $4^{th}$ $8^{th}$ and $9^{th}$ subframes within each PRACH configuration period are PRACH slots with PRACH of 30 kHz SCS. In addition, it is chosen to be a slot of 30 kHz SCS. The DTTC window duration is 4 ms, and DTTC window periodicity is 20 ms, and DRS duration is 2 ms with 4 SS/PBCH blocks of 30 kHz SCS.

In the illustration of FIG. 12, all the type-0 ROs that are not within the DTTC window and not within duration τ1 from the end of the DTTC window are valid, and can be used if the corresponding UE LBT is successful; while the type-0 ROs that are within the $3^{rd}$ subframe and the first slot of the $4^{th}$ subframe within each PRACH configuration period, which are overlapping with the DTTC window and within duration τ1 from the end of the DTTC window respectively, are invalid.

In one embodiment, if a UE is provided TDD-UL-DL-ConfigurationCommon, a type-0 RACH occasion of NR-U is considered valid if: the RO is within UL symbols; or the RACH occasion is within a DTTC window and the RACH occasion starts at least duration τ2 after the start of the DTTC window, and all or a subset of the following constraints: the RACH occasion does not precede a SS/PBCH block in the PRACH slot; the RACH occasion does not precede a SS/PBCH block and the corresponding CORESET for RMSI and/or RMSI multiplexed with the SS/PBCH block within the PRACH slot or within the half PRACH slot that contains the SS/PBCH block; the RACH occasion does not precede a DRS in the PRACH slot; the RACH occasion does not precede a DTTC window in the PRACH slot; and/or the start of the RO is at least $N_{gap}>=0$ symbols after a last downlink symbol in the PRACH slot.

In one example, this approach can be extended to when a UE is not provided TDD-UL-DL-ConfigurationCommon.

In one example, this approach applies to when a UE is provided TDD-UL-DL-ConfigurationCommon or is also provided higher layer parameter TDD-UL-DL-ConfigurationCommon2.

In one example, when NR-U supports additional SS/PBCH blocks to be configured outside the DTTC window, then the valid RO determination rule defined in the aforementioned approach can be extended to that the RACH occasion of is valid if is within UL symbols; or the RACH occasion is within a DTTC window and the RACH occasion starts at least duration τ2 after the start of the DTTC window; or the RACH occasion does not precede a SS/PBCH block in the PRACH slot.

In one example, the duration τ2 can be defined in the unit from one of {OFDM symbol, NR-U slot, milliseconds}. In one sub-example, τ2 can be chosen to be the DRS duration. In another sub-example, the duration τ2 can be chosen to be the DRS duration plus an integer multiple of the shifting granularity between group of SS/PBCH blocks within the DTTC window.

In one example, if the constraint for the start of the RO to be at least $N_{gap}>=0$ symbols after a last downlink symbol in the PRACH slot is used, $N_{gap}$ can be one of fixed in the specification, or can be semi-statically configured by higher layer parameter, or can be dynamically indicated by DCI.

Figure 13:
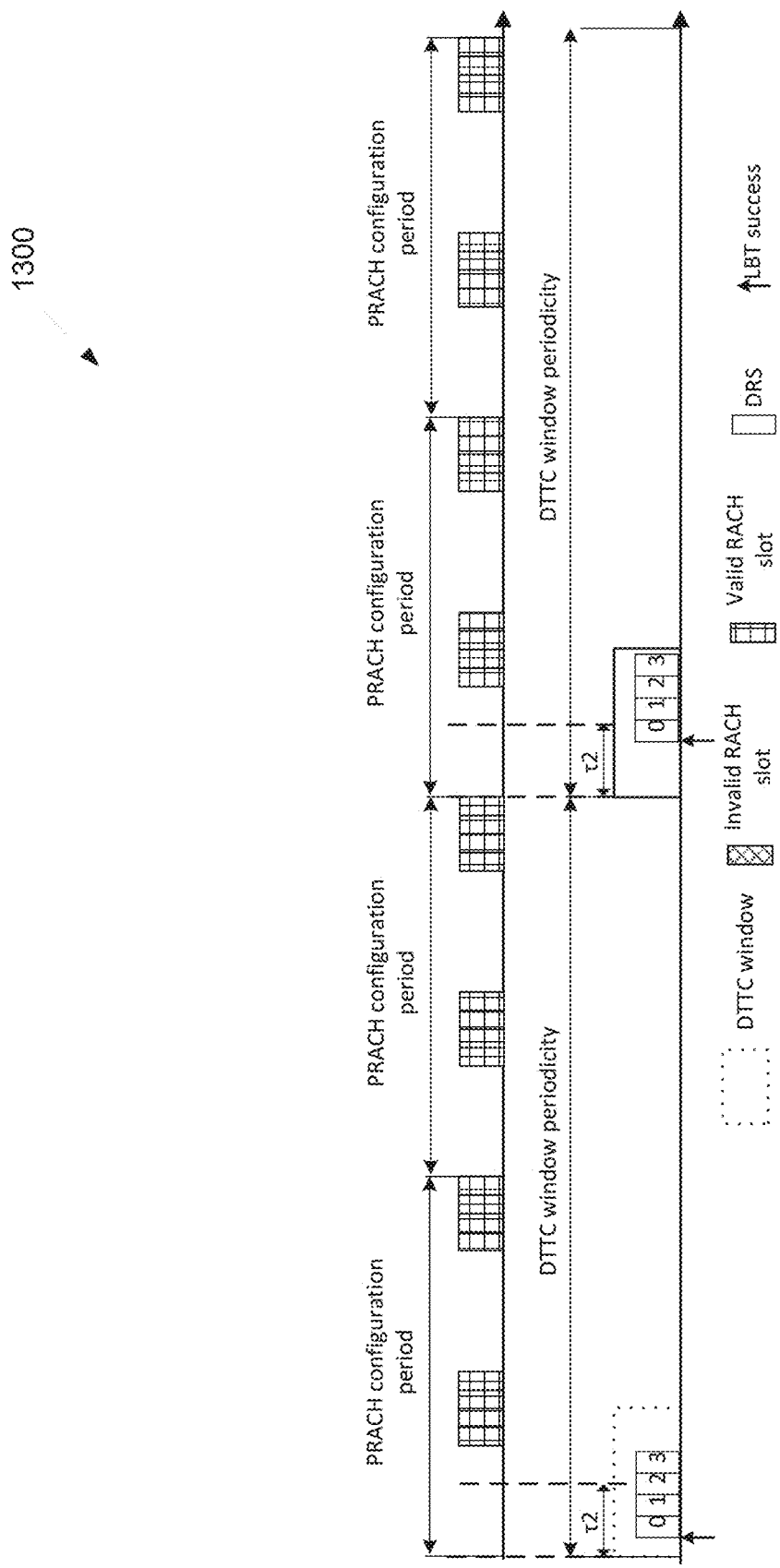
FIG. 13 illustrates yet another example valid RO determination according to embodiments of the present disclosure.

FIG. 13 illustrates yet another example valid RO determination 1300 according to embodiments of the present disclosure. An embodiment of the valid RO determination 1300 shown in FIG. 13 is for illustration only. FIG. 13 does not limit a scope of the present disclosure.

An illustration of the aforementioned embodiments is provided in FIG. 13. PRACH configuration period is 10 ms, and the slots of 3rd, 4$^{th}$ 8$^{th}$ and 9$^{th}$ subframes within each PRACH configuration period are PRACH slots with PRACH of 30 kHz SCS. In addition, τ2 is chosen to be 2 ms, or 4 NR-U slots of 30 kHz SCS. The DTTC window duration is 4 ms, and DTTC window periodicity is 20 ms, and DRS duration is 2 ms with 4 SS/PBCH blocks of 30 kHz SCS. In the illustration of FIG. 13, all the type-0 ROs that are not within duration τ2 from the beginning of the DTTC window are valid and can be used if the corresponding UE LBT is successful.

In one embodiment, if a UE is provided TDD-UL-DL-ConfigurationCommon, a type-0 RACH occasion of NR-U is considered valid following if: the RO is within UL symbols; or the RO does not precede an SSB in the RACH slot and starts at least duration τ3 after a last downlink symbol and one of the following options: at least duration τ3 after a last SSB transmission symbol; at least duration τ3 after a last symbol of SSB and corresponding CORESET for RMSI and/or RMSI PDSCH and/or CSI-RS multiplexed with the SS/PBCH block within the PRACH slot or within the half PRACH slot that contains the SS/PBCH block; or at least duration τ3 after a last DRS transmission symbol.

In one example, this approach can be extended to when a UE is not provided TDD-UL-DL-ConfigurationCommon.

In one example, this approach applies to when a UE is provided TDD-UL-DL-ConfigurationCommon or is also provided higher layer parameter TDD-UL-DL-ConfigurationCommon2.

In one example, the duration τ3 can be defined in the unit from one of {OFDM symbol, NR-U slot, milliseconds}. In one sub-example, τ3 can be chosen to be 0. In another sub-example, τ3 can be chosen to be the same values as $N_{gap}$ OFDM symbols in NR standard specification.

In another sub-example, τ3 can be chosen to be the value that is larger than or equal to the COT duration corresponding to DRS, minus the DRS duration; such that valid type-0 ROs are outside the COT of the DRS.

In another sub-example, τ3 can be configured through higher layer. For instance, through the RMSI and/or OSI.

In another sub-example, τ3 can be configured by the layer-1, which may change across different DTTC periods. For instance, τ3 can be configured by the DCI for RMSI and/or OSI.

In one example, the number of valid ROs within the DTTC window period depends on the starting position of the DRS, and UE needs to be able to detect the start of the DRS within a DTTC window to determine the valid type-0 ROs within the DTTC window. The configuration for UE to detect start of DRS within a DTTC window is detailed in the aforementioned approach.

Figure 14:
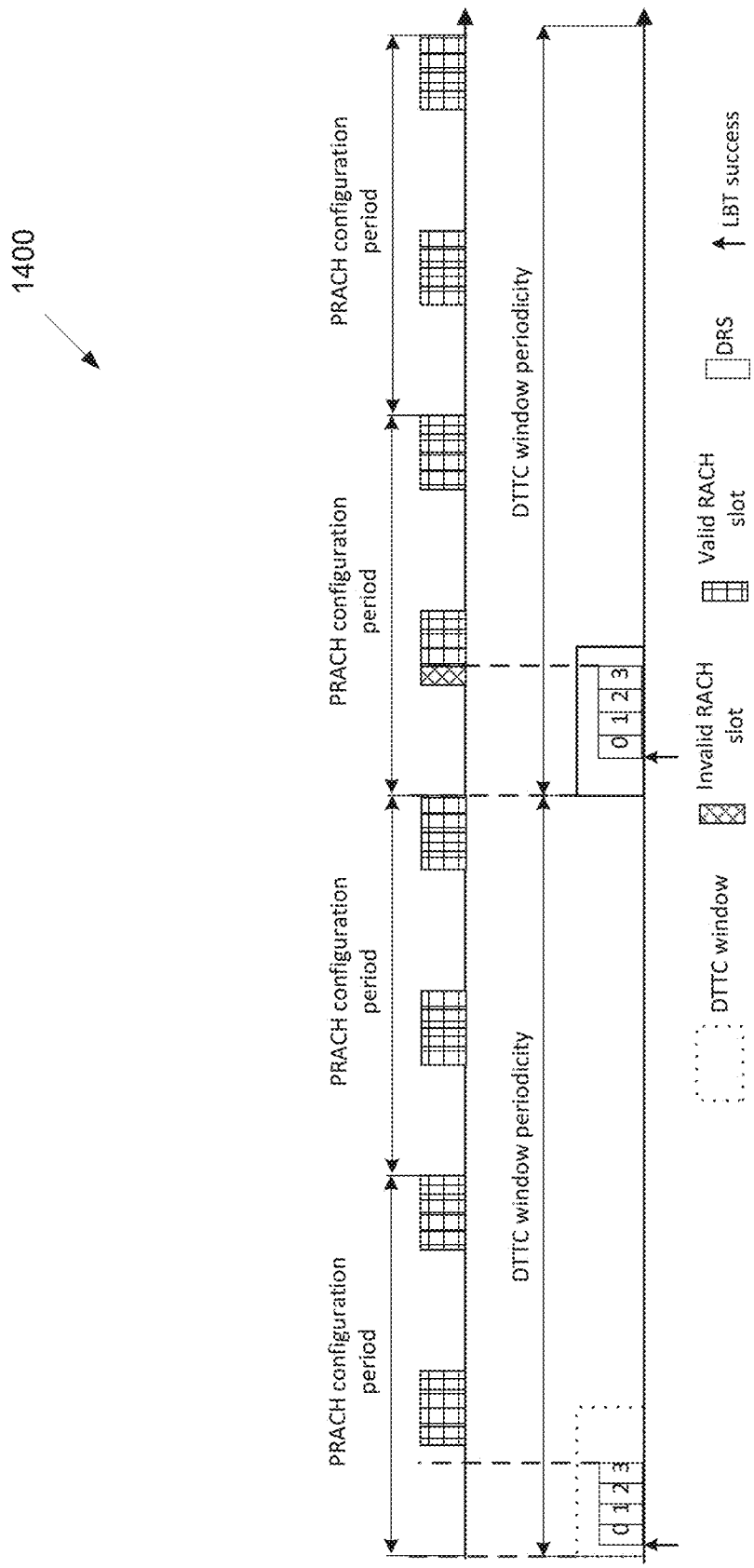
FIG. 14 illustrates yet another example valid RO determination according to embodiments of the present disclosure.

FIG. 14 illustrates yet another example valid RO determination 1400 according to embodiments of the present disclosure. An embodiment of the valid RO determination 1400 shown in FIG. 14 is for illustration only. FIG. 14 does not limit a scope of the present disclosure.

As illustrated in FIG. 14, PRACH configuration period is 10 ms, and the slots of 3$^{rd}$, 4$^{th}$ 8$^{th}$ and 9$^{th}$ subframes within each PRACH configuration period are PRACH slots with PRACH of 30 kHz SCS.

In the illustration of FIG. 14, τ3 is 0, and all the type-0 ROs that start at least duration τ3 after a last downlink symbol and at least duration τ3 after a last SSB transmission symbol of the DTTC window are valid, and can be used if the corresponding UE LBT is successful. Due to the non-deterministic starting position of DRS within DTTC window, the valid ROs is also non-deterministic across different PRACH configuration periods that overlap with the DTTC window, as is the case in the example of FIG. 14.

In one embodiment, if a UE is provided TDD-UL-DL-ConfigurationCommon, a type-0 RACH occasion of NR-U is considered valid if the RO is within UL symbols; or the RO does not precede a DRS unit in a PRACH slot, and the RO starts at least N1 symbols after a last downlink symbol and at least N2 symbols after a last DRS unit symbol in the PRACH slot.

In one example, a DRS unit can be an SS/PBCH block. In one example, a DRS unit can be an actually transmitted SS/PBCH block.

In one example, a DRS unit can be a potential actually transmitted SS/PBCH block, wherein the potential actually transmitted SS/PBCH block refers to an SS/PBCH block position that belongs to the union of all actually transmitted SS/PBCH block positions for every possible outcome of the LBT process in order to transmit the SS/PBCH blocks within the DRS.

Figure 15:
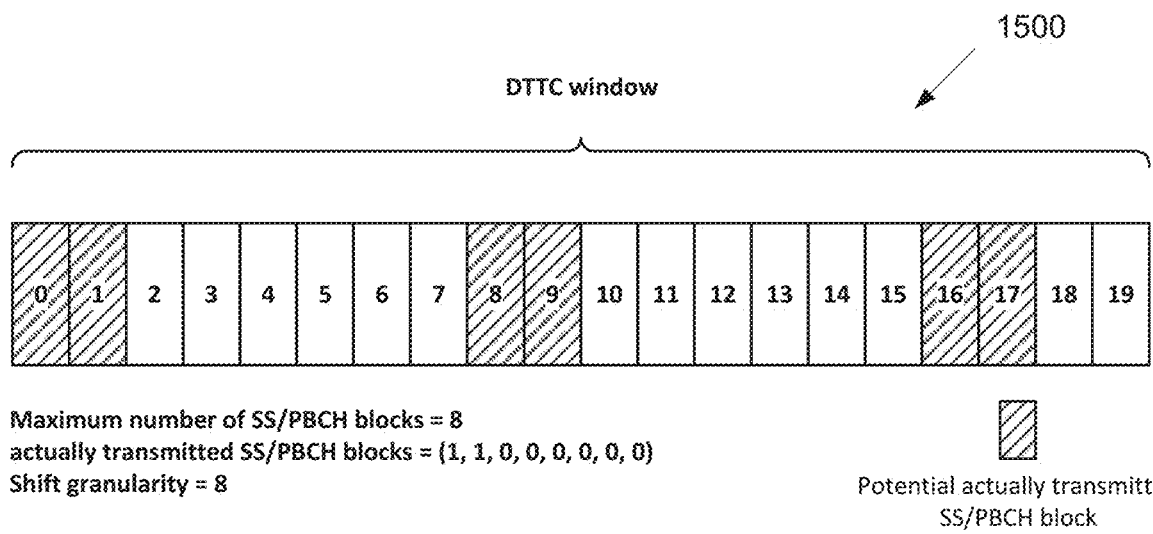
FIG. 15 illustrates an example potential actually transmitted SS/PBCH block according to embodiments of the present disclosure.

FIG. 15 illustrates an example potential actually transmitted SS/PBCH block 1500 according to embodiments of the present disclosure. An embodiment of the potential actually transmitted SS/PBCH block 1500 shown in FIG. 15 is for illustration only. FIG. 15 does not limit a scope of the present disclosure.

An illustration of the potential actually transmitted SS/PBCH block is provided in FIG. 15, wherein among the maximum 8 SSBs, the first 2 SSBs are configured to be actually transmitted SSBs. But since LBT can be finished in a non-deterministic time, a shift granularity of 8 SSBs is adopted, which means that actually transmitted SSBs can potentially be transmitted in {0, 1}, {8, 9}, or {16, 17} depending on when LBT completes. As a result, the potentially transmitted SS/PBCH block is {0, 1, 8, 9, 16, 17}.

In one example, a DRS unit can be one of the SS/PBCH block, actually transmitted SS/PBCH block, or potential actually transmitted SS/PBCH (defined according to the aforementioned examples and embodiments), and multiplexed in time domain and frequency domain with corresponding CORESET for RMSI and/or RMSI PDSCH and/or CSI-RS within the half PRACH slot or within the PRACH slot that contains the SSB/actually transmitted SSB/potential actually transmitted SSB.

Figure 16A:
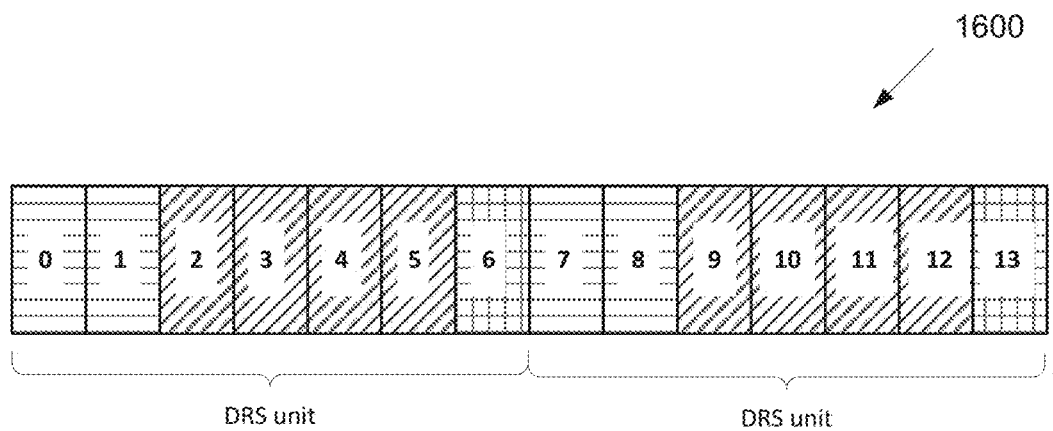
FIG. 16A illustrates an example DRS unit according to embodiments of the present disclosure.

FIG. 16A illustrates an example DRS unit 1600 according to embodiments of the present disclosure. An embodiment of the DRS unit 1600 shown in FIG. 16A is for illustration only. FIG. 16A does not limit a scope of the present disclosure.

An illustration of a DRS unit is provided in FIG. 16A, wherein symbol #0 and #1 can contain CORESET, symbol #2 to #5 contain SSB and also RMSI PDSCH FDM'ed with SSB, and symbol #6 contains RMSI PDSCH.

Figure 16B:
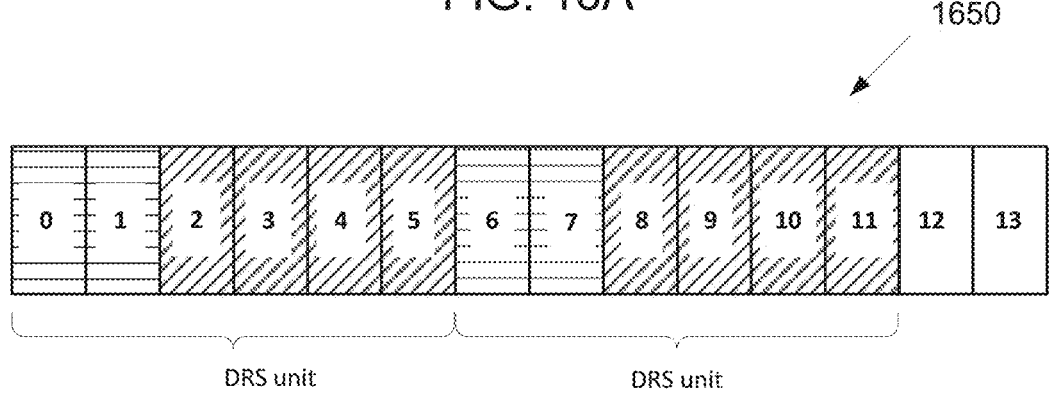
FIG. 16B illustrates another example DRS unit according to embodiments of the present disclosure.

FIG. 16B illustrates another example DRS unit 1650 according to embodiments of the present disclosure. An embodiment of the DRS unit 1650 shown in FIG. 16B is for illustration only. FIG. 16B does not limit a scope of the present disclosure.

Another illustration is provided in FIG. 16B, wherein symbol #0 and #1 can contain CORESET, symbol #2 to #5 contain SSB and also RMSI PDSCH FDM'ed with SSB.

In one example, this approach can be extended to when a UE is not provided TDD-UL-DL-ConfigurationCommon.

In one example, this approach applies to when a UE is provided TDD-UL-DL-ConfigurationCommon or is also provided higher layer parameter TDD-UL-DL-ConfigurationCommon2.

In one example, the duration N1/N2 can be defined in the unit from one of {OFDM symbol, NR-U slot, milliseconds}. In one sub-example, N1/N2 can be chosen to be 0. In another sub-example, N1/N2 can be chosen to be the same values as $N_{gap}$ OFDM symbols in the NR standard specification.

In another sub-example, N1/N2 can be chosen to be the value that is larger than or equal to the COT duration corresponding to DRS, minus the DRS duration; such that valid type-0 ROs are outside the COT of the DRS.

In another sub-example, N1/N2 can be configured through higher layer. For instance, through the RMSI and/or OSI.

In another sub-example, N1/N2 can be configured by the layer-1, which may change across different DTTC periods. For instance, N1/N2 can be configured by the DCI for RMSI and/or OSI.

In one embodiment, one of the valid RO determination rules from the aforementioned approaches can be fixed by the specification as the valid RO determination rule.

In one embodiment, more than one of the valid RO determination rules from the aforementioned approaches can be supported.

In one example, the valid RO determination rule is up to network decision, and the valid RO determination rule can be indicated to the UE through one of the layer-1 signaling or higher layer parameter (e.g., RRC parameter).

In one example, the valid RO determination rule can be up to UE decision.

In one example, a common rule in selecting the valid RO determination rule from the aforementioned approaches can be supported by both network and UE. For instance, the common rule can depend on the DTTC window duration D, such that the aforementioned approach can be chosen when D is smaller than or equal to a certain threshold, while the aforementioned approach can be chosen when D is larger than the threshold.

In one embodiment, configuration to indicate start of DRS within DTTC window is provided. In one embodiment, the indication of the start of DRS within DTTC window to the UE is provided.

Since DRS can only be transmitted after corresponding LBT is successful, another important design consideration is how to indicate the start of DRS within the DTTC window, or equivalently the offset from the start of the DTTC window to the staring position of DRS. In addition, since there can be a fixed shifting granularity between group of SS/PBCH blocks and correspondingly a finite number of possible DRS starting locations within the DRS, the offset from the start of DTTC window to the start of DRS can indicated by finite a number of n (n>=1) bits.

For example, in the instance of FIG. 9 wherein the shifting granularity is 1 slot of 30 kHz SCS, there can be 5 possible DRS starting locations and thus n=3 bits are needed to indicate. Indication of the starting offset of DRS can facilitate the UE to determine the valid type-0 ROs as detailed in Embodiment 1, or to determine the type-1 ROs that are allocated by the DRS in Embodiment 2. The following approaches in this embodiment can enable the UE to determine the offset from the start of the DTTC window to the start of the DRS, after the UE has detected the SS/PBCH block, and possibly the corresponding RMSI or other system information.

In one embodiment, the offset from the start of DTTC window to the start of DRS can be indicated through the demodulation reference signal (DM-RS) of the PBCH.

In one example, the additional information to indicate the offset from the start of the DTTC window to the start of DRS can be indicated through enhancing the initialization to the scrambling sequence generator similar to NR. For instance, when the number of bits n to indicate the offset from the start of DTTC window to the start of DRS is less than or equal to 3, the scrambling sequence generator can be initialized at the start of each SS/PBCH block occasion as follows:

$$c_{init} = 2^{11}(i_{SSB}+1)\left(\left\lfloor\frac{N_{ID}^{cell}}{4}\right\rfloor+1\right) + 2^6(i_{SSB}+1) + 2^2(i_{offset}+1) + (N_{ID}^{cell} \bmod 4),$$

wherein $i_{SSB}$ and $N_{ID}^{cell}$ follow same definition as in 3GPP 38.211 [1], while $i_{offset}$ represents the index for the possible offset from the start of the DRS window to the DRS, or equivalently the starting location of the DRS.

In one embodiment, the offset from the start of DTTC window to the start of DRS can be indicated through the PBCH. In one example, the offset information can be indicated by adding additional bit(s) into the PBCH, in addition to the existing information carried in PBCH. For instance, this example indicates the payload size of PBCH may be increased by the number of bits that may be carried in PBCH to indicate the offset. In another example, the offset information or at least part of the offset information can be indicated through the reserved bits in the existing PBCH payload of NR standard specification.

For instance, the two reserved bits $\bar{\alpha}_{\bar{A}+6}$ and $\bar{\alpha}_{\bar{A}+7}$ in generating additional timing related PBCH payload of NR can be utilized to indicate up to 2 bits information of the offset for FR1 NR-U DRS.

In another example, the offset information or at least part of the offset information can be indicated through re-interpreting some existing PBCH payload of NR.

In one example, the offset from the start of DTTC window to the start of DRS can be indicated through the downlink control information (DCI). In one example, the offset information can be indicated through DCI format 1_0 with the CRC scrambled by the SI-RNTI. Specifically, the information needed to indicate the offset can be carried in the reserved bits of NR standard specification.

For instance, the DCI format 1_0 that schedules the remaining system information (RMSI) or equivalently the system information block 1 (SIB1) can be used in carrying the information of the offset.

In one example, the offset from the start of DTTC window to the start of DRS can be indicated through RMSI or equivalently the SIB1.

In one example, the offset from the start of DTTC window to the start of DRS can be indicated through other system information (OSI), or equivalently one of the system information blocks other than SIB1.

In one example, all the information required to indicate the offset from the DTTC window to the start of DRS can be transmitted in only one of the aforementioned embodiments and examples.

In one example, the information required to indicate the offset from the DTTC window to the start of DRS can be transmitted through more than one of the aforementioned embodiments and examples.

In one example, partial information to indicate the offset can be carried using the aforementioned embodiments, while the remaining information to indicate the offset can be carried through the aforementioned embodiments.

The valid RO determination rule from the aforementioned embodiments can lead to potential enhancements in defining association period from SS/PBCH blocks to valid type-0 ROs.

In one example, for a given mapping order of SS/PBCH block indexes to valid type-0 ROs and the number of SS/PBCH blocks associated with one valid type-0 RO, the association period for mapping SS/PBCH blocks to valid type-0 ROs, starting from frame 0, can follow similar rule as in NR; i.e., within a configurable set of supported association periods at a given PRACH configuration period, the association period is the smallest value in the set such that all the actually transmitted SS/PBCH blocks are mapped at least once to the valid ROs within the association period.

In one instance, the mapping order of SS/PBCH blocks to valid ROs can be enhanced from NR. For instance, the mapping order can be enhanced for each SS/PBCH block to be associated with multiple type-0 ROs in time-domain; or the mapping order can be enhanced according to the potential new frequency resource allocation of NR-U PRACH.

In one instance, the configurable set of supported association periods at a given PRACH configuration period can be enhanced from NR, such that at a given PRACH configuration period, different association period or equivalently different number of PRACH configuration periods from NR can be supported for SS/PBCH block to valid type-0 RO mapping. In one sub-example, different PRACH configuration period from NR can also be supported. For instance, mapping between PRACH configuration period and SS/PBCH block to PRACH association period can be enhanced according to TABLE 1.

TABLE 1

Mapping between PRACH configuration period and SS/PBCH block

| PRACH configuration period (msec) | Association period (number of PRACH configuration periods) |
|---|---|
| 10 | {1, 2, 4, 8, 16, 32} |
| 20 | {1, 2, 4, 8, 16} |
| 40 | {1, 2, 4, 8} |
| 80 | {1, 2, 4} |
| 160 | {1, 2} |
| 320 | {1} |

In one example, if after an integer number of SS/PBCH block to type-0 RO mapping cycles within the association period, there is a set of leftover type-0 ROs that are not mapped to the actually transmitted SS/PBCH blocks, such leftover type-0 ROs can still be used for PRACH transmission.

In one sub-example, the same SS/PBCH block to type-0 RO mapping rule and number of SSB per RACH occasion used in the aforementioned approach can be used to map the leftover type-0 ROs.

In another sub-example, the mapping from SS/PBCH blocks to leftover type-0 ROs can be enhanced such that all SS/PBCH blocks can be mapped to the leftover type-0 ROs at least once.

In another sub-example, the mapping rule and/or number of SSB per RACH occasion from SS/PBCH blocks to leftover type-0 ROs can be enhanced such that the SS/PBCH blocks can be divided into N (N>=1) subsets, and UEs associated with the i-th (0<=i<=N−1) subset of SS/PBCH blocks can be mapped to the leftover ROs in association period n, and the UEs associated with the ((i+1) mod N)-th (0<=i<=N−1) subset of SS/PBCH blocks can be mapped to the leftover ROs in association period n+1.

In one example, an association pattern period can be defined which includes one or more association periods and is determined so that a pattern between PRACH occasions and SS/PBCH blocks repeats at most every M msec.

In one sub-example, M can be 160 as in NR. In another sub-example, M can be enhanced to be other values, such as 320.

In another sub-example, type-0 ROs not associated with SS/PBCH blocks after an integer number of association periods, if any, can be enhanced to being able to be used for PRACH transmissions according to one of the sub-examples in the aforementioned examples and embodiments.

Figure 17:
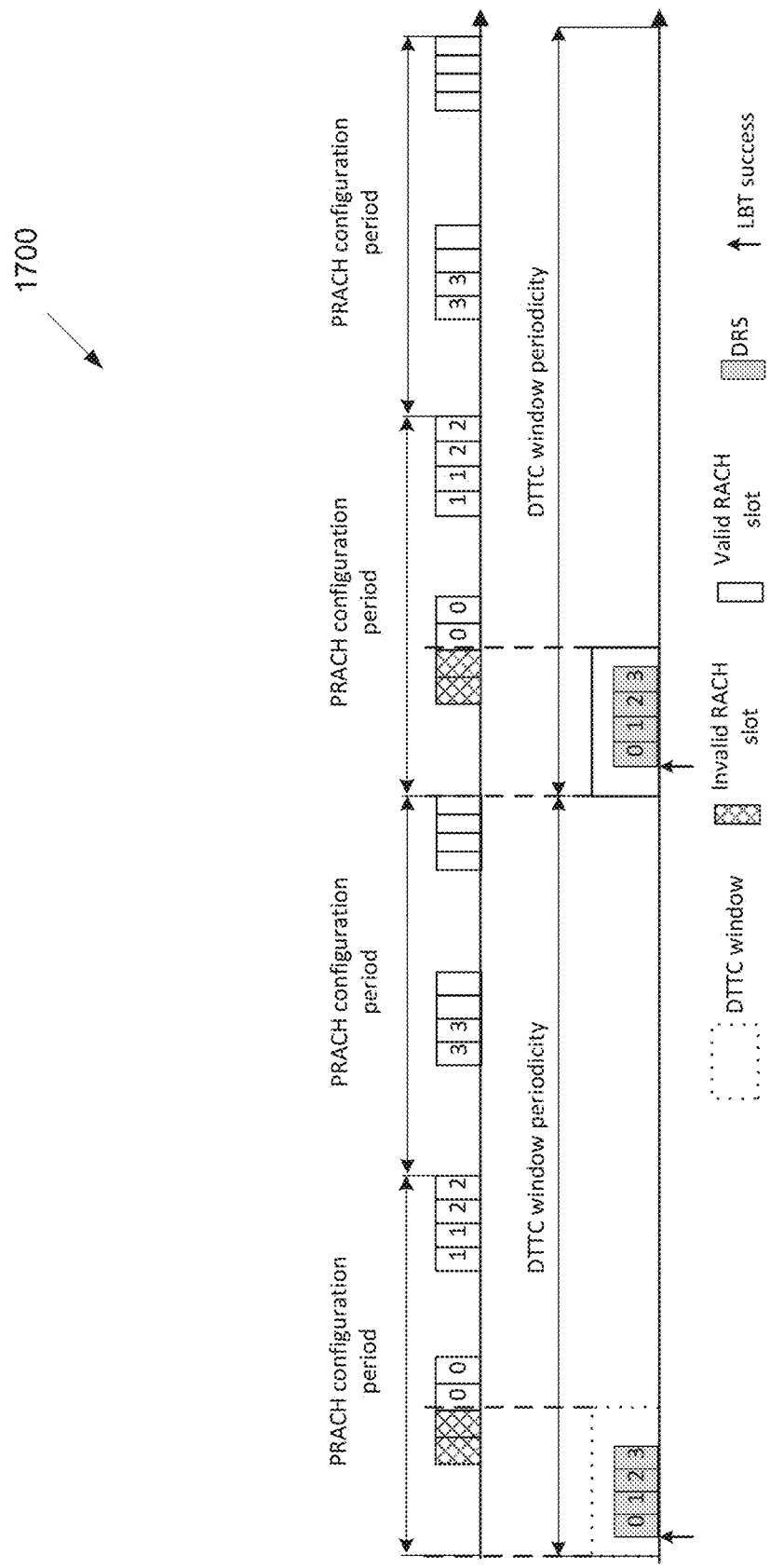
FIG. 17 illustrates yet another example valid RO determination according to embodiments of the present disclosure.

As illustrated in FIG. 17, the valid RO determination rule is chosen according to the aforementioned approaches and embodiments. In particular, each RACH slot in FIG. 17 includes 2 ROs, the number of FDM'ed ROs is 1, and each SS/PBCH block is associated with 4 ROs. The index in each RACH slot (i.e., 0, 1, 2, 3) represents the associated SS/PBCH block index for the ROs within the RACH slot. In the example of FIG. 17, the association period is 2 PRACH configuration periods; and there exists leftover ROs in an association period, which can be utilized by following the examples.

FIG. 17 illustrates yet another example valid RO determination 1700 according to embodiments of the present disclosure. An embodiment of the valid RO determination 1700 shown in FIG. 17 is for illustration only. FIG. 17 does not limit a scope of the present disclosure.

Figure 18:
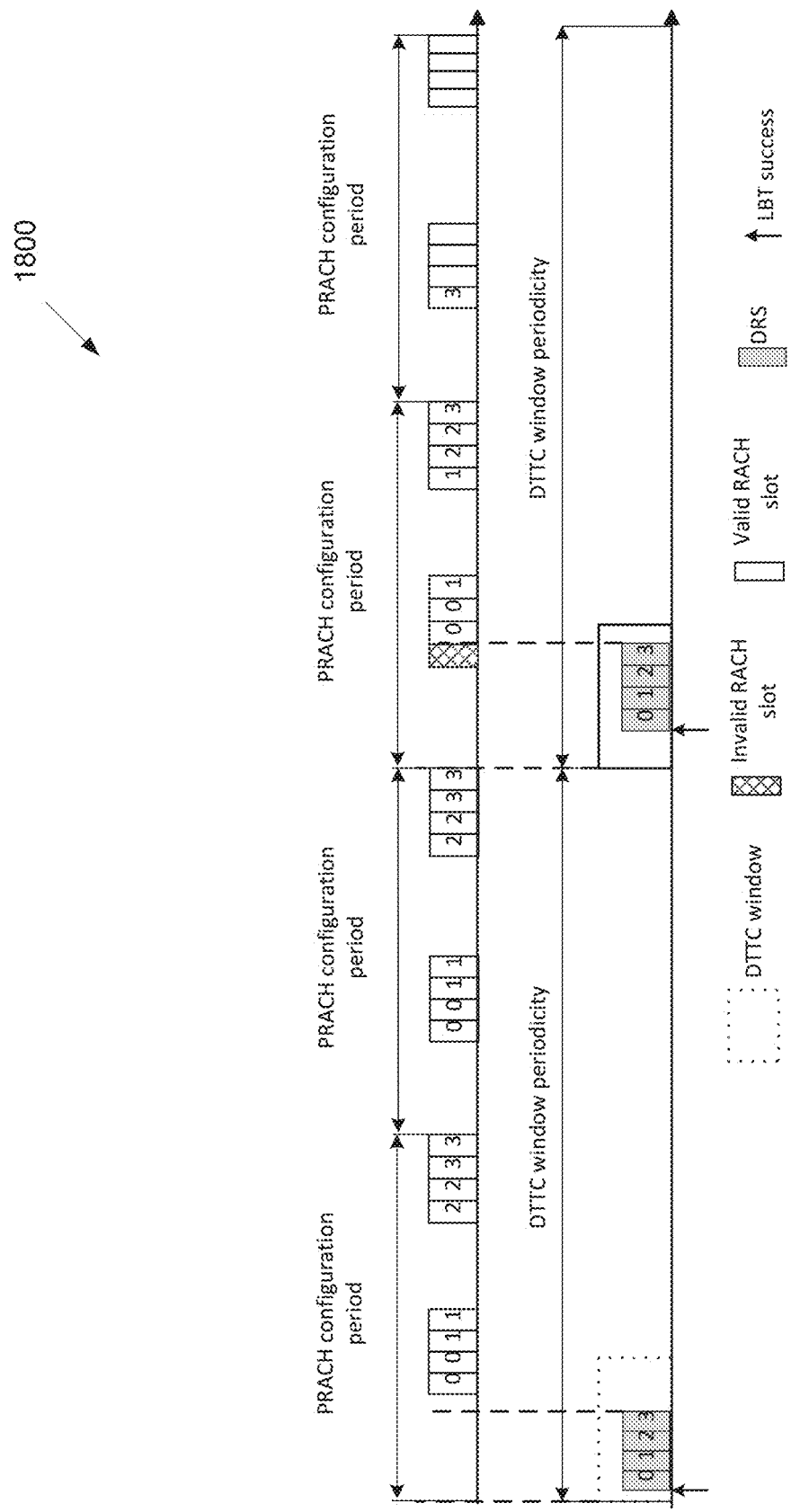
FIG. 18 illustrates yet another example valid RO determination according to embodiments of the present disclosure.

FIG. 18 illustrates yet another example valid RO determination 1800 according to embodiments of the present disclosure. An embodiment of the valid RO determination 1800 shown in FIG. 18 is for illustration only. FIG. 18 does not limit a scope of the present disclosure.

As illustrated in FIG. 18, the valid RO determination rule is chosen according to the aforementioned approaches and embodiments. In particular, each RACH slot in FIG. 18 includes 2 ROs, the number of FDM'ed ROs is 1, and each SS/PBCH block is associated with 4 ROs. The index in each RACH slot (i.e., 0, 1, 2, 3) represents the associated SS/PBCH block index for the ROs within the RACH slot. In the example of FIG. 18, the association period varies due to different starting position of the DRS within the DTTC window, which is 1 PRACH configuration period for the PRACH configuration periods within the first DTTC window periodicity of FIG. 18, and 2 PRACH configuration periods for the PRACH configuration periods within the second DTTC window periodicity of FIG. 18. Due to the non-deterministic number of PRACH configuration periods within an association period, an association pattern period cannot be defined for the example FIG. 18.

In one example, for a given mapping order of SS/PBCH block indexes to valid type-0 ROs and the number of SS/PBCH blocks associated with one valid type-0 RO, the association period for mapping SS/PBCH blocks to valid type-0 ROs, starting from frame 0, can be the smallest value within a configurable set of supported association periods at a given PRACH configuration period, such that within the association period, all the actually transmitted SS/PBCH blocks can be mapped at least once to the valid type-0 ROs excluding the type-0 ROs within the start of a DTTC window and the start of the DTTC window plus certain duration τ.

In one example, the duration τ can be same as the DTTC window duration.

In one example, the duration τ can be different from the DTTC window duration. In one sub-example, τ can be smaller than or larger than the DTTC window duration. In another sub-example, τ can be same or different for different association periods. In another sub-example, τ can be same or different for different DTTC windows within an association period.

In one example, after determining the association period, the actual mapping from the SS/PBCH block to the valid type-0 ROs can follow the configured mapping order of SS/PBCH block indexes to valid type-0 ROs and the number of SS/PBCH blocks associated with one valid type-0 RO; and the valid type-0 ROs within the start of a DTTC window and the start of the DTTC window plus certain duration τ within the association period, i.e., the valid type-0 ROs that are not utilized in determining the association period, can also be utilized for the mapping from the SS/PBCH block to the valid type-0 ROs.

Figure 19:
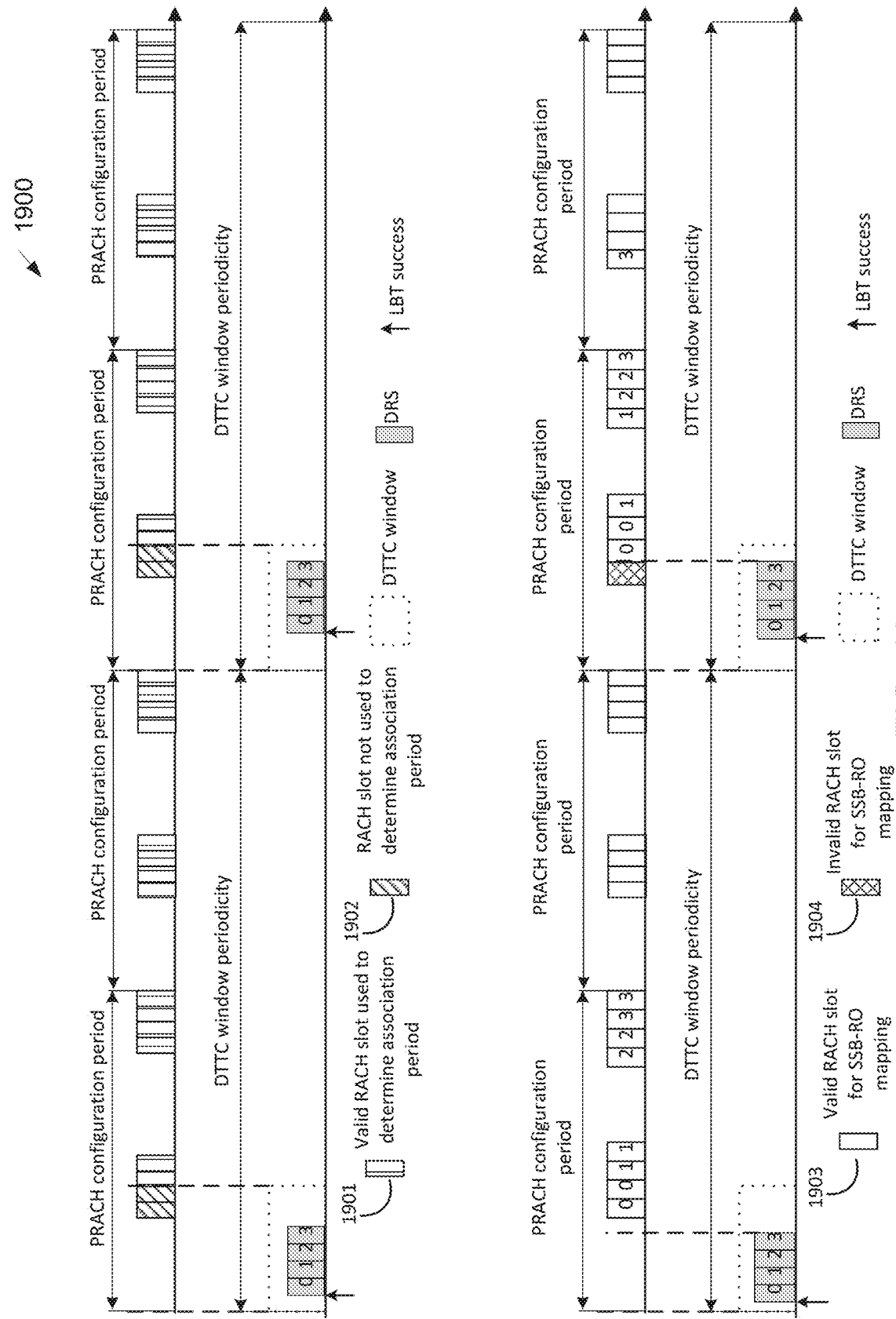
FIG. 19 illustrates yet another example valid RO determination according to embodiments of the present disclosure.

FIG. 19 illustrates yet another example valid RO determination 1900 according to embodiments of the present disclosure. An embodiment of the valid RO determination 1900 shown in FIG. 19 is for illustration only. FIG. 19 does not limit a scope of the present disclosure.

As illustrated in FIG. 19, wherein the valid RO determination rule is chosen according to the aforementioned approaches and embodiments. In particular, each RACH slot in FIG. 19 includes 2 ROs, the number of FDM'ed ROs is 1, and each SS/PBCH block is associated with 4 ROs. The top sub-figure of FIG. 19 illustrates the association period decision process according to the current example, wherein RACH slots within the DTTC window (1902) are not used for association period determination and valid RACH slots outside DTTC window (1901) are used. As a result, each association period consists of a fixed 2 PRACH configuration periods. In the bottom sub-figure of FIG. 19, the SS/PBCH block to valid RO mapping is according to the current example, and the index in each RACH slot (i.e., 0, 1, 2, 3), if any, represents the associated SS/PBCH block index for the ROs within the association period.

In one example, if after an integer number of SS/PBCH block to type-0 RO mapping cycles within the association period, there is a set of leftover type-0 ROs that are not mapped to the actually transmitted SS/PBCH blocks, such leftover type-0 ROs can still be used for PRACH transmission.

In one sub-example, the same SS/PBCH block to type-0 RO mapping rule and number of SSB per RACH occasion used in the aforementioned approach can be used to continue to map the leftover valid type-0 ROs. It is possible that an SS/PBCH block is not fully mapped to the number of RACH occasions according to the configured number of SS/PBCH blocks associated with each valid RACH occasion.

Figure 20:
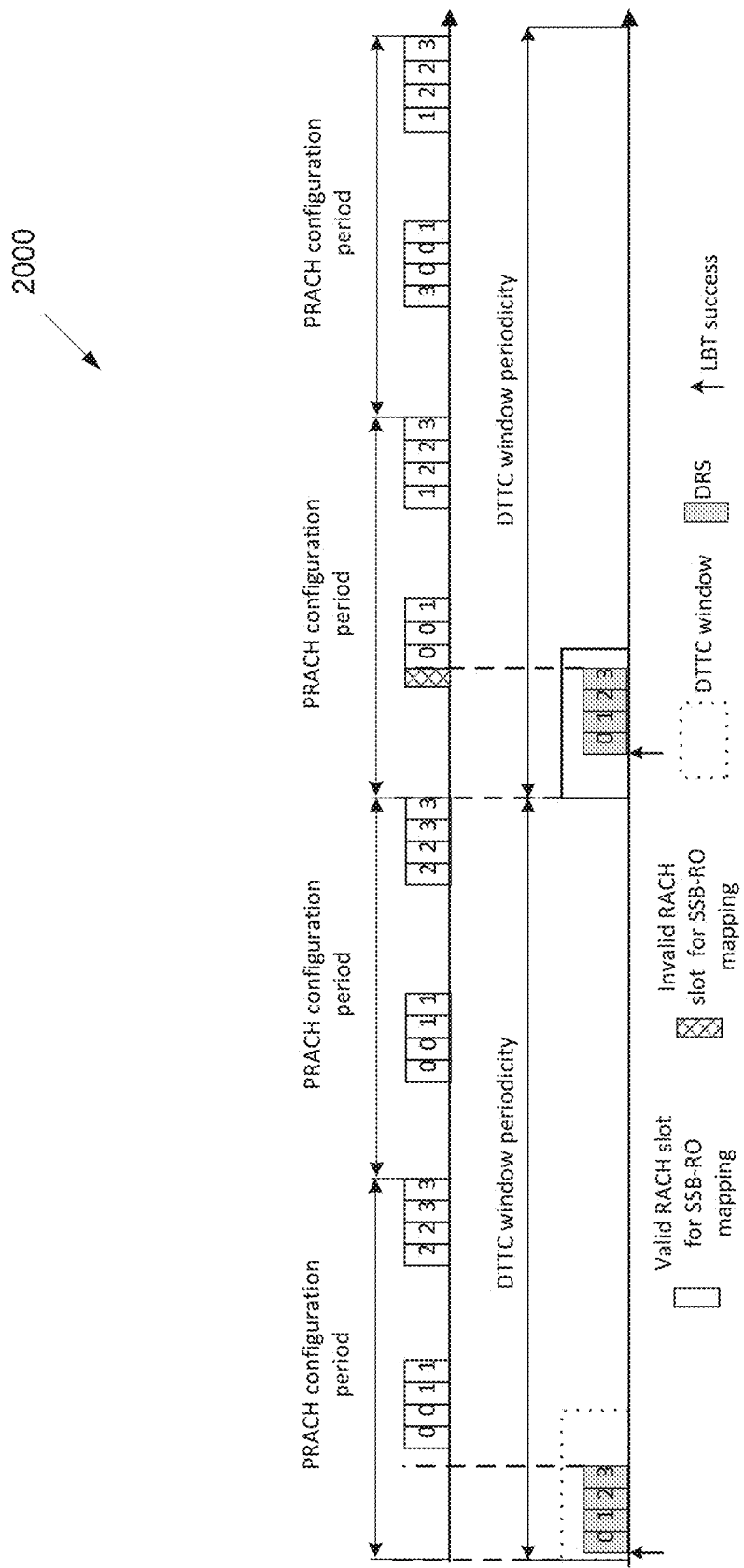
FIG. 20 illustrates yet another example valid RO determination according to embodiments of the present disclosure.

FIG. 20 illustrates yet another example valid RO determination 2000 according to embodiments of the present disclosure. An embodiment of the valid RO determination 2000 shown in FIG. 20 is for illustration only. FIG. 20 does not limit a scope of the present disclosure.

An illustration of this sub-example is provided in FIG. 20, wherein the valid RO determination rule is chosen according to the aforementioned approaches and embodiment. In particular, each RACH slot in FIG. 20 includes 2 ROs, the number of FDM'ed ROs is 1, and each SS/PBCH block is associated with 4 ROs. Compared to bottom sub-figure of FIG. 19 wherein leftover RACH occasions exist, the instance in FIG. 20 maps the leftover RACH occasions to SS/PBCH block with index as shown in FIG. 20.

In another sub-example, the mapping from SS/PBCH blocks to leftover type-0 ROs can be enhanced such that all SS/PBCH blocks can be mapped to the leftover type-0 ROs at least once.

In another sub-example, the mapping rule and/or number of SSB per RACH occasion from SS/PBCH blocks to leftover type-0 ROs can be enhanced such that the SS/PBCH blocks can be divided into N (N>=1) subsets, and UEs associated with the i-th (0<=i<=N−1) subset of SS/PBCH blocks can be mapped to the leftover ROs in association period n, and the UEs associated with the ((i+1) mod N)th (0<=i<=N−1) subset of SS/PBCH blocks can be mapped to the leftover ROs in association period n+1.

Figure 21:
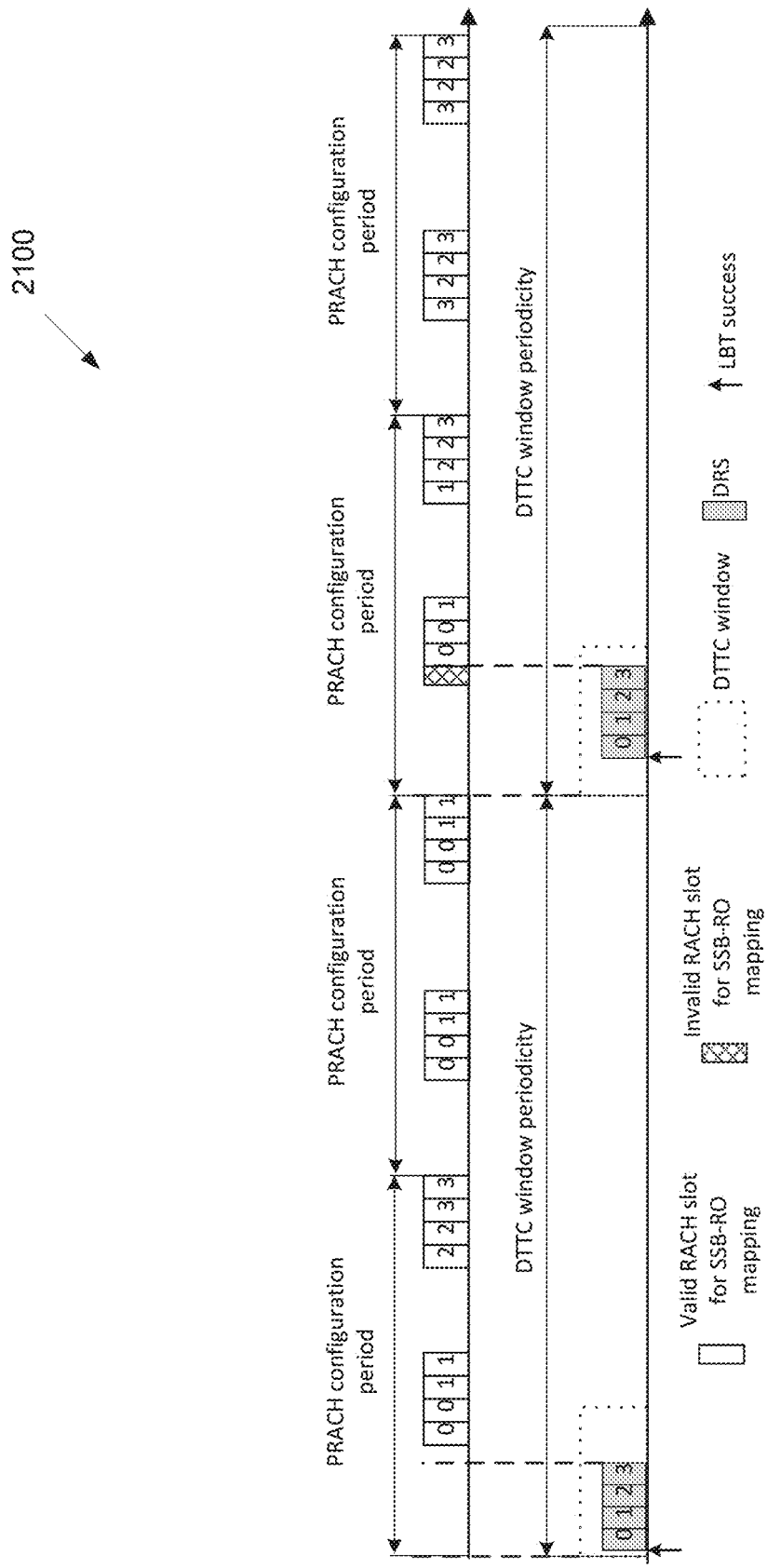
FIG. 21 illustrates yet another example valid RO determination according to embodiments of the present disclosure.

FIG. 21 illustrates yet another example valid RO determination 2100 according to embodiments of the present disclosure. An embodiment of the valid RO determination 2100 shown in FIG. 21 is for illustration only. FIG. 21 does not limit a scope of the present disclosure.

An illustration of this sub-example is provided in FIG. 21, wherein the valid RO determination rule is chosen according to the aforementioned approaches and embodiments. In particular, each RACH slot in FIG. 21 includes 2 ROs, the number of FDM'ed ROs is 1, and each SS/PBCH block is associated with 4 ROs. For leftover valid ROs, SS/PBCH blocks can be divided into 2 subsets with 0-th subset being {SSB0, SSB1} and 1-st subset being {SSB2, SSB3}, and each SS/PBCH block is associated with 4 leftover ROs.

In one example, an association pattern period can be defined which includes one or more association periods and is determined so that a pattern between PRACH occasions and SS/PBCH blocks repeats at most every M msec.

In one sub-example, M can be 160 as in NR standard specification. In another sub-example, M can be enhanced to be other values, such as 320.

In another sub-example, type-0 ROs not associated with SS/PBCH blocks after an integer number of association periods, if any, can be enhanced to being able to be used for PRACH transmissions according to one of the aforementioned embodiments and examples.

In one embodiment, joint usage of CAT-2 LBT for type-0 RACH occasions and DRS is provided.

Such embodiment includes approaches for LBT type for type-0 RACH occasions, how to configure the type-0 RACH occasions, and the joint usage of CAT-2 LBT for type-0 RACH occasions and the DRS.

A design consideration is the LBT type for type-0 RACH occasions. The baseline LBT type for type-0 ROs can be the CAT-4 LBT, and the CAT-4 LBT can possibly have the lowest priority class value (i.e., highest priority) of the LBT priority classes. In addition to the CAT-4 LBT, CAT-2 LBT of deterministic duration and/or no-LBT can also be applied to type-0 ROs under certain scenarios. The configuration of LBT type for type-0 ROs also affects the PRACH configuration table design for type-0 ROs.

In one example, no-LBT can be applied in utilizing the type-0 RO to transmit the PRACH, if the end of the last DL symbol and the start of the type-0 RO is within a SIFS duration defined according to the unlicensed/shared spectrum regulation.

In one example, SIFS duration can be 16 µs for 5 GHz and/or 6 GHz unlicensed/shared spectrum.

In another example, no-LBT can be applied to the first (in time-domain) valid type-0 RO, when the valid type-0 RO starts with τ3=0 symbol and a gap smaller than SIFS after a last downlink symbol or last SSB transmission symbol.

In another example, the configured type-0 RO can be transmitted with CP extension or timing advance.

In one example, CAT-2 LBT can be applied in utilizing the valid type-0 RO to transmit the PRACH by sharing the COT of the DRS with the type-0 RO.

In one example, CAT-2 LBT can be implicitly determined by the UE through determining whether the type-0 RO is within the COT of the DRS or not. In one sub-example, this can be achieved by indicating the start of DRS within DTTC window and the COT duration of the DRS to the UE.

In another example, CAT-2 LBT can be explicitly indicated to the UE in utilizing the valid type-0 RO. In one sub-example, the indication can be through layer-1. For instance, through the DCI for RMSI and/or OSI. In another sub-example, the indication can be through higher layer parameter. For instance, through RMSI and/or OSI.

In another example, CAT-4 LBT can be applied for type-0 ROs outside the COT of the DRS.

In one example, CAT-2 LBT can be applied in utilizing every valid type-0 RO to transmit the PRACH, which can be guaranteed by utilizing the short control signaling transmission (SCST) exception and meeting the constraints of the SCST.

In one example, the SCST constraint from ETSI BRAN for 5 GHz unlicensed spectrum is that (1) within an observation period of 50 ms, the number of short control signaling transmissions by the equipment may be equal to or less than 50; and (2) the total duration of the equipment's short control signaling transmissions may be less than 2500 µs within said observation period.

In one example, CAT-2 LBT can be applied to every valid type-0 RO, if the SCST constraint is met for all the configured type-0 ROs.

In one sub-example, this indicates that for a PRACH time-domain configuration with PRACH duration $N_{dur}^{RA}$ in number of symbols, number of time-domain PRACH occasions within a PRACH slot $N_t^{RA,slot}$, number of PRACH slots within a subframe $N_{P,slot}^{SF}$, number of PRACH slots within a subframe $N_{slot}^{SF}$, the set of subframe numbers containing PRACH slots $N_{slot}^{SF}$, PRACH configuration period P ms, then the SCST constraint from the aforementioned examples and approaches can be met if:

$$\frac{N_{dur}^{RA} \times N_t^{RA,slot}}{14} \times \frac{N_{P,slot}^{SF}}{N_{slot}^{SF}} \times \frac{|S_{slot}^{SF}|}{10} \times \frac{\lceil 50/\min(P, 50)\rceil \times 10}{50} \le 5\%.$$

In another sub-example, with the same notations as the previous sub-example, the SCST constraint from the aforementioned example can be met if:

$$\frac{N_{dur}^{RA} \times N_t^{RA,slot}}{14} \times N_{P,slot}^{SF} \times \frac{|S_{slot}^{SF}|}{10} \times \frac{10}{P} \le 5\%.$$

In another sub-example, with the same notations as the previous sub-example, the SCST constraint from the aforementioned example can be met if one of the previous two sub-examples are met, and also the following constraint is met:

$$M_{RA} \times N_t^{RA,slot} \times N_{slot}^{SF} \times |S_{slot}^{SF}| \times \left\lceil \frac{50}{\min(p, 50)} \right\rceil \le 50,$$

wherein $M_{RA}$ is number of FDM'ed type-0 ROs.

In one example, CAT-2 LBT can be applied to every valid type-0 RO, if the SCST constraint is met for all the configured valid type-0 ROs.

In one sub-example, this can be applied to approaches in the aforementioned examples and embodiments wherein the valid type-0 ROs can be deterministic based on the DTTC window position and periodicity.

In another sub-example, this indicates that for a PRACH time-domain configuration with PRACH duration $N_{dur}^{RA}$ in number of symbols, PRACH configuration period P ms, number of valid time-domain PRACH occasions within a PRACH configuration period $N_{v,RO}^{P}$, number of PRACH slots within a subframe $N_{slot}^{SF}$, the SCST constraint is met for all the configured valid type-0 ROs if:

$$\frac{N_{dur}^{RA} \times N_{v,RO}^{P}}{14 \times N_{slot}^{SF} \times 10} \times \frac{\lceil 50/\min(P50)\rceil \times 10}{50} \le 5\%.$$

In another sub-example, with the same notations as the previous sub-example, the SCST constraint from the aforementioned example can be met if:

$$\frac{N_{dur}^{RA} \times N_{v,RO}^{P}}{14 \times N_{slot}^{sF} \times 10} \times \frac{10}{P} \le 5\%.$$

In another sub-example, with the same notations as the previous sub-example, the SCST constraint from the aforementioned example can be met if one of the previous two sub-examples are met, and also the following constraint is met:

$$M_{RA} \times N_{v,RO}^{P} \times \left\lceil \frac{50}{\min(P50)} \right\rceil \le 50,$$

wherein $M_{RA}$ is number of FDM'ed type-0 ROs.

In another example, CAT-2 LBT can be applied to every valid type-0 RO, if the SCST constraint is met for all the configured type-0 ROs along with other signals/channels transmitted using the SCST exception.

In one sub-example, the other signals/channels transmitted using the SCST exception can be the DRS, wherein the DRS can transmit subject to a CAT-2 LBT if the DRS duty cycle is less than or equal to 5%, and the total duration of each DRS is up to 1 ms.

In another sub-example, if the DRS duration is $T_{dur}^{DRS}$ ms, and the DTTC window periodicity is $P_{DTTC}$ ms; and for a PRACH time-domain configuration with PRACH duration $N_{dur}^{RA}$ in number of symbols, PRACH configuration period P ms, number of time-domain PRACH occasions within a PRACH configuration period $N_{RO}^{P}$, number of PRACH slots within a subframe $N_{slot}^{SF}$, the SCST constraint is met for all the configured type-0 ROs and DRS if:

$$\frac{N_{dur}^{RA} \times N_{RO}^{P}}{14 \times N_{slot}^{SF} \times 10} \times \frac{\lceil 50/\min(P, 50)\rceil \times 10}{50} + \frac{\lceil 50/\min(P_{DTTC}, 50)\rceil \times T_{dur}^{DRS}}{50} \le 5\%.$$

In another sub-example, with the same notations as the previous sub-example, the SCST constraint can be met for all the configured type-0 ROs and DRS if:

$$\frac{N_{dur}^{RA} \times N_{RO}^{P}}{14 \times N_{slot}^{SF} \times 10} \times \frac{10}{P} + \frac{T_{dur}^{DRS}}{P_{DTTC}} \le 5\%.$$

In another sub-example, with the same notations as the previous sub-example, the SCST constraint from the aforementioned examples can be met if one of the previous two sub-examples are met, and also the following constraint is met:

$$M_{RA} \times N_{RO}^{P} \times \left\lceil \frac{50}{\min(P_{l}50)} \right\rceil + \lceil 50/\min(P_{DTTC}, 50)\rceil \le 50,$$

wherein the DRS is treated as a single transmission, and $M_{RA}$ is number of FDM'ed type-0 ROs.

In another example, CAT-2 LBT can be applied to every valid type-0 RO, if the SCST constraint is met for all the configured valid type-0 ROs along with other signals/channels transmitted using the SCST exception.

In one sub-example, the other signals/channels transmitted using the SCST exception can be the DRS, wherein the DRS can transmit subject to a CAT-2 LBT if the DRS duty cycle is less than or equal to 5%, and the total duration of each DRS is up to 1 ms.

In another sub-example, if the DRS duration is $T_{dur}^{DRS}$ ms, and the DTTC window periodicity is $P_{DTTC}$ ms; and for a PRACH time-domain configuration with PRACH duration $N_{dur}^{RA}$ in number of symbols, PRACH configuration period P ms, number of valid time-domain PRACH occasions within a PRACH configuration period $N_{v,RO}^{P}$, number of PRACH slots within a subframe $N_{slot}^{SF}$, the SCST constraint is met for all the configured type-0 ROs and DRS if:

$$\frac{N_{dur}^{RA} \times N_{v,RO}^{P}}{14 \times N_{slot}^{SF} \times 10} \times \frac{\lceil 50/\min(P50)\rceil \times 10}{50} + \frac{\lceil 50/\min(P_{DTTC}, 50)\rceil \times T_{dur}^{DRS}}{50} \le 5\%.$$

In another sub-example, with the same notations as the previous sub-example, the SCST constraint can be met for all the configured type-0 ROs and DRS if:

$$\frac{N_{dur}^{RA} \times N_{v,RO}^{P}}{14 \times N_{slot}^{SF} \times 10} \times \frac{10}{P} + \frac{T_{dur}^{DRS}}{P_{DTTC}} \le 5\%.$$

In another sub-example, with the same notations as the previous sub-example, the SCST constraint from the aforementioned examples can be met if one of the previous two sub-examples are met, and also the following constraint is met:

$$M_{RA} \times N_{v,Ro}^{P} \times \left\lceil \frac{50}{\min(P, 50)} \right\rceil + \lceil 50/\min(P_{DTTC}, 50)\rceil \le 50,$$

wherein the DRS is treated as a single transmission, and $M_{RA}$ is number of FDM'ed type-0 ROs.

Another design consideration related to the LBT type for type-0 RACH configuration table is how to configure the type-0 RACH occasions for NR-U through the PRACH configuration table, given that LBT is needed to grant the transmission of a type-0 RO. The most straightforward way is to directly reuse the existing PRACH configuration table from NR standard specification.

In one example, all or a subset of the existing PRACH configuration table from NR standard specification can be used to configure time-domain resources for type-0 RACH occasions.

In one example, the entry from existing PRACH configuration table can be directly reused, and the LBT can be performed before the starting symbol column of the PRACH configuration table.

In one sub-example, the mapping order from SS/PBCH block to type-0 RO can be on a group-wise type-0 RO basis, wherein the group can be the type-0 ROs within a PRACH slot. The preamble index for different type-0 ROs in the PRACH slot can be the same, or independently selected.

For instance, the mapping order can be: first, in increasing order of preamble indexes within a type-0 ROs in a PRACH slot; second, in increasing order of frequency resource indexes for frequency multiplexed type-0 ROs in a PRACH slot; and third, in increasing order of indexes for PRACH slots.

In another sub-example, for CAT-2 LBT of type-0 RO and when there are more than 1 type-0 ROs within a PRACH slot, the UE can utilize more than one of the type-0 ROs within the PRACH slot subject to CAT-2 LBT. For instance, the UE can utilize all the type-0 ROs within the PRACH slot subject to CAT-2 LBT, such as for coverage extension purpose of the PRACH.

Figure 22:
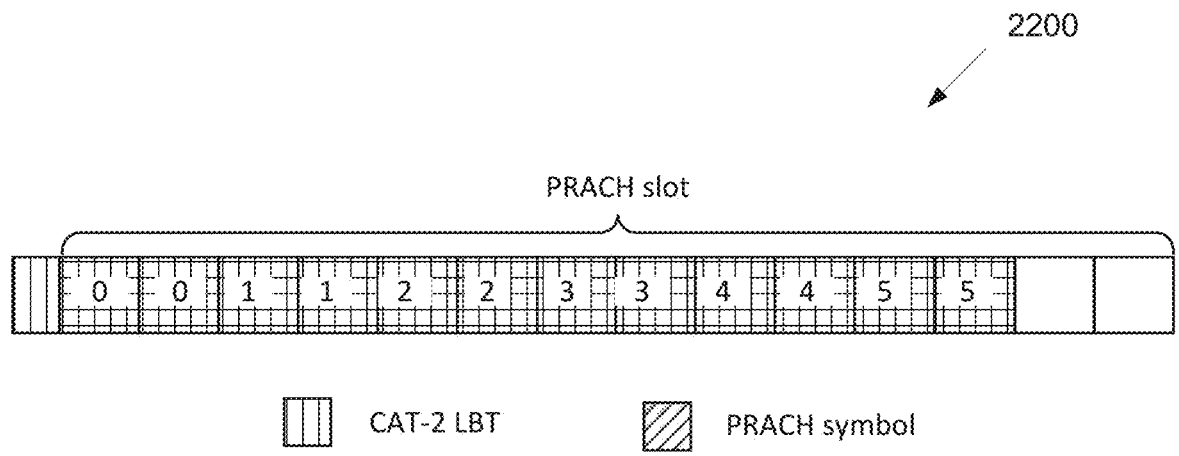
FIG. 22 illustrates an example CAT-2 LBT according to embodiments of the present disclosure.

FIG. 22 illustrates an example CAT-2 LBT 2200 according to embodiments of the present disclosure. An embodiment of the CAT-2 LBT 2200 shown in FIG. 22 is for illustration only. FIG. 22 does not limit a scope of the present disclosure.

As illustrated in FIG. 22, 6 type-0 ROs each with 2 symbols are configured within the PRACH slot, and the starting symbol=0.

In another sub-example, for CAT-2 LBT of type-0 RO and when there are more than 1 type-0 ROs within a PRACH slot, if the UE fails current CAT-2 LBT, the UE can re-attempt the CAT-2 LBT before the next available type-0 RO within the PRACH slot. For instance, the UE can only utilize one type-0 RO within the PRACH slot subject to CAT-2 LBT. In another instance, this sub-example can be utilized to increase the transmit opportunity of the PRACH with CAT-2 LBT.

Figure 23:
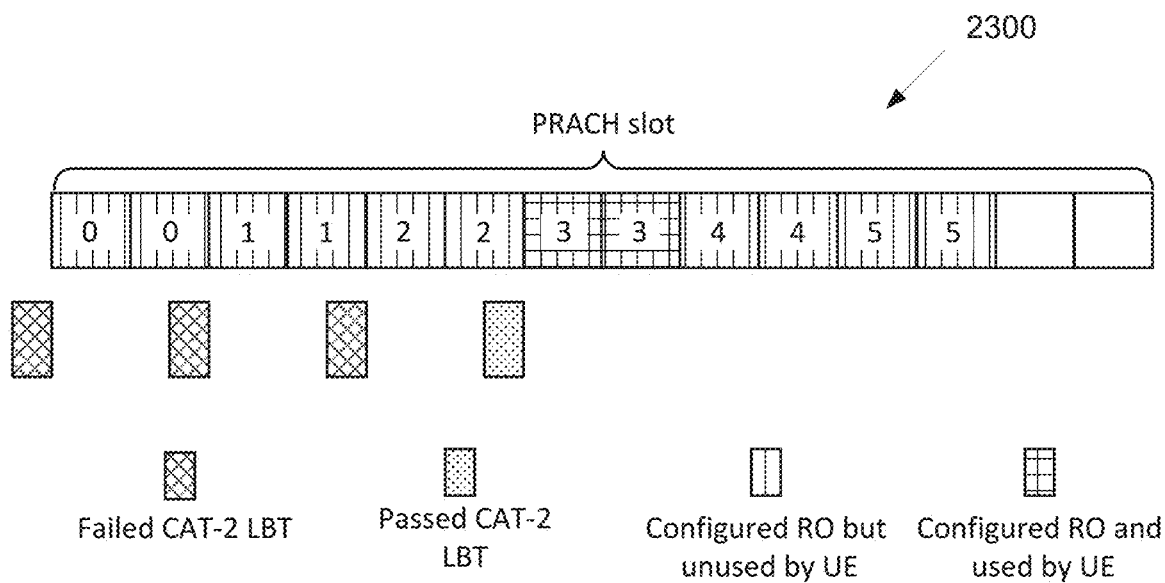
FIG. 23 illustrates another example CAT-2 LBT according to embodiments of the present disclosure.

FIG. 23 illustrates another example CAT-2 LBT 2300 according to embodiments of the present disclosure. An embodiment of the CAT-2 LBT 2300 shown in FIG. 23 is for illustration only. FIG. 23 does not limit a scope of the present disclosure.

As illustrated in FIG. 23, 6 type-0 ROs each with 2 symbols are configured within the PRACH slot, and the starting symbol=0. CAT-2 LBT succeeds before the 3-rd configured type-0 RO within the PRACH slot, and the UE transmits in the 3-rd configured type-0 RO.

In another sub-example, for CAT-4 LBT of type-0 RO and when there are more than 1 type-0 ROs within a PRACH slot, the UE can utilize the first available type-0 RO within the PRACH slot that comes after CAT-4 LBT is completed. For instance, this sub-example can be utilized to increase the transmit opportunity of the PRACH with CAT-4 LBT. In another instance, the UE can also utilize the remaining type-0 RO(s), if any, within the PRACH slot that comes after first available type-0 RO after CAT-4 LBT is completed.

Figure 24:
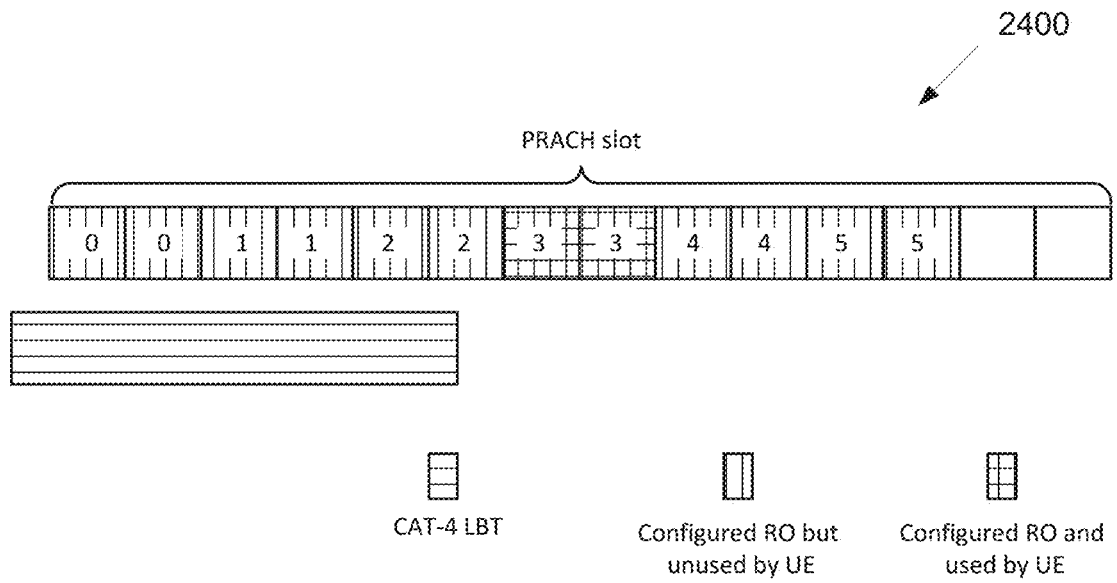
FIG. 24 illustrates yet another example CAT-2 LBT according to embodiments of the present disclosure.

FIG. 24 illustrates yet another example CAT-2 LBT 2400 according to embodiments of the present disclosure. An embodiment of the CAT-2 LBT 2400 shown in FIG. 24 is for illustration only. FIG. 24 does not limit a scope of the present disclosure.

As illustrated in FIG. 24, 6 type-0 ROs each with 2 symbols are configured within the PRACH slot, and the starting symbol=0. CAT-4 LBT succeeds before the 3-rd configured type-0 RO within the PRACH slot, and the UE transmits only in the 3-rd configured type-0 RO.

In another sub-example, this example can be extended to when the starting symbol column of one or multiple entries of the PRACH configuration table is modified from the existing PRACH configuration table.

For instance, the starting symbol can be modified to 1 for entries with the starting symbol configured as 0 in NR PRACH configuration table. In this case, the LBT for configured type-0 ROs can be performed starting from the PRACH slot.

Figure 25:
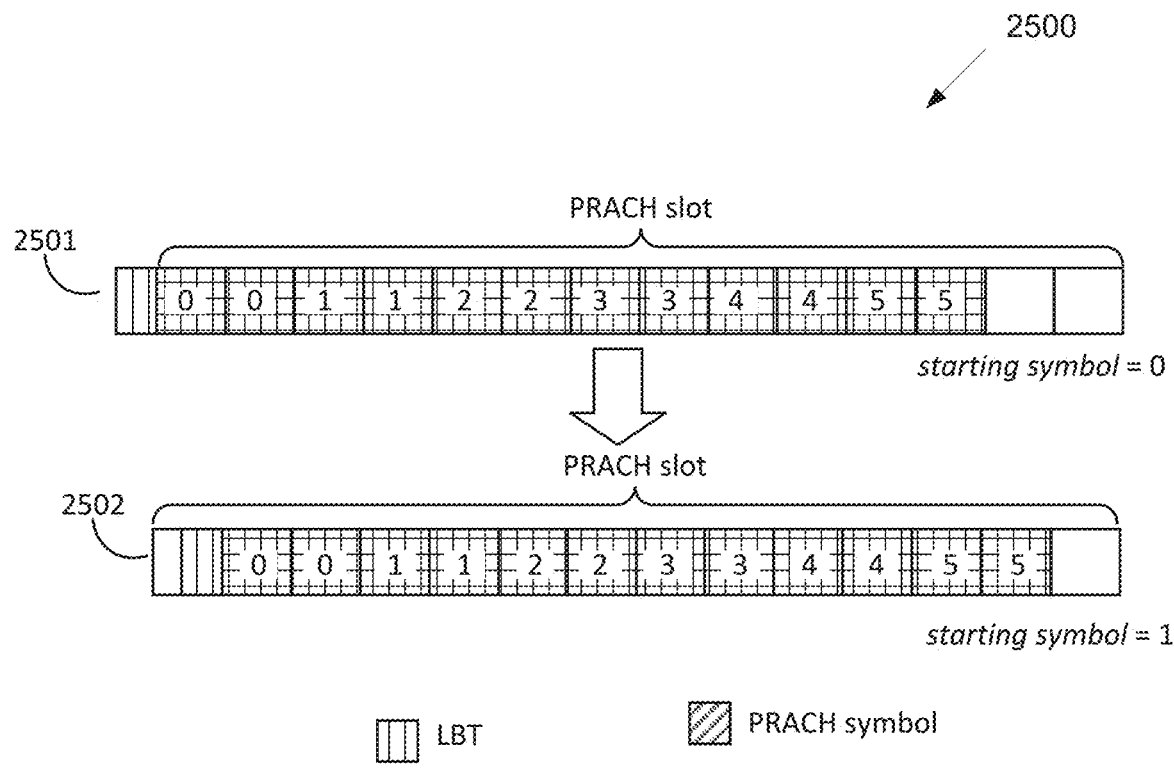
FIG. 25 illustrates yet another example CAT-2 LBT according to embodiments of the present disclosure.

FIG. 25 illustrates yet another example CAT-2 LBT 2500 according to embodiments of the present disclosure. An embodiment of the CAT-2 LBT 2500 shown in FIG. 25 is for illustration only. FIG. 25 does not limit a scope of the present disclosure.

As illustrated in FIG. 25, under NR configuration, the entry indicates there exists 6 type-0 ROs each with 2 symbols are configured within the PRACH slot, and the starting symbol=0 (2501); while with the starting symbol modified to 1, the type-0 RO positions (2502) are shifted to 1 symbol later compared to corresponding configuration from NR standard specification, and LBT can be performed starting from the PRACH slot.

In one example, the subset of the entries from the existing PRACH configuration table can be chosen to configure type-0 ROs according to the aforementioned approaches, such that CAT-2 LBT can be applied to the type-0 ROs.

In one embodiment, enhancements to LBT type determination for type-0 NR-U RO is provided. In order to increase the flexibility and robustness of semi-statically configured ROs such that the overall PRACH transmission delay can be reduced given the LBT requirement for NR-U, several high-level enhancement directions can be considered.

A consideration can be enhancing the LBT type subject to the unlicensed regulation allowance, such that the expected LBT delay in granting the transmission of one type-0 RO can be reduced. For instance, the usage of a CAT-2 LBT for type-0 RO transmission can lead to much reduced expected LBT delay compared to CAT-4 LBT for type-0 RO.

A consideration can be enhancing the time-domain and/or frequency-domain type-0 RO resources allocated to each UE, such that compared to legacy NR standard specification, a UE can have more opportunities to transmit PRACH utilizing one or multiple of the semi-statically configured type-0 ROs allocated to the UE.

In one example, a standalone transmission of NR-U PRACH utilizing a type-0 RO can be subject to a CAT-4 LBT by default; and the LBT type for transmission of NR-U PRACH utilizing a type-0 RO can be a CAT-2 LBT or CAT-1 LBT when the UE is explicitly indicated by the gNB of the LBT type, or the UE can implicitly determine the utilized type-0 RO is within the channel occupancy time (COT) of a gNB-initiated COT.

In one example, the UE can be explicitly indicated by the gNB of the LBT type for type-0 PRACH transmission through DCI.

In one sub-example, for PDCCH order triggered PRACH transmissions, the UE can be explicitly indicated by the gNB of the LBT type for type-0 PRACH transmission through the PDCCH order.

In another sub-example, the UE can be explicitly indicated by the gNB of the LBT type for type-0 PRACH transmission through DCI other than the PDCCH order (i.e., DCI format 1_0 with CRC scrambled by C-RNTI and the "frequency domain resource assignment" field is all ones).

In another sub-example, the DCI can introduce an LBT type field, which indicates the LBT type for the PDCCH order triggered PRACH transmission.

In one instance, the LBT type field can include one bit, which indicates one of CAT-4 LBT or CAT-2 LBT.

In another instance, the LBT type field can include two bits, which indicates one of CAT-1 LBT, CAT-2 LBT, or CAT-4 LBT.

In yet another instance, the LBT type field, when the LBT type field is not present, a CAT-4 LBT is used; and when the LBT field is present, the field can indicate the usage of CAT-2 LBT, or one of the CAT-1 LBT or CAT-2 LBT.

In another sub-example, CAT-2 LBT or CAT-1 LBT for PRACH can be indicated when the type-0 RO scheduled by the PDCCH order can share the COT corresponding to the PDCCH order.

In another sub-example, when indicated through the PDCCH order, the LBT type field can be introduced for NR-U by using the reserved bits of the PDCCH order from NR standard specification.

In another sub-example, the UEs with explicit indication of the LBT type for PRACH transmission can be the RRC connected UEs or RRC inactive UEs.

In one example, the UE can implicitly infer the LBT type for the associated type-0 RO transmission through detection of DRS and derivation of the channel occupancy time information associated with the DRS.

In one sub-example, the aforementioned example and embodiment can be used when the DRS is transmitted subject to a CAT-4 LBT, and the UE can determine this information from the configuration for DRS through remaining system information or other system information. For instance, the configuration of DRS can be the duty cycle of the DRS and/or the duration of the DRS.

In one sub-example, DRS can include the starting position of the COT and the COT duration corresponding to the DL burst that contains DRS; such that UE can determine if the selected type-0 RO is within the COT, and a CAT-2/CAT-1 LBT can be used if the RO is within the COT and CAT-4 LBT otherwise.

In one instance, the starting position of the COT and the COT duration information can be transmitted through the remaining system information, other system information, or other PDSCH information multiplexed within the DRS.

In another sub-example, the DRS can include the ending position of the COT corresponding to the DL burst that contains DRS; such that UE can determine if the selected type-0 RO is before the ending position of the COT, and a CAT-2/CAT-1 LBT can be used if the RO is within the COT and CAT-4 LBT otherwise.

In one instance, the ending position of the COT can be transmitted through the remaining system information, other system information, or other PDSCH information multiplexed within the DRS.

In another sub-example, upon detection of the DRS, the UE can treat the start of the detected DRS as the starting position of the COT, and can determine if the type-0 RO of the UE is within the COT or not, assuming the COT duration is that of the CAT-4 LBT with highest channel access priority (or lowest channel access priority class value).

In one sub-example, the aforementioned examples and embodiments can be applied to both the initial access UE and also connected UEs.

Figure 26:
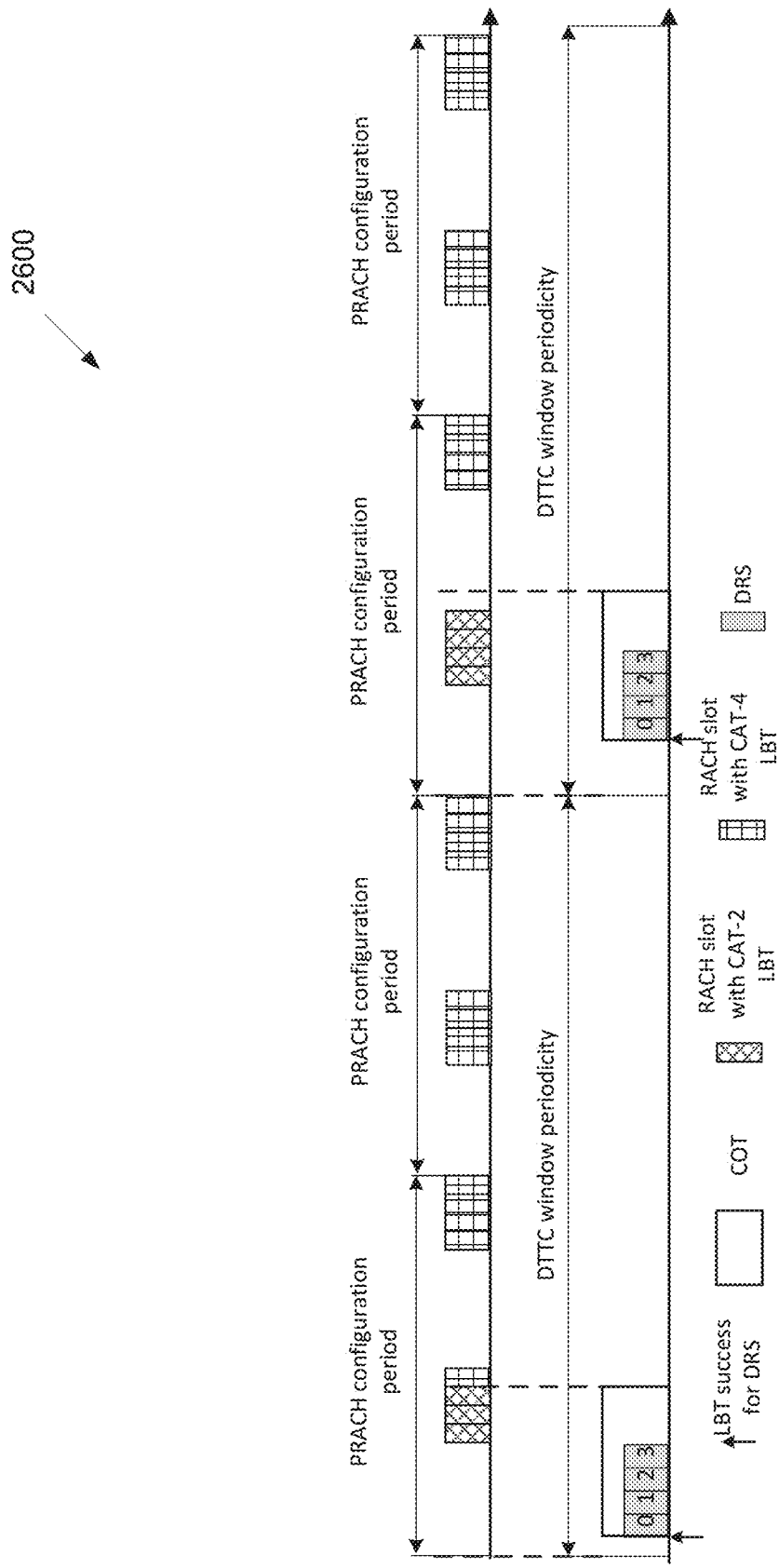
FIG. 26 illustrates an example LBT type determination according to embodiments of the present disclosure.

FIG. 26 illustrates an example LBT type determination 2600 according to embodiments of the present disclosure. An embodiment of the LBT type determination 2600 shown in FIG. 26 is for illustration only. FIG. 26 does not limit a scope of the present disclosure.

As illustrated in FIG. 26, PRACH configuration period is 10 ms, and the slots of $3^{rd}$, $4^{th}$ $8^{th}$ and $9^{th}$ subframes within each PRACH configuration period are PRACH slots with PRACH of 30 kHz SCS. In addition, the DTTC window duration is 4 ms, and DTTC window periodicity is 20 ms, and DRS duration is 2 ms with 4 SS/PBCH blocks of 30 kHz SCS. For the UE that can detect the DRS and derive the information of the DRS (e.g., ending position or duration of COT), the UE can utilize the type-0 ROs subject to CAT-2 LBT if the type-0 ROs are within the RACH slots within the COT, while the UE can utilize the type-0 ROs subject to CAT-4 LBT if the type-0 ROs are within the RACH slots outside the COT.

In one example, the UE can implicitly infer the LBT type for the associated type-0 RO transmission through detection of downlink data transmission burst and derivation of the channel occupancy time information associated with the downlink transmission burst.

In one sub-example, the start of the downlink transmission data burst can be detected by the UE through the DM-RS of the CORESET of the burst only, or the PDCCH content, or both the DM-RS of the CORESET and the PDCCH content.

In another sub-example, the start of the downlink transmission burst can be detected by the UE through the DM-RS of the group common (GC)-PDCCH, or the GC-PDCCH content, or both the DM-RS of the CORESET and the PDCCH content.

In another sub-example, the start of the downlink transmission data burst can be detected by the UE through the CSI-RS within the burst.

In one sub-example, the COT duration corresponding to the downlink transmission data burst can be indicated to the UE through the DM-RS of the CORESET of the burst only, or the PDCCH content, or both the DM-RS of the CORESET and the PDCCH content.

In another sub-example, the COT duration corresponding to the downlink transmission burst can be indicated to the UE through the DM-RS of the group common (GC)-PDCCH, or the GC-PDCCH content, or both the DM-RS of the CORESET and the PDCCH content.

In another sub-example, the UE can determine if the selected type-0 RO is within the COT based on the detected starting position of the COT and the duration of the COT, and a CAT-2/CAT-1 LBT can be used if the RO is within the COT and CAT-4 LBT otherwise. For instance, this can be applied to connected UEs.

In another sub-example, upon detection of the start of the DL transmission burst, the UE can determine if the type-0 RO of the UE is within the COT or not, assuming the COT duration is that of the CAT-4 LBT with highest channel access priority (or lowest channel access priority class value). For instance, this can be applied to both initial access UE and connected UEs.

In one example, the UE can implicitly infer the LBT type for the associated type-0 RO transmission through detection of an initial signal transmitted at the beginning of the downlink burst and derivation of the channel occupancy time information associated with the DRS.

Figure 27:
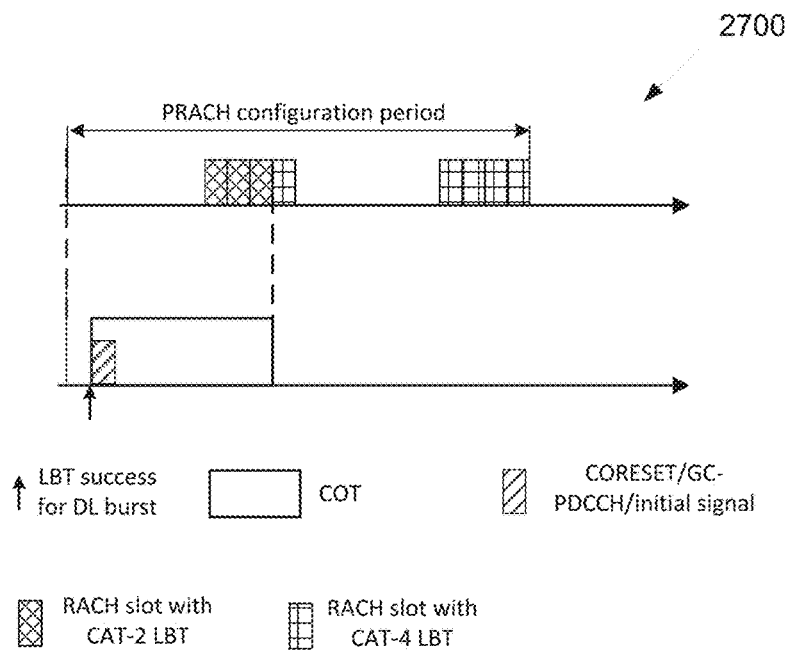
FIG. 27 illustrates another example LBT type determination according to embodiments of the present disclosure.

FIG. 27 illustrates another example LBT type determination 2700 according to embodiments of the present disclosure. An embodiment of the LBT type determination 2700 shown in FIG. 27 is for illustration only. FIG. 27 does not limit a scope of the present disclosure.

As illustrated in FIG. 27, if the UE has correctly detected the DM-RS of CORESET/GC-PDCCH/initial signal, and/or content of CORESET/GC-PDCCH/initial signal such that the COT information of the DL burst can be derived, the UE can utilize the type-0 ROs subject to CAT-2 LBT if the type-0 ROs are within the RACH slots within the COT, while the UE can utilize the type-0 ROs subject to CAT-4 LBT if the type-0 ROs are within the RACH slots outside the COT.

In one embodiment, configuration for multiple SS/PBCH blocks (SSBs) association is provided.

Another design consideration to decrease the semi-statically configured RO is to enhance the time-domain and/or frequency-domain type-0 RO resources allocated to each UE. In NR, each UE derives the associated type-0 ROs from only one selected SS/PBCH block. This approach can be further enhanced to provide more time/frequency domain transmit opportunities for type-0 ROs, wherein the UE can be allowed to select more than 1 SS/PBCH blocks for deriving the associated type-0 ROs.

In one example, the UE can select and associate with a set of SS/PBCH blocks wherein more than one SS/PBCH block is allowed, and the UE is allowed to utilize one or multiple type-0 ROs from the union of the (valid) type-0 ROs associated with each SS/PBCH block within the selected SS/PBCH block set. For the remaining of this invention, this principle can be termed as RO resource selection through multiple SSBs association.

Figure 28:
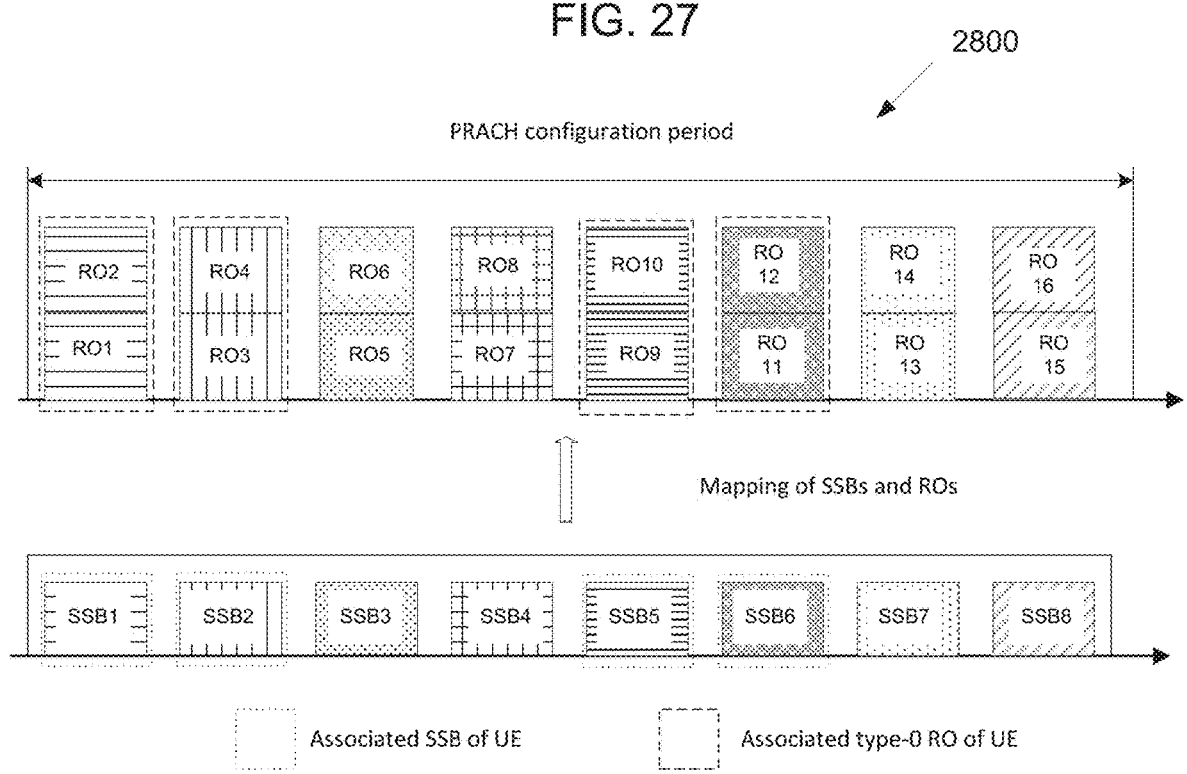
FIG. 28 illustrates an example configuration for multiple SS/PBCH blocks association according to embodiments of the present disclosure.

FIG. 28 illustrates an example configuration for multiple SS/PBCH blocks association 2800 according to embodiments of the present disclosure. An embodiment of the configuration for multiple SS/PBCH blocks association 2800 shown in FIG. 28 is for illustration only. FIG. 28 does not limit a scope of the present disclosure.

As illustrated in FIG. 28, each SSB and the associated RO(s) share the same pattern fill; and when the UEs are associated with more than one SSBs, it is also associated with more type-0 ROs in attempting the PRACH transmission, which increases the success probability to transmit PRACH subject to LBT.

In one example, the multiple associated SS/PBCH blocks of a UE in deriving the potential associated type-0 ROs can be determined by the UE according to certain type-0 RO resource selection rule.

In one example, the multiple associated SS/PBCH blocks of a UE can be selected by comparing to a RSRP selection threshold for the SSB; wherein when the UE has detected at least one of the detected SSBs with RSRP above the RSRP selection threshold, the UE can select more than one SSBs for deriving the type-0 ROs.

In one sub-example, the UE can select every SSB that provides an RSRP exceeding the RSRP selection threshold.

In another sub-example, when there are more than one SS/PBCH blocks exceeding the RSRP selection threshold, there can exist a configurable maximum number of SSBs among such SSBs that the UE can select. For instance, the configurable maximum number of SSBs can be determined by higher layer parameter, or layer-1 signaling. For instance, it is up to UE implementation in selecting the SS/PBCH blocks when the number of SS/PBCH blocks exceeding the RSRP selection threshold exceeds the configurable maximum number.

In one example, the multiple associated SS/PBCH blocks of a UE in deriving the potential associated type-0 ROs can be explicitly indicated to the UE.

In one example, the selected multiple SS/PBCH block indexes can be explicitly indicated to the UE through PDCCH order.

In one example, the selected multiple SS/PBCH block indexes can be explicitly indicated to the UE through DCI other than the PDCCH order (i.e., DCI format 1_0 with CRC scrambled by C-RNTI and the "frequency domain resource assignment" field is all ones).

In one example, the selected multiple SS/PBCH block indexes can be indicated through higher layer parameters.

In one embodiment, enhancement to PDCCH order triggered type-0 RO is provided.

In NR standard specification, when a PRACH transmission is triggered by a PDCCH order, the random access preamble index, UL/SUL indicator, an associated SS/PBCH block index, and a PRACH mask index are collectively indicated by DCI format 1_0 with CRC scrambled by C-RNTI and the "frequency domain resource assignment" field is all ones. This embodiment includes several enhancements to the PDCCH order triggered RO for NR-U.

In one example, the SS/PBCH index field in the PDCCH order can be enhanced, such that the PDCCH order can indicate one or more than one associated SS/PBCH block indexes, which are utilized in determining the RACH occasions for PDCCH order triggered PRACH transmission.

In on example, the SS/PBCH index field for PDCCH order in NR-U can still use 6 bits same as in an NR PDCCH order, and potential re-interpretation of the field can be used for NR-U in indicating one or more than one associated SS/PBCH block indexes.

In one sub-example, when the actually transmitted number of SS/PBCH blocks is N which corresponds to $\lceil \log_2 N \rceil$ bits to represent in the PDCCH order, the SS/PBCH index field in PDCCH order can indicate at most $\lfloor 6/\lceil \log_2 N \rceil \rfloor$ SS/PBCH block indexes which the UE can be used to determine the RACH occasion for PRACH transmission, wherein each SS/PBCH block index is indicated through $\lceil \log_2 N \rceil$ inside the SS/PBCH index field.

In one instance, when the actually transmitted number of SS/PBCH blocks is 8 which corresponds to 3 bits, the SS/PBCH index field in PDCCH order can indicate at most 2 SS/PBCH block indexes which the UE can be used to determine the RACH occasion for PRACH transmission. This can be applied to FR1 NR-U in 5 GHz and/or 6 GHz unlicensed/shared spectrum.

Figure 29:
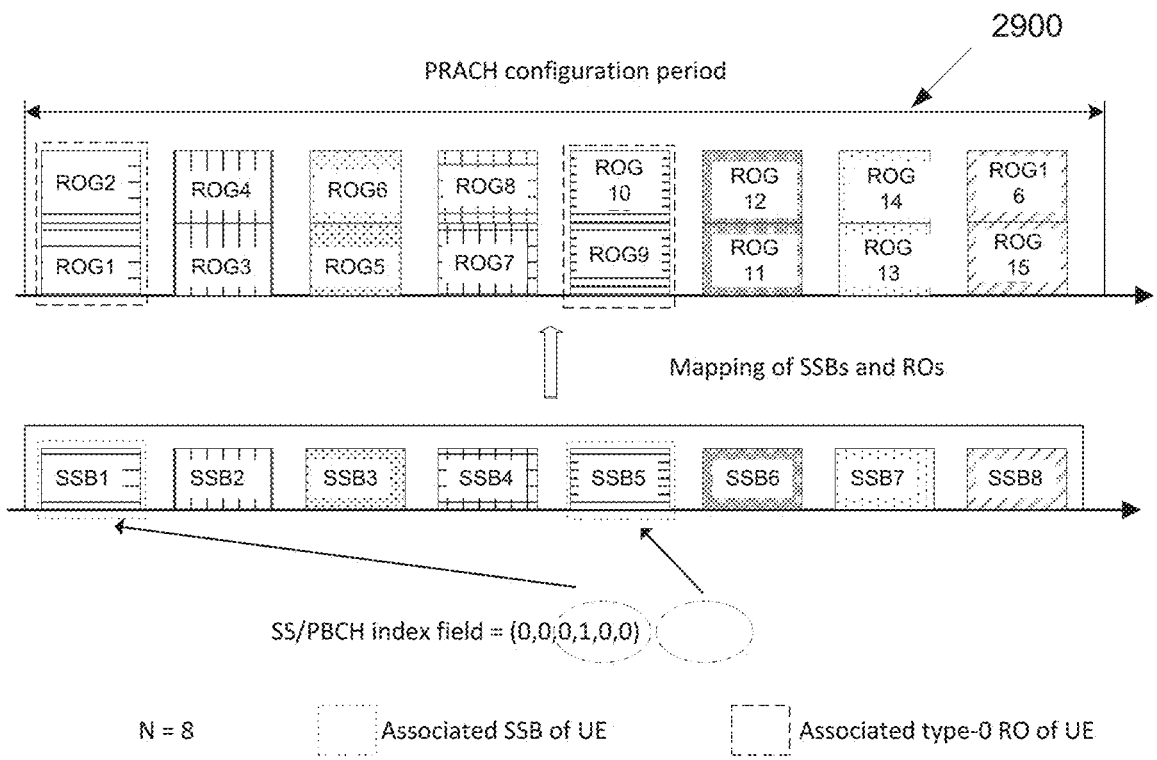
FIG. 29 illustrates another example configuration for multiple SS/PBCH blocks association according to embodiments of the present disclosure.

FIG. 29 illustrates another example configuration for multiple SS/PBCH blocks association 2900 according to embodiments of the present disclosure. An embodiment of the configuration for multiple SS/PBCH blocks association 2900 shown in FIG. 29 is for illustration only. FIG. 29 does not limit a scope of the present disclosure.

An illustration of this instance is FIG. 29, the SS/PBCH index field from the PDCCH order indicates that the first SSB and the fifth SSB are the selected SSBs for the UE in performing the PDCCH-order initiated random access procedure; and each SSB and the associated RO(s) share the same pattern fill, and N represents the number of actually transmitted SSBs.

In another instance, when the actually transmitted number of SS/PBCH blocks is 4 which corresponds to 2 bits, the SS/PBCH index field in PDCCH order can indicate at most 3 SS/PBCH block indexes which the UE can be used to determine the RACH occasion for PRACH transmission. This can be applied to FR1 NR-U in below 5 GHz unlicensed/shared spectrum.

In another instance, when the actually transmitted number of SS/PBCH blocks is 64 which corresponds to 6 bits, the SS/PBCH index field in PDCCH order can indicate at most 1 SS/PBCH block indexes which the UE can be used to determine the RACH occasion for PRACH transmission. This can be applied to FR2 NR-U, such as in 60 GHz unlicensed band.

In another sub-example, the SS/PBCH index field in PDCCH order can indicate multiple SS/PBCH block indexes which the UE can be used to determine the RACH occasion for PRACH transmission, wherein each SS/PBCH block index is indicated through a multi-level bit representation inside the SS/PBCH index field.

In one example, the SS/PBCH index field for PDCCH order in NR-U can be increased from the 6 bits as in NR PDCCH order to M (M>6) bits, wherein the additional (M-6) bits can be used from the 10 reserved bits of NR PDCCH order to indicate one or multiple SS/PBCH block indexes for NR-U.

In one sub-example, when the actually transmitted number of SS/PBCH blocks is N which corresponds to $\lceil \log_2 N \rceil$ bits to represent in the PDCCH order, the SS/PBCH index field in PDCCH order can indicate at most $\lfloor M/\lceil \log_2 N \rceil \rfloor$ SS/PBCH block indexes which the UE can be used to determine the RACH occasion for PRACH transmission.

In one instance, when the actually transmitted number of SS/PBCH blocks is N=8 which corresponds to 3 bits, the SS/PBCH index field in PDCCH order of M=9 bits can indicate at most 3 SS/PBCH block indexes which the UE can be used to determine the RACH occasion for PRACH transmission. This can be applied to FR1 NR-U in 5 GHz and/or 6 GHz unlicensed/shared spectrum.

In another instance, when the actually transmitted number of SS/PBCH blocks is N=128 which copepods to 7 bits, the SS/PBCH index field in PDCCH order can be M=9 bits. This can be applied to FR2 NR-U, such as in 60 GHz wherein the maximum number of SS/PBCH blocks can be increased from 64 for highly directional communications.

In one example, the SS/PBCH index field for PDCCH order in NR-U can be decreased from the 6 bits as in an NR PDCCH order to M2 (M2<6) bits, wherein the additional (6-M) bits saved from NR PDCCH order can be used to indicate other random access procedure information or increase the number of reserved bits for NR-U PDCCH order.

In one example, one or multiple of the PRACH mask index value, the allowed PRACH occasion(s) of SSB for a PRACH mask index value, the mapping and ordering of PRACH occasions per corresponding SS/PBCH block index indicated by PRACH mask index can be enhanced from NR. The PRACH mask index values for NR is indicated in TABLE 2.

TABLE 2

PRACH mask index

| PRACH Mask Index | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

In one example, the PRACH mask index values can be enhanced from NR, such that the allowed PRACH occasion(s) of SSB can be defined for one or multiple of the reserved PRACH mask indexes (i.e., PRACH mask index 11-15) in NR, and these reserved PRACH mask indexes can be used for NR-U.

In one sub-example, when the maximum number of PRACH occasions associated with an SSB is 8, the allowed PRACH occasions of SSB indicated by the reserved PRACH mask index can be chosen from a subset of {PRACH occasion index 1, PRACH occasion index 2, PRACH occasion index 3, PRACH occasion index 4, PRACH occasion index 5, PRACH occasion index 6, PRACH occasion index 7, PRACH occasion index 8}. For instance, {PRACH occasion index 1, PRACH occasion index 2, PRACH occasion index 3, PRACH occasion index 4}.

In another sub-example, when the maximum number of PRACH occasions associated with an SSB is higher than 8 for NR-U, the reserved PRACH mask index in NR can be used in indicating the additional PRACH occasions supported in NR-U. For instance, when the maximum number of PRACH occasions associated with an SSB is 16, reserved PRACH mask index in NR can be used in indicating a subset from {PRACH occasion index 1, PRACH occasion index 2, ..., PRACH occasion index 16}.

In one example, the number of supported PRACH mask index values can be increased to be higher than 16.

In one sub-example, when the maximum number of PRACH occasions associated with an SSB is 8, the additional PRACH mask indexes can be utilized in indicating different subsets of {PRACH occasion index 1, PRACH occasion index 2, PRACH occasion index 3, PRACH occasion index 4, PRACH occasion index 5, PRACH occasion index 6, PRACH occasion index 7, PRACH occasion index 8}, compared to those already supported in NR.

In another sub-example, when the maximum number of PRACH occasions associated with an SSB is N (N>8) for NR-U, the additional PRACH mask indexes can be utilized in indicating additional allowed PRACH occasion(s) of SSB, which can be chosen from a subset of {PRACH occasion index 1, PRACH occasion index 2, ..., PRACH occasion index N}.

In one example, the PDCCH order for NR-U can be enhanced such that the PDCCH can indicate one or more than one PRACH mask indexes that are assigned to the UE for PDCCH order initiated random access procedure.

In a sub-example, the PDCCH order can include more than 4 bits to indicate more than 1 PRACH mask indexes, such that the UE can be configured with multiple PRACH occasion indexes in attempting the PRACH transmission. For instance, the PRACH mask index field can include 8 bits, which can indicate 2 PRACH mask indexes with each being indicated through 4 bits.

In one example, the allowed PRACH occasion(s) of SSB corresponding to each PRACH mask index can be re-interpreted or enhanced.

In one sub-example, when the maximum number of PRACH occasions associated with an SSB is N for NR-U, the allowed PRACH occasion(s) of SSB for each PRACH mask index can be re-interpreted or enhanced to be chosen from a subset of {PRACH occasion index 1, PRACH occasion index 2, ..., PRACH occasion index N}. For instance, the PRACH occasion indexes corresponding to a PRACH mask index can be chosen such that two or more PRACH occasions can be assigned on different sub-bands of the BWP, wherein sub-band can be the nominal channel bandwidth of the unlicensed band.

In one example, the mapping and ordering of PRACH occasions per corresponding SS/PBCH block index indicated by PRACH mask index can be enhanced from NR.

In one sub-example, the mapping of PRACH occasions per corresponding SS/PBCH block index can be based on a group-RO basis, wherein each RO group consists of multiple time-domain PRACH occasions to increase the transmit success probability for NR-U PRACH given LBT constraint.

In one instance, the RO group can include consecutive time-domain PRACH occasions, wherein the neighboring ROs can have no-gap or have a gap time-domain duration in between.

In another instance, the allowed PRACH occasion(s) of SSB corresponding to a PRACH mask index can also be allocated on the group-RO basis.

Figure 30:
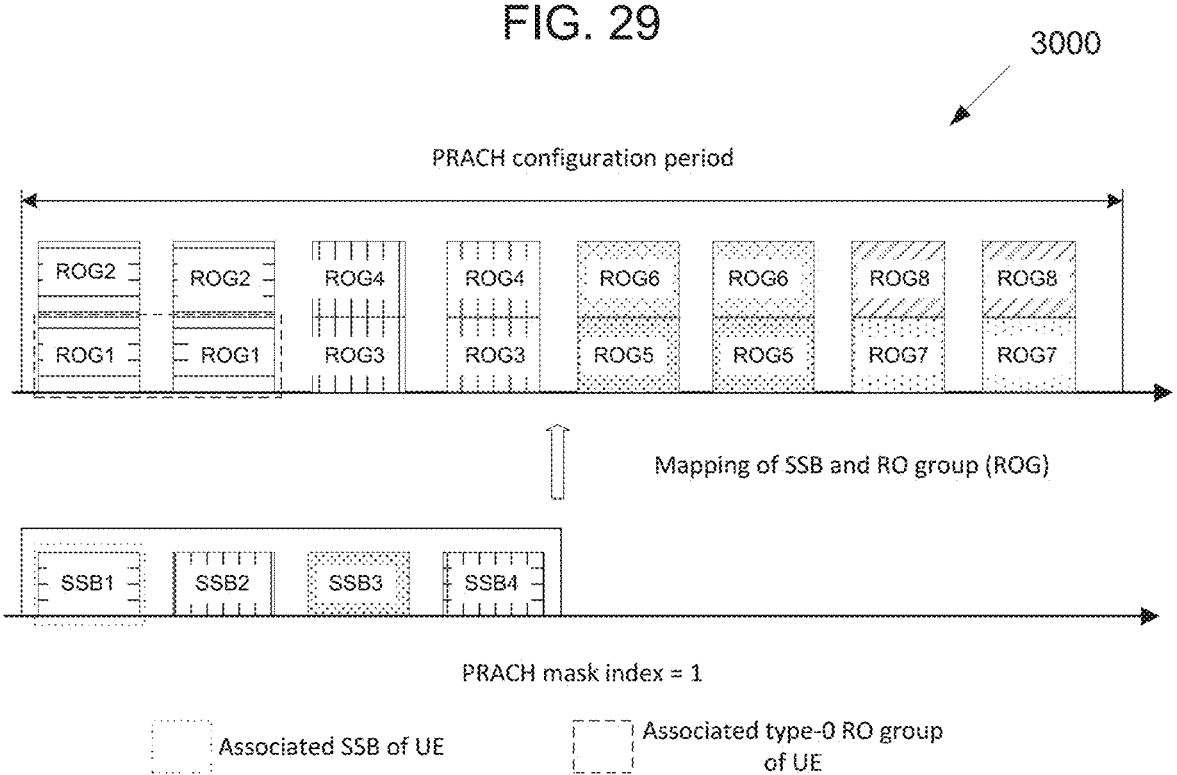
FIG. 30 illustrates yet another example configuration for multiple SS/PBCH blocks association according to embodiments of the present disclosure.

FIG. 30 illustrates yet another example configuration for multiple SS/PBCH blocks association 3000 according to embodiments of the present disclosure. An embodiment of the configuration for multiple SS/PBCH blocks association 3000 shown in FIG. 30 is for illustration only. FIG. 30 does not limit a scope of the present disclosure.

As illustrated in FIG. 30, each RO group consists of 2 consecutive time-domain ROs, and each SSB is associated with one RO group, and each SSB and the associated RO group share the same pattern fill. In the illustration of FIG. 30, the mapping from SSB to RO is based on the group-RO basis, and each SSB is associated with 2 RO groups, and the mapping is in a frequency-first, time-second order with at most 2 FDM'ed RO groups. In addition, the PRACH mask index is defined according to TABLE 2, such that the $1^{st}$ RO group associated with the selected SSB (i.e., SSB1) is assigned to the UE.

In another sub-example, when the UL BWP consists of more than one sub-band with each sub-band can be a nominal channel bandwidth of the unlicensed band, the ordering of PRACH occasions for the indicated SS/PBCH block index can be ordered in an increasing order of the sub-band index, such that the UE can perform parallel LBT over different sub-bands. In one instance, for the indicated preamble index, the ordering of the PRACH occasion can be: first, in increasing order of sub-band index within the BWP (with respect to previous PRACH occasion of indicated SS/PBCH block index); second, in increasing order of frequency resource indexes for frequency multiplexed PRACH occasions within the sub-band; third, in increasing order of time resource indexes for time-multiplexed PRACH occasions within a PRACH slot; and fourth, in increasing order of indexes for PRACH slots.

Figure 31:
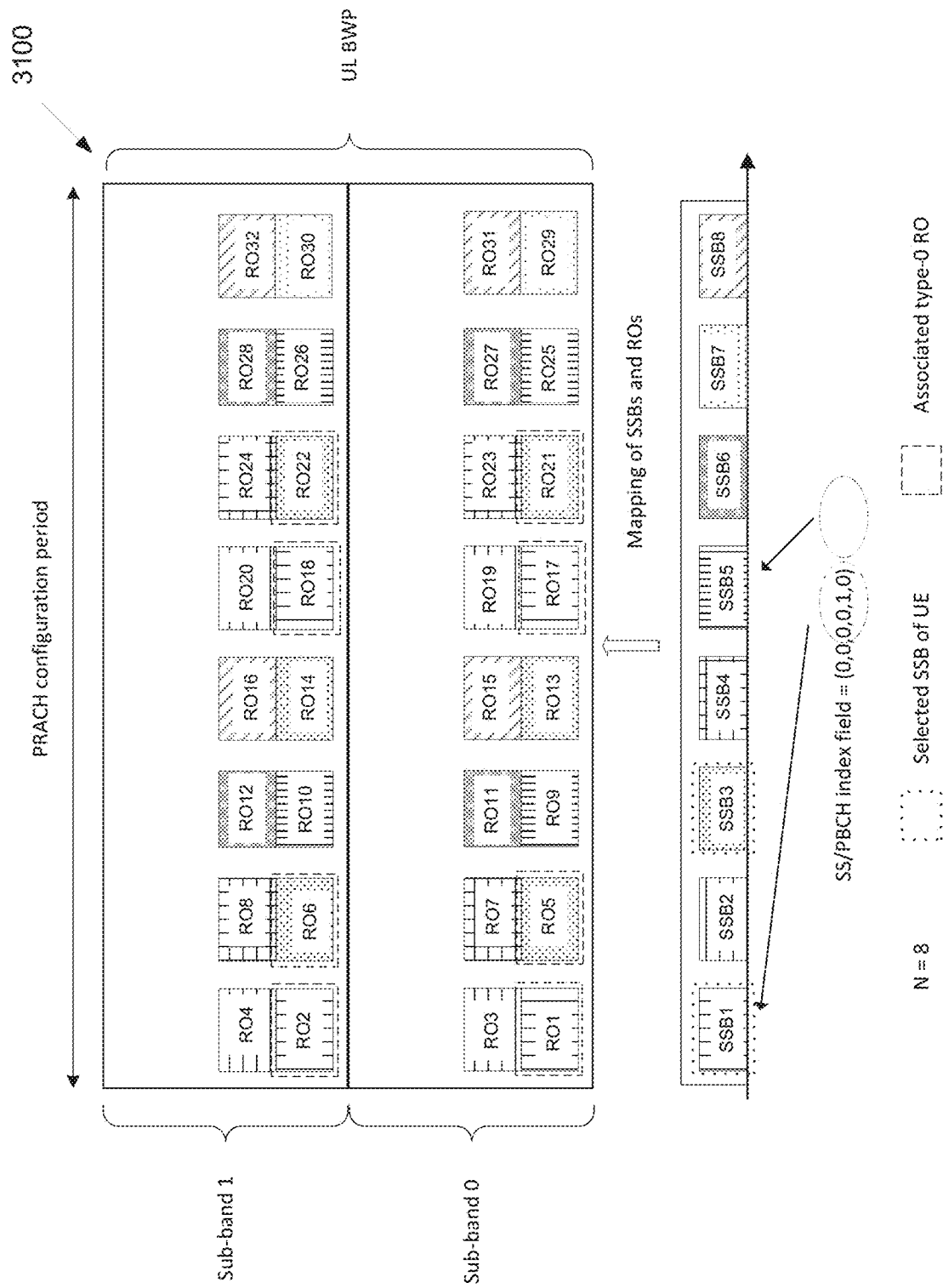
FIG. 31 illustrates yet another example configuration for multiple SS/PBCH blocks association according to embodiments of the present disclosure.

FIG. 31 illustrates yet another example configuration for multiple SS/PBCH blocks association 3100 according to embodiments of the present disclosure. An embodiment of the configuration for multiple SS/PBCH blocks association 3100 shown in FIG. 31 is for illustration only. FIG. 31 does not limit a scope of the present disclosure.

As illustrated in FIG. 31, wherein two sub-bands are within the UL BWP, and each sub-band can be allocated at most 2 ROs. Each SSB is mapped to 2 ROs, wherein the 2 ROs associated with each SSB are allocated in the two sub-bands within the UL BWP, and each SSB and the associated RO(s) share the same pattern fill. In addition, this illustration assumes the PRACH mask index indicates that every RACH occasion associated with the selected SSB can be utilized by the UE.

In one example, the PDCCH order can be enhanced in indicating additional useful information for the random access procedure triggered by the PDCCH order.

In one example, the PDCCH order can be utilized in indicating the RAR response window size.

In one sub-example, the RAR response window size indicated through the PDCCH order can over-ride the RAR response window configured by higher layer parameter.

In another sub-example, the RAR response window size indicated by the PDCCH order can depend on the operating frequency of NR-U. For instance, the supported RAR window size for FR1 NR-U and FR-2 NR-U can be different.

In another sub-example, an RAR response window size indicated by the PDCCH order can be same or different from the supported RAR response window sizes in NR; and longer RAR response window size can be supported to provide a more relaxed timing for UE in detecting RAR, given that RAR transmission is subject to LBT. For instance, for FR1 NR-U, the supported RAR response window sizes can be $\{1, 2, 4, 8, 16, 32\}$.

In another sub-example, if the number of supported RAR response window size that can be indicated through PDCCH order is N, the number of bits in PDCCH order to indicate the RAR response window size is $\lceil \log_2 N \rceil$ bits.

In one example, the PDCCH order can be utilized in indicating the sub-band, and/or BWP, and/or SCell index, of the PRACH occasions scheduled according to the PDCCH order.

In one sub-example, it can be utilized to increase the transmit opportunity of the PDCCH order triggered PRACH transmission from a frequency-domain perspective.

In one example, the additional information of the random access procedure indicated in the PDCCH order can be carried through the reserved bits of PDCCH order in NR.

In one example, the additional information of the random access procedure indicated in the PDCCH order can be carried through additional bits from the PDCCH order in NR.

In one embodiment, enhancements to frequency-domain resource configuration for type-0 ROs is provided. This embodiment includes approaches to enhance the frequency-domain resource configuration of semi-statically configured type-0 ROs, such that the probability for UE to successfully transmit type-0 RO can be increased and correspondingly the PRACH transmission delay can be reduced.

In one example, when the serving cell for the random access procedure is configured with supplementary uplink (SUL), the SUL or normal uplink carrier choice for performing random access procedure can be enhanced.

In one example, when the random access procedure is initiated on a serving cell, the cell selection rule for performing random access procedure on SUL or NUL can be enhanced for NR-U, such that the SUL/NUL carrier selection can depend on not only an RSRP threshold for carrier selection (e.g., rsrp-ThresholdSSB-SUL as in NR), but also an LBT threshold for allowing PRACH transmission.

In one sub-example, the LBT threshold can be the energy detection threshold, and the channel is declared as busy/occupied if the total energy detected by the UE is above the threshold; and the channel is declared as clear/available otherwise.

In another sub-example, the selection rule for SUL/NUL carrier in performing random access procedure can be: if the RSRP of the downlink pathloss reference is less than the RSRP threshold for carrier selection, OR the energy perceived at UE in the NUL carrier (or the active UL BWP within NUL carrier wherein type-0 ROs are configured) is above LBT threshold, select the SUL carrier for performing random access procedure; otherwise select the NUL carrier for performing random access procedure.

In another sub-example, this example can be applied to initial access UEs.

In one example, for both initial access UEs and connected UEs, only one of SUL and NUL is activated at a time (due to the drastic propagation difference of SUL in the lower frequency band and NUL which can be in very high frequency band); while for NR-U, both SUL and NUL can be activated for UEs in initiating the random access procedure.

In one sub-example, the aforementioned examples can be applied to initial access UEs.

In another sub-example, the aforementioned example can be applied to PDCCH-order triggered random access procedure, wherein the UL/SUL indicator field can be increased from 1 bit to 2 bits.

In another sub-example, when both NUL and SUL carriers are activated, the NUL carrier can be the prioritized carrier in initiating the random access procedure, such that only the NUL carrier is used when the PRACH LBT on the NUL carrier has passed; otherwise the random access procedure is initiated only through the SUL carrier.

In another sub-example, the configuration of SUL to be utilized for initial access UEs can be configured through the remaining system information (RMSI) or other system information (OSI).

Another design consideration to enhance frequency domain configuration is for random access procedure on SCell(s). NR only supports random access procedure on SCell initiated by a PDCCH order, with ra-PreambleIndex in the PDCCH order different from all zeros. NR-U can enhance such restriction to increase the random access transmit opportunity.

In one example, in addition to supporting PDCCH order triggered random access procedure on SCell, random access procedure on an SCell can be enhanced such that the random access procedure can also be initiated without PDCCH order.

In one example, the random access procedure on an SCell can be initiated by the UE MAC entity.

In one sub-example, the random access procedure on an SCell can be initiated by the UE subject to the energy perceived at the PCell and SCell(s). For instance, when the energy that UE detected on the PCell is above the energy detection threshold while one or multiple of the energy that UE detected on the SCell(s) is below the energy detection threshold, the UE can initiate the random access procedure through an SCell.

In another sub-example, when the UE is configured with both master cell group (MCG) and secondary cell group (SCG), the random access procedure can be initiated on the special cell (i.e., PCell of MCG or PSCell of SCG).

In one example, the MAC entity when configured with one or more SCells, can be allowed to have more than one random access procedure ongoing at a given point in time, such that the transmit opportunity for PRACH can be increased from the frequency domain perspective.

In one sub-example, if a new random access procedure is triggered while another is already ongoing in the MAC entity, the UE can continue with the ongoing procedure while starting a new procedure.

In another sub-example, if more than random access procedures are triggered at the same time, the UE can simultaneously start the random access procedures.

In one example, the random access procedure on SCells can be initiated by RRC, according to a subset of the triggering events for random access procedure, including {initial access from RRC IDLE; RRC connection re-establishment procedure; handover; DL or UL data arrival during RRC CONNECTED when UL synchronization status is "non-synchronized"; transition from RRC INACTIVE; to establish time alignment at SCell addition; request for other SI; beam failure recovery}.

In one example, the random access procedure on SCells can be initiated by downlink channels/signals other than PDCCH order (i.e., DCI format 1_0 scrambled by C-RNTI and the frequency domain resource assignment field is all ones).

In a sub-example, the downlink channels/signals can be another DCI format, such as group-common PDCCH.

In another sub-example, the downlink channels/signals can be remaining system information or other system information.

In one example, the random access procedure can be initiated on multiple SCells simultaneously.

In one example, the random access procedure can be initiated on PCell, and one or multiple SCells simultaneously.

In one example, random access procedure can be enhanced such that random access procedure can also be initiated from one or more than one candidate UL BWPs of a cell.

In one example, one or more than one candidate UL BWPs can be configured for the UE, such that the UE can perform different LBT processes over the candidate BWPs to increase the transmit opportunity of the PRACH.

In one sub-example, when more than one LBT processes on the candidate BWP successes, the UE can choose to initiate random access procedure on one BWP.

In one sub-example, when more than one LBT processes on the candidate BWP successes, the UE can choose to initiate random access procedure on more than one BWPs that succeed in BWP.

In one example, this approach can be applied to initial access UEs.

In a sub-example, when this approach is applied to initial access UEs, the multiple candidate UL BWPs can be multiple initial active UL BWPs.

In another sub-example, when this approach is applied to initial access UEs, the multiple candidate UL BWPs can be an initial active UL BWP, and one or multiple supplemental UL BWPs, which are configured to increase the transmit opportunity for PRACH of initial access UEs.

Another design consideration for frequency domain resource configuration of semi-statically configured type-0 ROs is that in NR, the FDM'ed ROs are configured on a per bandwidth part (BWP) basis by higher layer parameters. Since NR-U UE may perform parallel LBT processes with a frequency-domain granularity of the nominal channel bandwidth of the unlicensed spectrum (e.g., 20 MHz in 5 GHz bands), such per-BWP based configuration of the type-0 ROs can be further enhanced in NR-U.

In one example, the frequency-domain resource allocation for type-0 ROs can be allocated on a per-sub-band basis for NR-U, wherein the sub-band bandwidth can depend on the unlicensed band regulation.

In one example, each sub-band can have a dedicated frequency-domain configuration for type-0 ROs.

In one sub-example, the configuration for type-0 ROs on each sub-band can include one or multiple of {number of FDM'ed PRACH occasions within the sub-band, offset of the lowest PRACH occasion in frequency domain with respect to starting PRB of the sub-band}.

In another sub-example, different sub-bands with dedicated frequency-domain configuration for type-0 ROs can belong to the same bandwidth part (BWP), or the same cell, or different cells.

In one example, multiple sub-bands can have the same common frequency-domain configuration for type-0 ROs configured on the sub-band.

In one sub-example, the sub-bands share the common configuration for type-0 ROs can be the sub-bands within a same bandwidth part. For instance, different BWPs within a cell can have different frequency-domain configuration for type-0 ROs.

In another sub-example, the sub-bands share the common configuration for type-0 ROs can be the sub-bands within a same cell. For instance, different cells can have different frequency-domain configuration for type-0 ROs.

In another sub-example, the sub-bands share the common configuration for type-0 ROs can be the sub-bands among different cells.

In another sub-example, the configuration for the sub-band with dedicated type-0 RO can include one or multiple of {number of FDM'ed PRACH occasions within the sub-band, offset of the lowest PRACH occasion in frequency domain with respect to starting PRB of the sub-band}.

In one example, one sub-band can have a dedicated frequency-domain configuration for type-0 ROs configured on the sub-band, while the frequency-domain configuration for type-0 ROs on other sub-bands can be implicitly inferred from the sub-band with dedicated configuration.

In one sub-example, the sub-bands with type-0 configuration implicitly inferred from the sub-band with dedicated configuration can be within a same bandwidth part. For instance, different BWPs within a cell can have different frequency-domain configuration for type-0 ROs.

In another sub-example, the sub-bands with type-0 configuration implicitly inferred from the sub-band with dedicated configuration can be within a cell. For instance, different cells can have different frequency-domain configuration for type-0 ROs.

In another sub-example, the sub-bands with type-0 configuration implicitly inferred from the sub-band with dedicated configuration can be from different cells.

In another sub-example, the configuration for the sub-band with dedicated type-0 RO can include one or multiple of {number of FDM'ed PRACH occasions within the sub-band, offset of the lowest PRACH occasion in frequency domain with respect to starting PRB of the sub-band}.

In another sub-example, for sub-band 0 with dedicated frequency-domain configuration of type-0 ROs, and another sub-band 1 where the offset from the lowest RB of sub-band 1 to that of sub-band 0 is O RBs (or MHz), then the frequency-domain configuration of type-0 ROs on sub-band 1 can be inferred from the frequency-domain configuration of type-0 ROs on sub-band 0, wherein the frequency domain position for the i-th RO in sub-band 1 can be inferred as the frequency-domain position for i-th RO in sub-band 0 plus O RBs (or MHz), wherein 0<=i<=M-1 with M being then number of FDM'ed ROs on sub-band 0.

Figure 32:
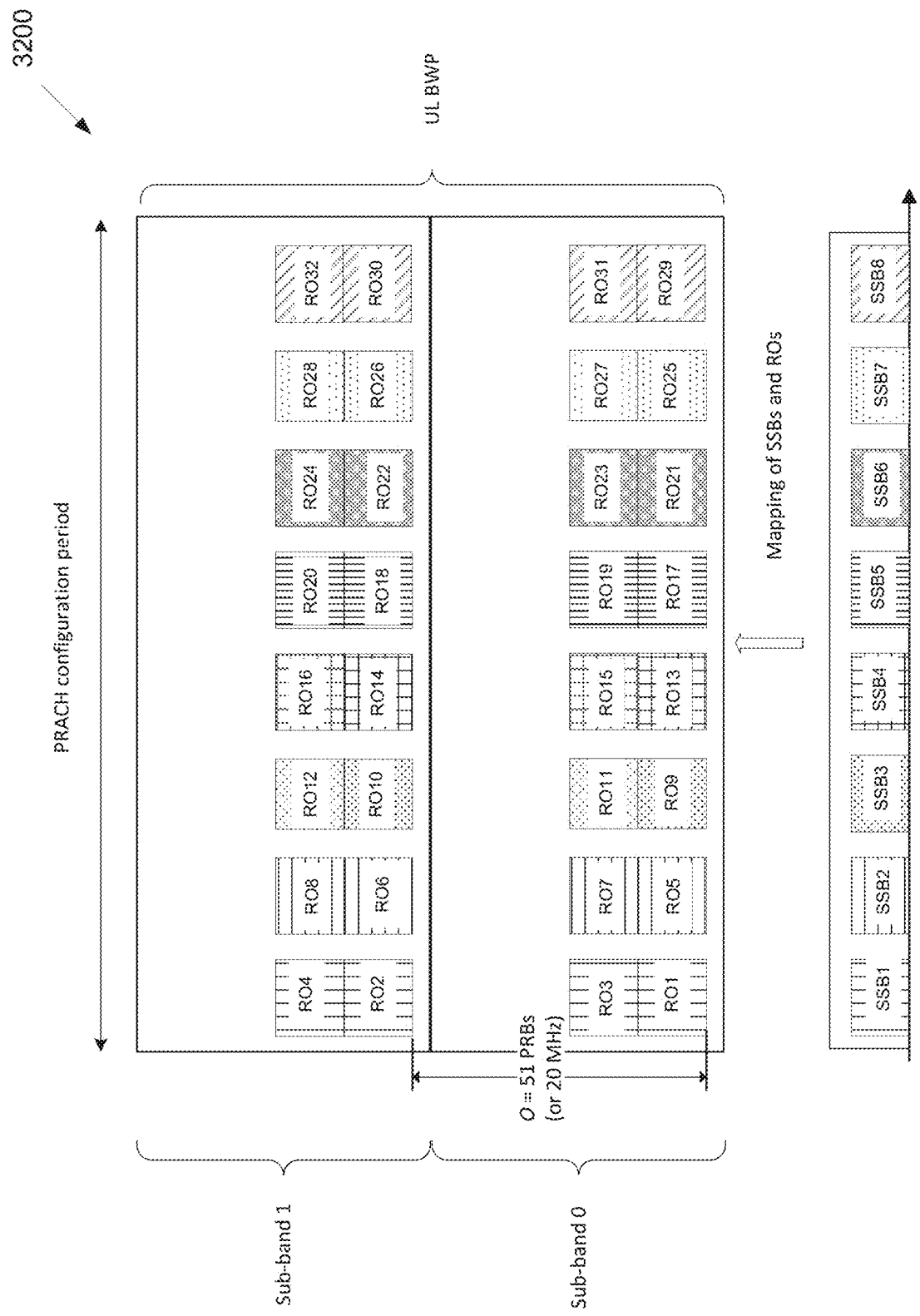
FIG. 32 illustrates yet another example configuration for multiple SS/PBCH blocks association according to embodiments of the present disclosure.

FIG. 32 illustrates yet another example configuration for multiple SS/PBCH blocks association 3200 according to embodiments of the present disclosure. An embodiment of the configuration for multiple SS/PBCH blocks association 3200 shown in FIG. 32 is for illustration only. FIG. 32 does not limit a scope of the present disclosure.

As illustrated in FIG. 32, the UL BWP consists of two sub-bands with each sub-band being 20 MHz, the sub-carrier spacing is 30 kHz, the offset O is 51 PRBs or 20 MHz, the SSB and the associated RO(s) share the same pattern fill; and the RO configuration on sub-band 1 can be implicitly inferred from the type-0 RO configuration on sub-band 0.

In one example, with the frequency-domain configuration for type-0 ROs can be configured on a sub-band basis, the mapping order from SS/PBCH block index to PRACH occasions can also be enhanced.

In one sub-example, the mapping order can be: first, in increasing order of preamble indexes within a PRACH occasion group; second, in increasing order of FDM'ed PRACH occasion groups within a sub-band; third, in increasing order of sub-bands within a BWP/cell(s); fourth, in increasing order of TDM'ed PRACH occasion groups within a PRACH slot; and fifth, in increasing order of indexes for PRACH slots.

Figure 33:
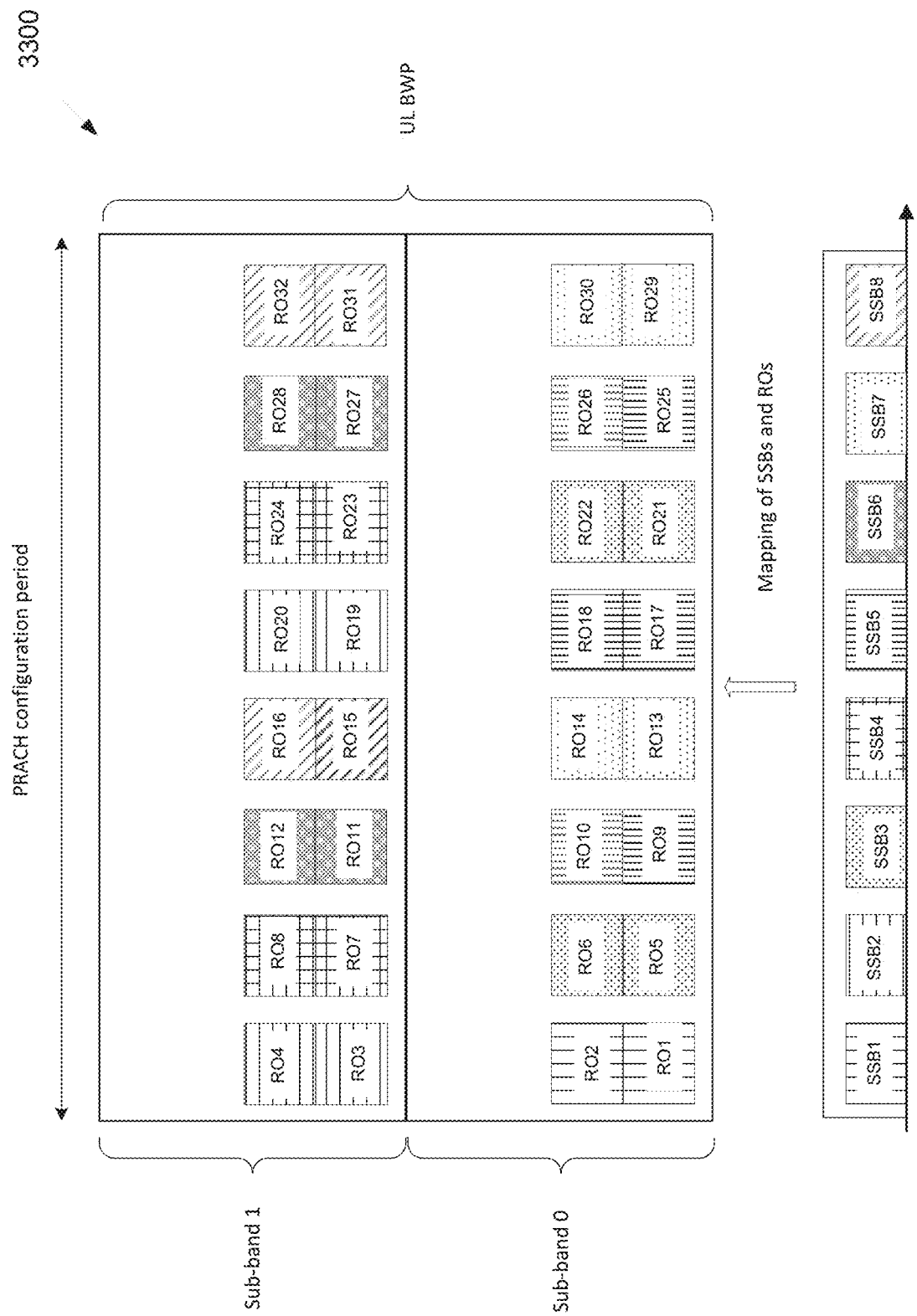
FIG. 33 illustrates yet another example configuration for multiple SS/PBCH blocks association according to embodiments of the present disclosure.

FIG. 33 illustrates yet another example configuration for multiple SS/PBCH blocks association 3300 according to embodiments of the present disclosure. An embodiment of the configuration for multiple SS/PBCH blocks association 3300 shown in FIG. 33 is for illustration only. FIG. 33 does not limit a scope of the present disclosure.

As illustrated in FIG. 33, two sub-bands are within the UL BWP; and each SSB is mapped to 2 ROs, wherein the 2 ROs associated with each SSB are allocated within the same sub-band within the UL BWP, and the SSB and the associated RO(s) share the same pattern fill.

In one sub-example, the mapping order can be: first, in increasing order of preamble indexes within a PRACH occasion group; second, in increasing order of the sub-bands with available PRACH occasion group within a BWP/cell(s) modulus number of sub-bands within the BWP/cells; third, in increasing order of FDM'ed PRACH occasion groups within current sub-band; fourth, in increasing order of TDM'ed PRACH occasion groups within a PRACH slot; and fifth, in increasing order of indexes for PRACH slots.

Figure 34:
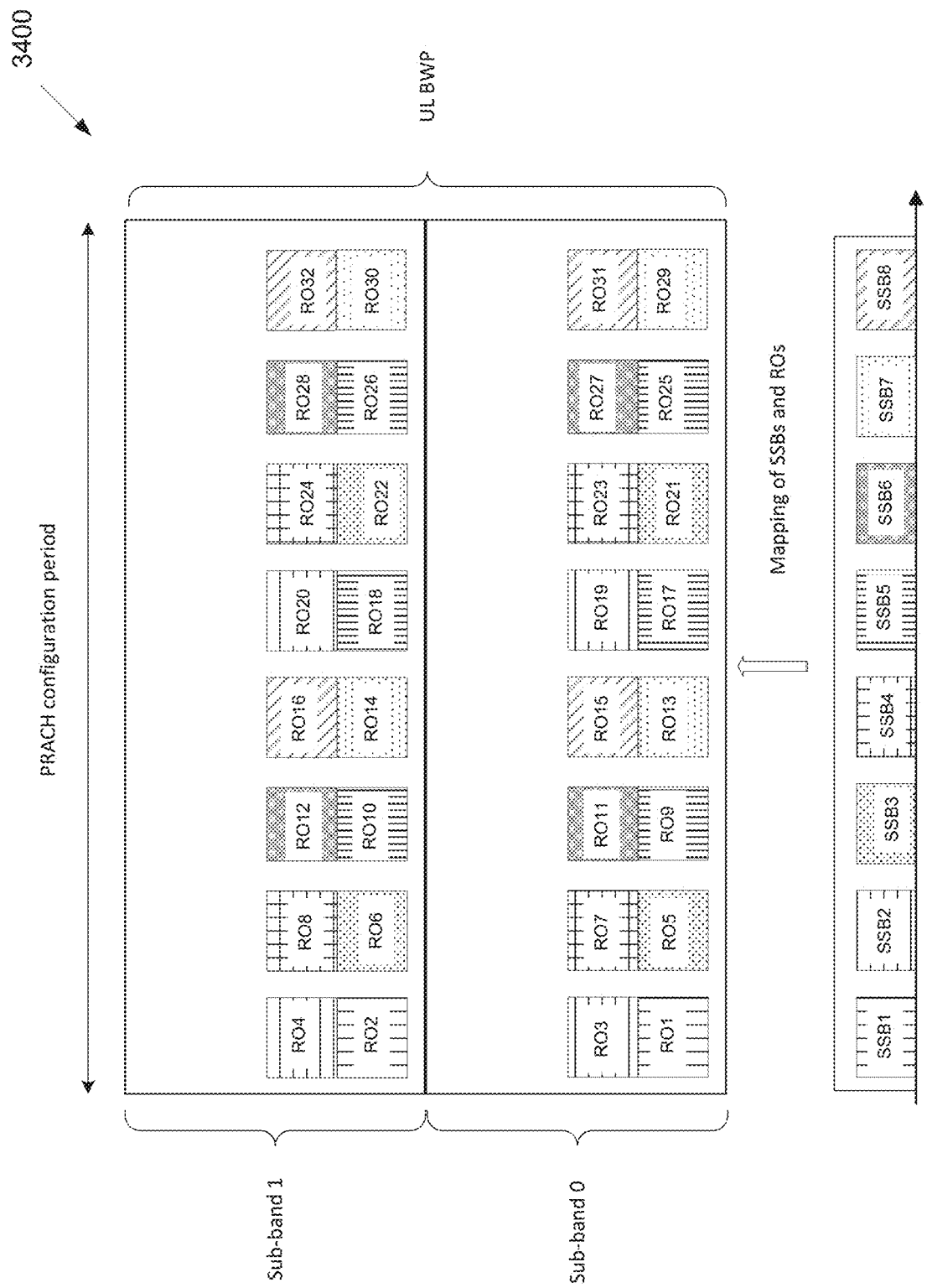
FIG. 34 illustrates yet another example configuration for multiple SS/PBCH blocks association according to embodiments of the present disclosure.

FIG. 34 illustrates yet another example configuration for multiple SS/PBCH blocks association 3400 according to embodiments of the present disclosure. An embodiment of the configuration for multiple SS/PBCH blocks association 3400 shown in FIG. 34 is for illustration only. FIG. 34 does not limit a scope of the present disclosure.

As illustrated in FIG. 34, two sub-bands are within the UL BWP; and each SSB is mapped to 2 ROs, wherein the 2 ROs associated with each SSB are allocated in the two sub-bands within the UL BWP, and the SSB and the associated RO(s) share the same pattern fill.

In one example, the PRACH occasion group of the aforementioned examples and sub-examples can be a single PRACH occasion.

In one sub-example, the PRACH occasion group of the aforementioned sub-examples can be a group of more than one time-domain consecutive ROs, wherein the neighboring ROs within the group can have gap or no gap.

Figure 35:
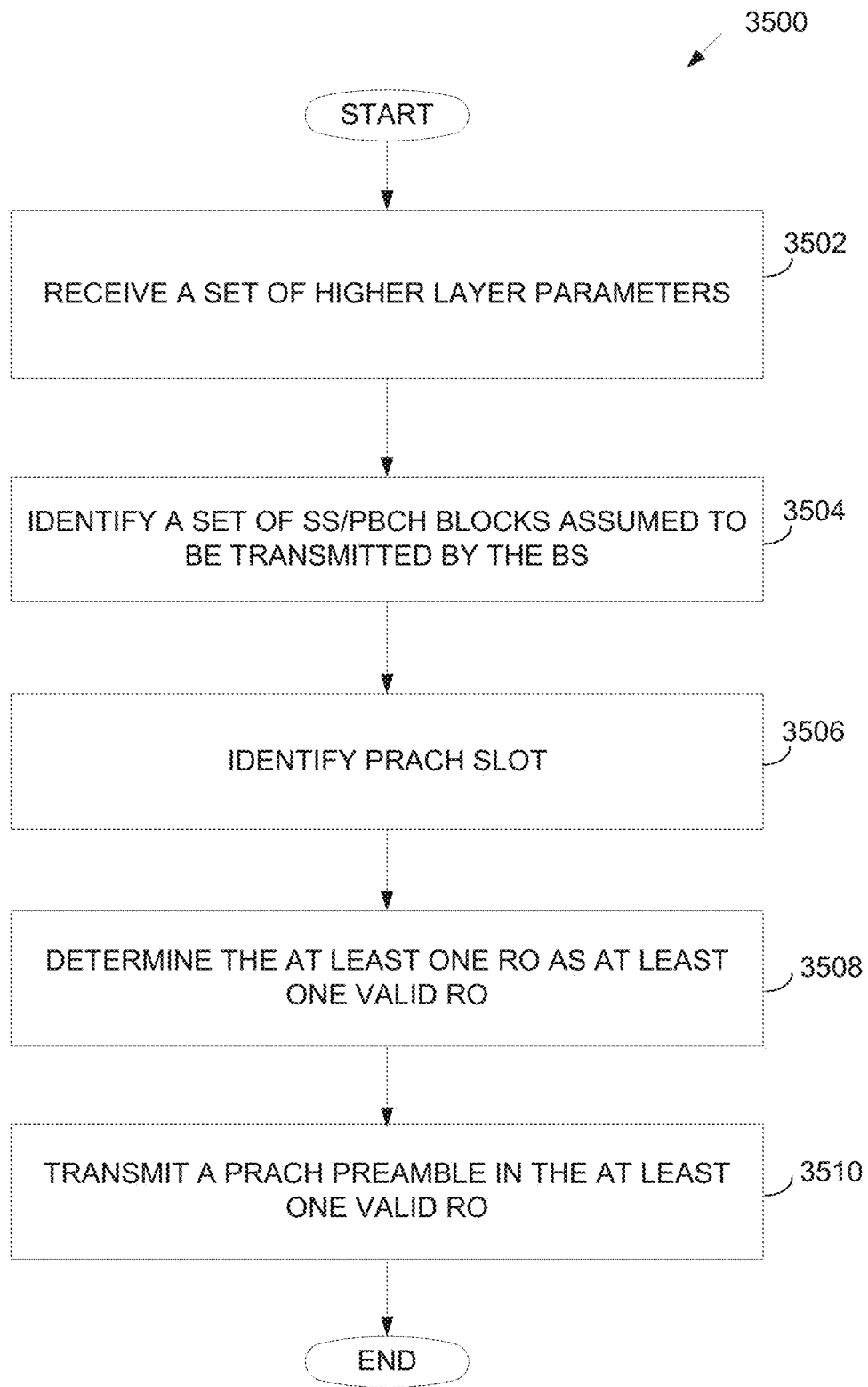
FIG. 35 illustrates a flow chart of a method for determination of valid RACH occasion according to embodiments of the present disclosure.

FIG. 35 illustrates a flow chart of a method 3500 for determination of valid RACH occasion according to embodiments of the present disclosure, as may be performed by a user equipment (e.g., 111-116 as illustrated in FIG. 1). An embodiment of the method 3500 shown in FIG. 35 is for illustration only. FIG. 35 does not limit a scope of the present disclosure.

As illustrated in FIG. 35, the method 3500 begins at step 3502. In step 3502, a UE receives, from a base station (BS), a set of higher layer parameters.

In step 3504, the UE identifies, from the received set of higher layer parameters, a set of synchronization signal/physical broadcast channel (SS/PBCH) blocks assumed to be transmitted by the BS.

In one embodiment, the identified set of SS/PBCH blocks assumed to be transmitted by the BS is determined as a set of SS/PBCH blocks with a position belonging to a union of SS/PBCH blocks assumed to be transmitted within a transmission window based on a result of channel sensing.

In step 3506, the UE identifies, from the received set of higher layer parameters, a physical random access channel (PRACH) slot including at least one random access channel occasion (RO).

In step 3508, the UE determines the at least one RO as at least one valid RO based on: the at least one RO not preceding an SS/PBCH block in the PRACH slot, the at least one RO starting on at least $N_1$ symbols after a last downlink symbol in the PRACH slot, and the at least one RO starting on at least $N_2$ symbols after a last symbol of the SS/PBCH block in the PRACH slot, wherein the SS/PBCH block is included in the identified set of SS/PBCH blocks assumed to be transmitted by the BS.

In one embodiment, a value of the at least $N_1$ symbols is identical to a value of the at least $N_2$ symbols.

In step 3510, the UE transmits, to the BS, a PRACH preamble in the at least one valid RO.

In one embodiment, the UE further determines the union of transmitted SS/PBCH blocks based on a shift granularity and a bitmap indicating the transmitted SS/PBCH blocks.

In one embodiment, the UE further determines an association between the at least one valid RO and at least one SS/PBCH block included in the identified set of SS/PBCH blocks assumed to be transmitted by the BS, and wherein the association between the at least one valid RO and the at least one SS/PBCH block is applied across PRACH configuration periods.

In such embodiment, the association includes a mapping order between the at least one valid RO and the at least one SS/PBCH block included in the identified set of SS/PBCH blocks assumed to be transmitted by the BS; and the mapping order is determined first in increasing order of ROs in a frequency domain and second in increasing order of ROs in a time domain.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims.

What is claimed is:

1. A method by a terminal in a wireless communication system, the method comprising:
   receiving, from a base station (BS), information associated with a time domain position of a synchronization signal block (SSB) in a higher layer parameter or system information;
   identifying a time domain position of a candidate synchronization signal/physical broadcast channel (SS/PBCH) block for operation with an unlicensed band based on the information associated with the time domain position of the SSB, wherein the identifying the time domain position of the candidate SS/PBCH block comprises identifying the time domain position of the candidate SS/PBCH block based on an SS/PBCH block index corresponding to a candidate SS/PBCH block index;
   receiving, from the BS, a SS/PBCH block in the unlicensed band based on the identified time domain position of the candidate SS/PBCH block;
   determining at least one valid random access channel occasion (RO) from at least one RO in a physical random access channel (PRACH) slot based on:
   the at least one RO being not preceding the candidate SS/PBCH block in the PRACH slot,
   the at least one RO starting on at least $N_{gap}$ symbols after a last downlink symbol in the PRACH slot, and
   the at least one RO starting on at least $N_{gap}$ symbols after a last symbol of the candidate SS/PBCH block in the PRACH slot; and
   transmitting, to the BS, a PRACH preamble in the at least one valid RO.

2. The method of claim 1, wherein the information associated with the time domain position of the SSB includes the SS/PBCH block index corresponding to the candidate SS/PBCH block index for shared spectrum channel access.

3. The method of claim 1, wherein the information associated with the time domain position of the SSB comprises a bitmap indicating a time domain position of a SS/PBCH block, and
   wherein identifying the time domain position of the candidate SS/PBCH block comprises:
   when a k-th bit of the bitmap is set to 1, identifying the time domain position of one or more SS/PBCH blocks within a transmission window with candidate SS/PBCH block indexes corresponding to SS/PBCH block index equal to k-1 as the time domain position that the one or more SS/PBCH blocks are to be transmitted; and
   when the k-th bit of the bitmap is set to 0, identifying that one or more SS/PBCH blocks with candidate SS/PBCH block indexes corresponding to SS/PBCH block index equal to k-1 are not transmitted.

4. The method of claim 1, wherein the information associated with the time domain position of the SSB comprises a bitmap indicating a time domain position of a SS/PBCH block, and
   wherein the bitmap indicating the time domain position of the SS/PBCH block implies all locations of SS/PBCH blocks to be actually transmitted in a transmission window.

5. The method of claim 4, wherein the locations of the SS/PBCH blocks to be actually transmitted in the transmission window are determined based on a shift granularity and the bitmap.

6. The method of claim 1, wherein the determining at least one valid RO comprises:
   determining the at least one valid RO based on the at least one RO within at least one UL symbol indicated by a time division duplex (TDD)-uplink (UL)-downlink (DL) configuration information.

7. The method of claim 1, wherein a value of the at least one N_gap symbols is determined based on subcarrier spacing (SCS) of the SS/PBCH block.

8. A terminal in a wireless communication system, the terminal comprising:
   a transceiver; and
   at least one processor configured to:
   receive, via the transceiver from a base station (BS) information associated with time domain position of a synchronization signal block (SSB) in a higher layer parameter or system information;
   identify a time domain position of a candidate synchronization signal/physical broadcast channel (SS/PBCH) blocks for operation with an unlicensed band based on the information associated with the time domain position of the SSB, wherein the processor is configured to identify the time domain position of the candidate SS/PBCH block by identifying the time domain position of the candidate SS/PBCH block based on an SS/PBCH block index corresponding to a candidate SS/PBCH block index;

receive, via the transceiver from the BS, a SS/PBCH block in the unlicensed band based on the identified time domain position of the candidate SS/PBCH block;

determine at least one valid random access channel occasion (RO) from at least one RO in a physical random access channel (PRACH) slot based on:

the at least one RO being not preceding the candidate SS/PBCH block in the PRACH slot, the at least one RO starting on at least N_gap symbols after a last downlink symbol in the PRACH slot, and the at least one RO starting on at least one N_gap symbols after a last symbol of the candidate SS/PBCH block in the PRACH slot; and transmit, via the transceiver to the BS, a PRACH preamble in the at least one valid RO.

9. The terminal of claim 8, wherein the information associated with the time domain position of the SSB includes the SS/PBCH block index corresponding to the candidate SS/PBCH block index for shared spectrum channel access.

10. The terminal of claim 8, wherein the information associated with the time domain position of the SSB comprises a bitmap indicating a time domain position of a SS/PBCH block, and wherein the processor is configured to identify the time domain position of the candidate SS/PBCH block by:

when a k-th bit of the bitmap is set to 1, identifying the time domain position of one or more SS/PBCH blocks within a transmission window with candidate SS/PBCH block indexes corresponding to SS/PBCH block index equal to k-1 as the time domain position that the one or more SS/PBCH blocks are to be transmitted; and when the k-th bit of the bitmap is set to 0, identifying that one or more SS/PBCH blocks with candidate SS/PBCH block indexes corresponding to SS/PBCH block index equal to k-1 are not transmitted.

11. The terminal of claim 8, wherein the information associated with the time domain position of the SSB comprises a bitmap indicating a time domain position of a SS/PBCH block, and wherein the bitmap indicating the time domain position of the SS/PBCH block implies all locations of SS/PBCH blocks to be actually transmitted in a transmission window.

12. The terminal of claim 11, wherein the locations of the SS/PBCH blocks to be actually transmitted in the transmission window are determined based on a shift granularity and the bitmap.

13. The terminal of claim 8, wherein the processor is configured to determine the at least one valid RO by:

determining the at least one valid RO based on the at least one RO within at least one UL symbol indicated by a time division duplex (TDD)-uplink (UL)-downlink (DL) configuration information.

14. The terminal of claim 8, wherein a value of the at least one N_gap symbols is determined based on subcarrier spacing (SCS) of the SS/PBCH block.

15. A method of operating a base station in a wireless communication system, the method comprising:

transmitting, to a terminal, information associated with a time domain position of a synchronization signal block (SSB) in a higher layer parameter or system information, wherein the information associated with the time domain position of the SSB is configured to indicate a set time domain position of a candidate synchronization signal/physical broadcast channel (SS/PBCH) block for operation with an unlicensed band, wherein the time domain position of the candidate SS/PBCH block is identified by identifying the time domain position of the candidate SS/PBCH block based on the SS/PBCH block index corresponding to a candidate SS/PBCH block index;

transmitting, to the terminal, a SS/PBCH block in the unlicensed band based on the time domain position of the candidate SS/PBCH block, wherein a time division duplex (TDD)-uplink (UL)-downlink (DL) configuration information is configured to indicate at least one valid random access channel occasion (RO) from at least one RO in a physical random access channel (PRACH) slot, wherein the at least one valid RO is determined based on:

the at least one RO being not preceding the candidate SS/PBCH block in the PRACH slot, the at least one RO starting on at least N_gap symbols after a last downlink symbol in the PRACH slot, and the at least one RO starting on at least one N_gap symbols after a last symbol of the candidate SS/PBCH block in the PRACH slot; and receiving, from the terminal, a PRACH preamble in the at least one valid RO.

16. The method of claim 15, wherein the information associated with the time domain position of SSB includes the SS/PBCH block index corresponding to the candidate SS/PBCH block index for shared spectrum channel access.

17. The method of claim 15, wherein the information associated with the time domain position of the SSB comprises a bitmap indicating a time domain position of a SS/PBCH block, and wherein the time domain position of the candidate SS/PBCH block is identified by:

when a k-th bit of the bitmap is set to 1, identifying the time domain position of one or more SS/PBCH blocks within a transmission window with candidate SS/PBCH block indexes corresponding to SS/PBCH block index equal to k-1 as the time domain position that the one or more SS/PBCH blocks are to be transmitted; and when the k-th bit of the bitmap is set to 0, identifying that one or more SS/PBCH blocks with candidate SS/PBCH block indexes corresponding to SS/PBCH block index equal to k-1 are not transmitted.

18. The method of claim 15, wherein the information associated with the time domain position of the SSB comprises a bitmap indicating a time domain position of a SS/PBCH block, and wherein the bitmap indicating the time domain position of the SS/PBCH block implies all locations of SS/PBCH blocks to be actually transmitted in a transmission window.

19. The method of claim 18, wherein the locations of the SS/PBCH blocks to be actually transmitted in the transmission window are determined based on a shift granularity and the bitmap.

20. The method of claim 19, wherein the at least one valid RO is determined by:
 determining the at least one valid RO based on the at least one RO within at least one UL symbol indicated by the TDD-UL-DL configuration information.

* * * * *